United States Patent
Kawamura

(10) Patent No.: US 9,448,418 B2
(45) Date of Patent: *Sep. 20, 2016

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 14/304,271

(22) Filed: Jun. 13, 2014

(65) Prior Publication Data

US 2014/0368913 A1  Dec. 18, 2014

(30) Foreign Application Priority Data

Jun. 13, 2013 (JP) ................... 2013-124348

(51) Int. Cl.
*G02B 27/64* (2006.01)
*G02B 15/173* (2006.01)

(52) U.S. Cl.
CPC ........... *G02B 27/646* (2013.01); *G02B 15/173* (2013.01)

(58) Field of Classification Search
CPC .......................... G02B 27/646; G02B 15/173
USPC .................. 359/557, 687, 773, 774
See application file for complete search history.

(56) References Cited

U.S. PATENT DOCUMENTS 6,650,475 B1    11/2003   Hamano
9,122,044 B2 *   9/2015   Kawamura .......... G02B 15/173

FOREIGN PATENT DOCUMENTS

| JP | 2001-117000 | 4/2001 |
| JP | 2002-006217 | 1/2002 |
| JP | 2008-181147 | 8/2008 |
| JP | 2009-150970 | 7/2009 |

OTHER PUBLICATIONS

Nishio, "Zoom Lens", JP2008181147, machine translation.*
Shirasago, "Zoom Lens Provided with Vibration-Proof Function and Optical Equipment Using the Same", JP2002006217, machine translation.*

* cited by examiner

*Primary Examiner* — Bumsuk Won
*Assistant Examiner* — Wen Huang
(74) *Attorney, Agent, or Firm* — Young & Thompson

(57) ABSTRACT

A zoom lens includes: a positive first lens group; a negative second lens group; and a positive third lens group. The first through third lens groups move such that the distance between the first lens group and the second lens group is greater, and the distance between the second lens group and the third lens group G3 is smaller at a telephoto end compared to a wide angle end. The third lens group is constituted by a positive 3-1 lens group and a 3-2 lens group. The 3-1 lens group is fixed when camera shake occurs and during focusing operations. The 3-2 lens group includes a shake preventing lens group that moves in a direction perpendicular to an optical axis to correct camera shake, and a focusing lens group provided toward an image side of the shake preventing lens group that moves along the optical axis during focusing operations.

19 Claims, 32 Drawing Sheets

FIG.1
EXAMPLE 1
WIDE ANGLE END
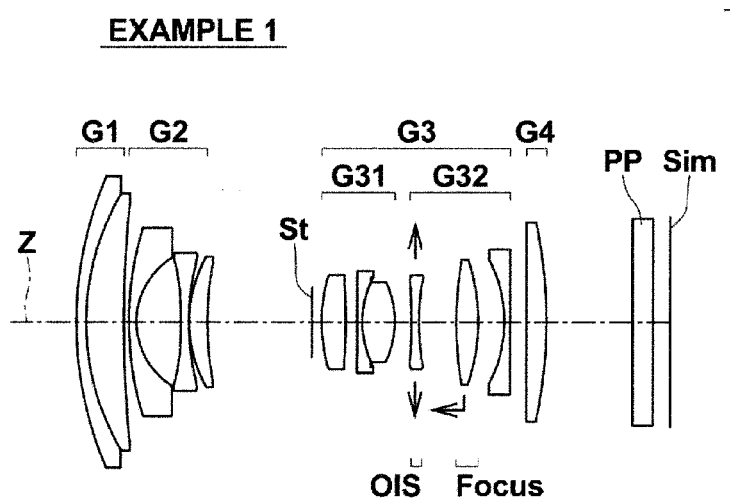
INTERMEDIATE
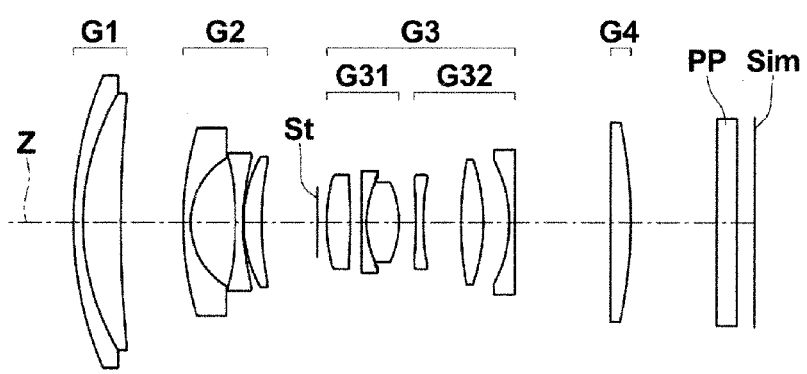
TELEPHOTO END
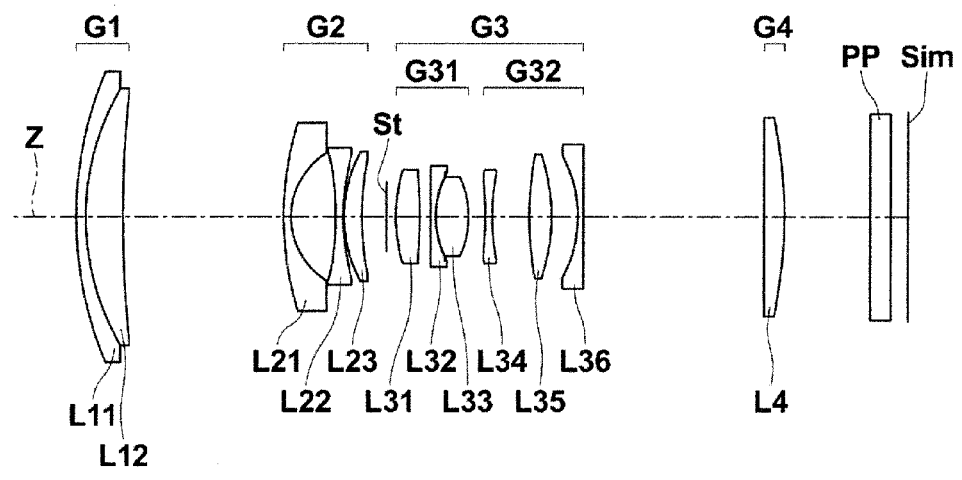

FIG.2
EXAMPLE 2
WIDE ANGLE END
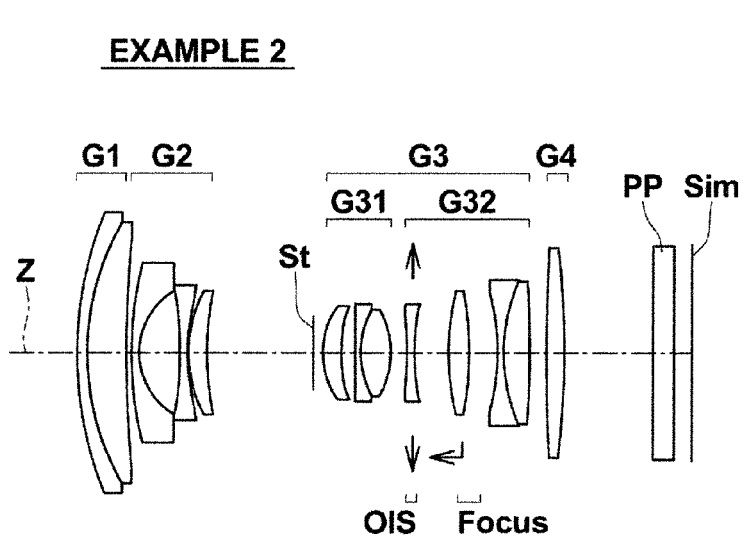
INTERMEDIATE
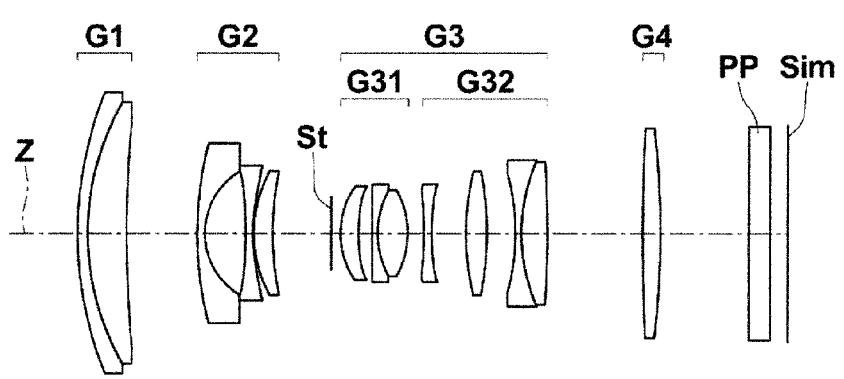
TELEPHOTO END
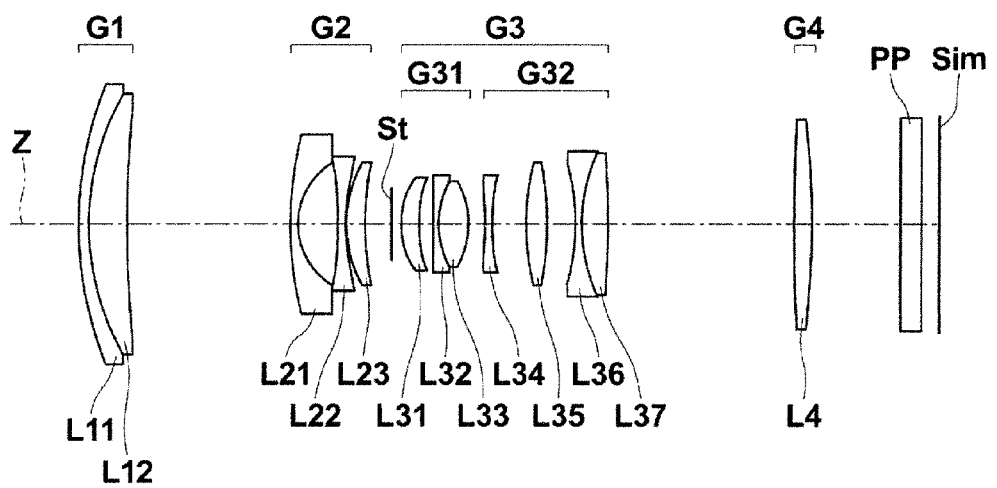

FIG.3
EXAMPLE 3
WIDE ANGLE END
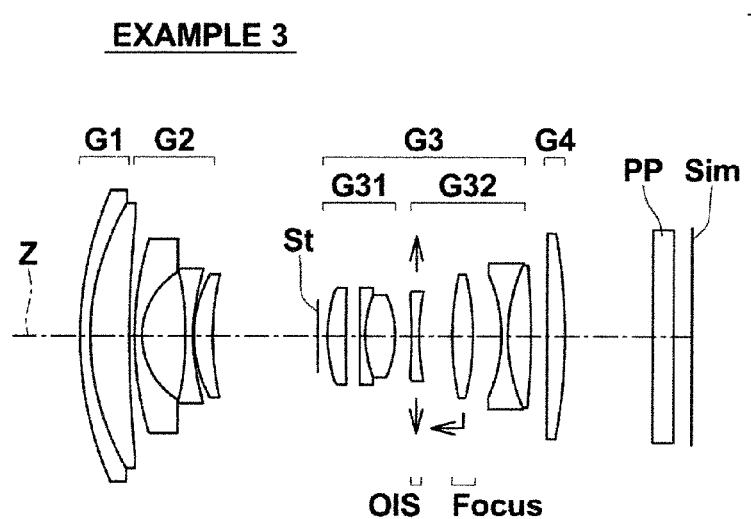
INTERMEDIATE
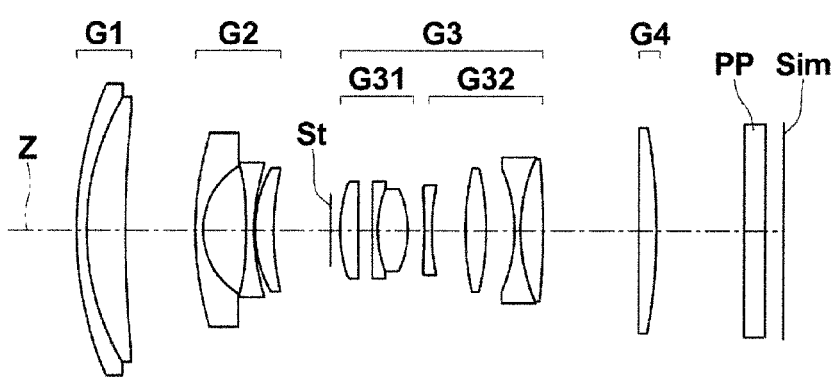
TELEPHOTO END
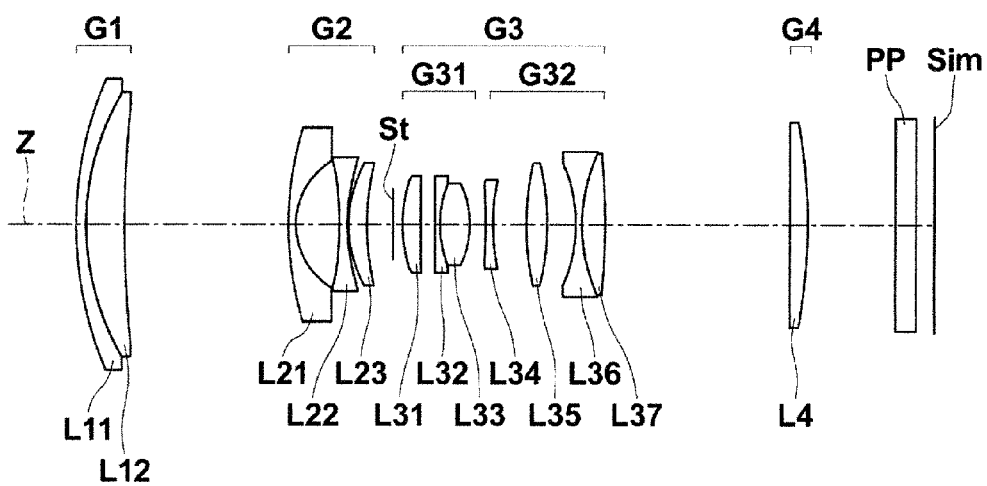

FIG.4
EXAMPLE 4
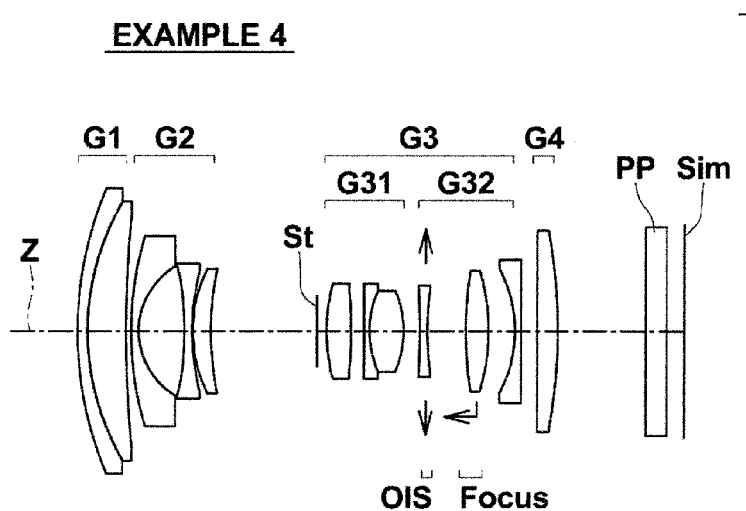
WIDE ANGLE END
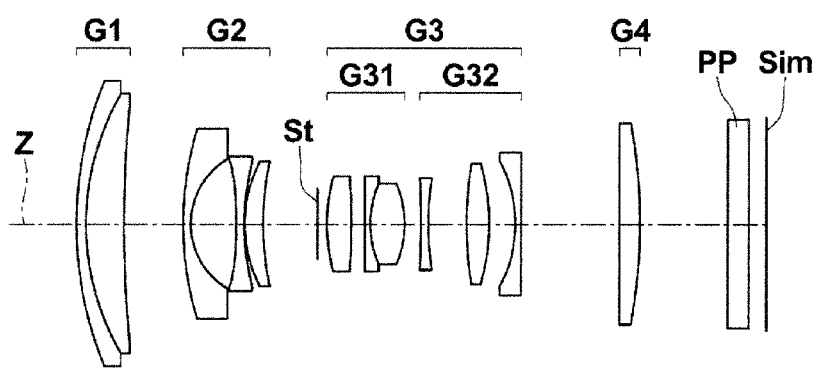
INTERMEDIATE
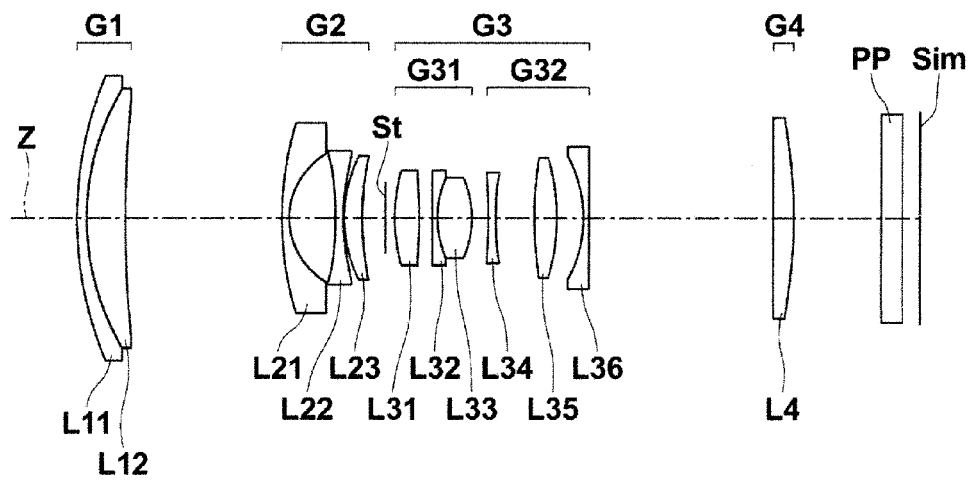
TELEPHOTO END

FIG.5
EXAMPLE 5
WIDE ANGLE END
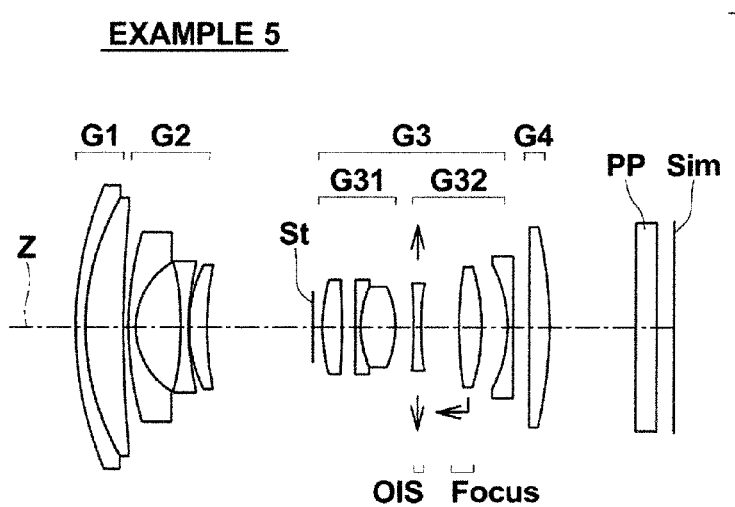
INTERMEDIATE
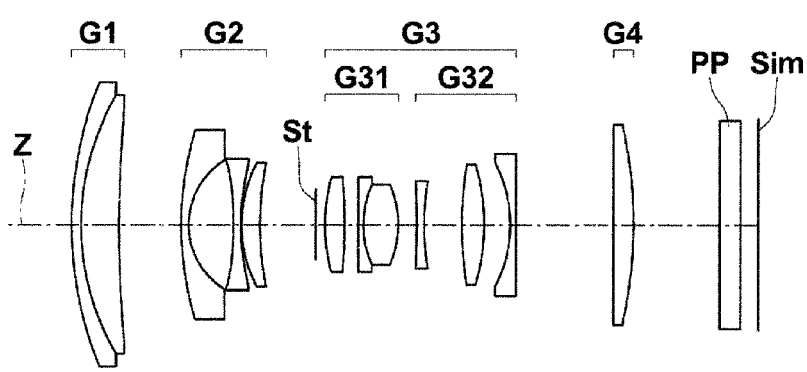
TELEPHOTO END
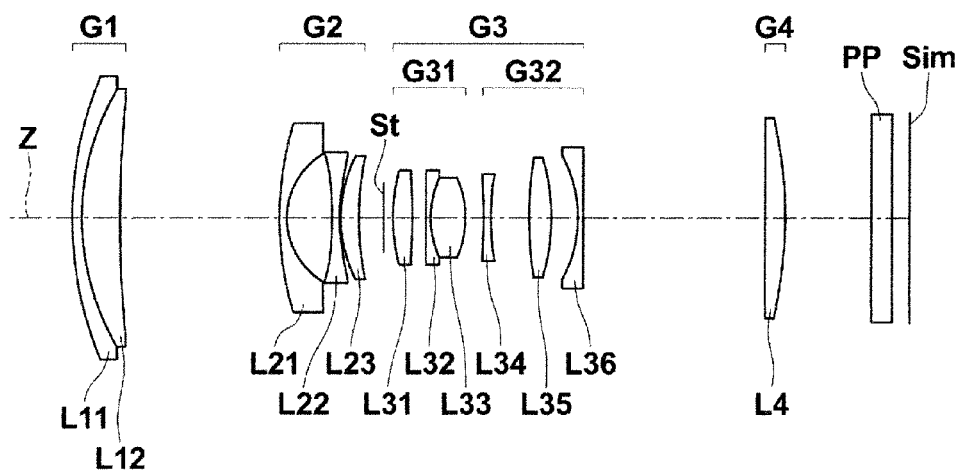

FIG.6
EXAMPLE 6
WIDE ANGLE END
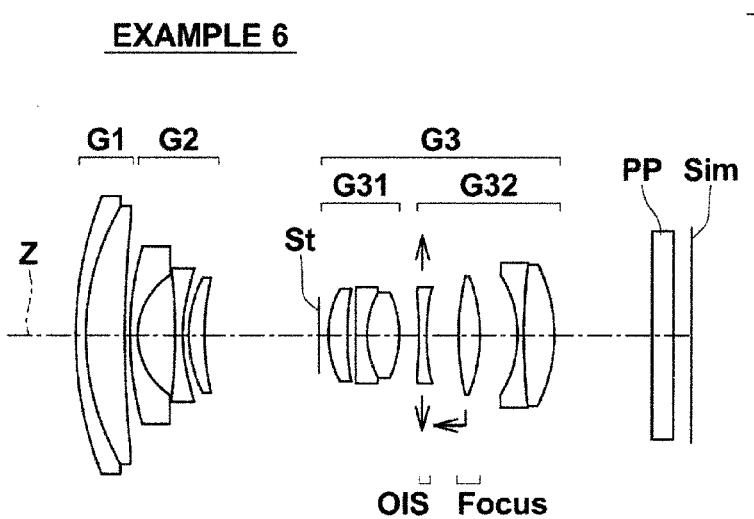
INTERMEDIATE
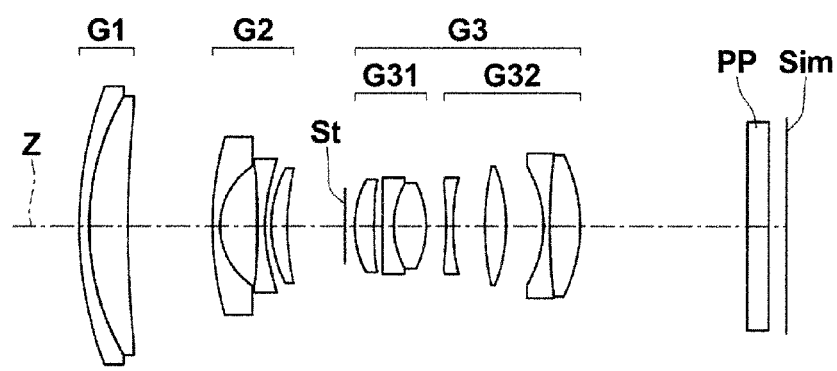
TELEPHOTO END
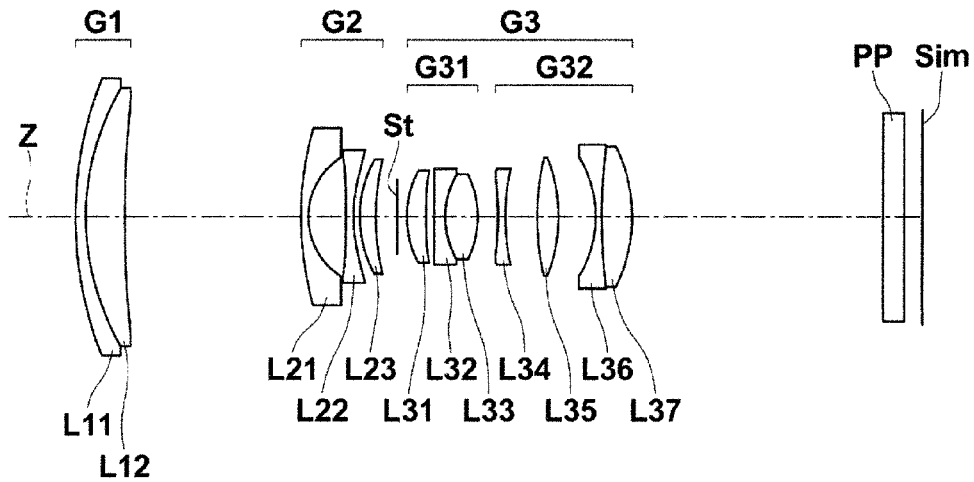

FIG.9
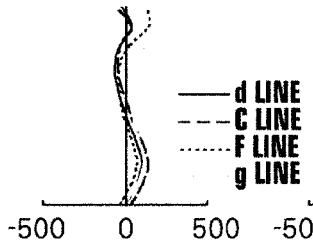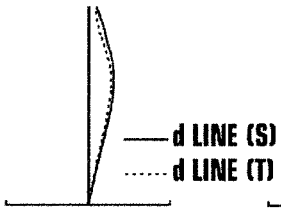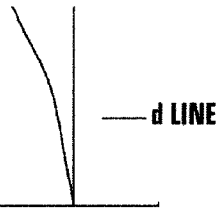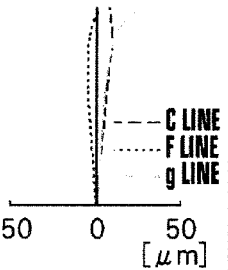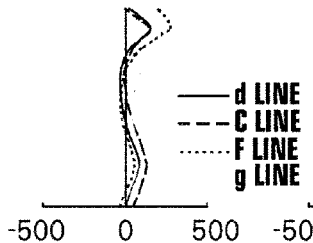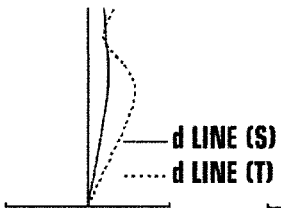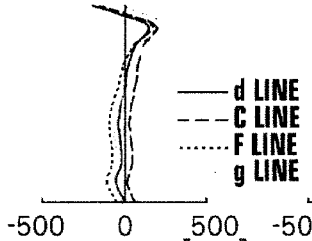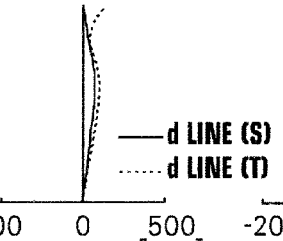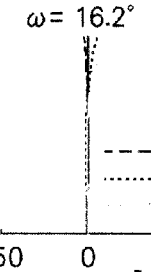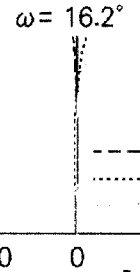

FIG. 14
EXAMPLE 1
WIDE ANGLE END
[WITHOUT CAMERA SHAKE CORRECTION]
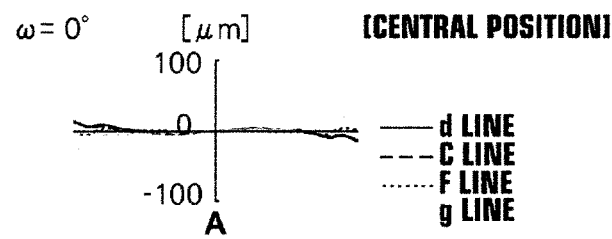
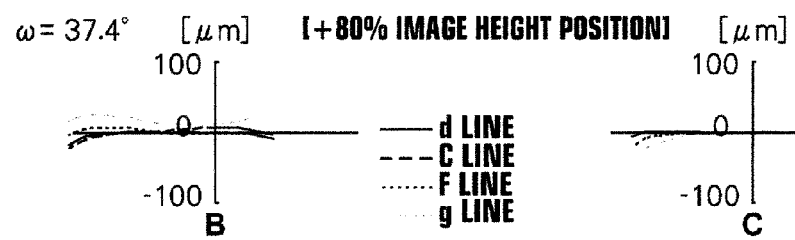 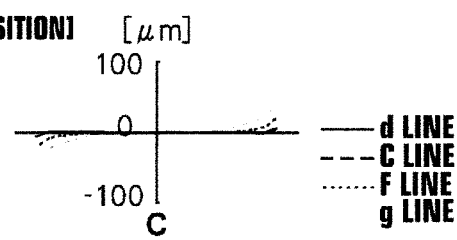
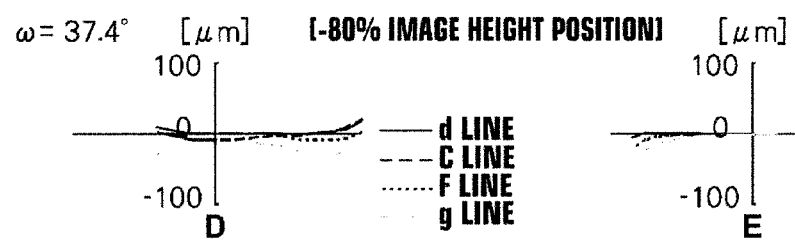 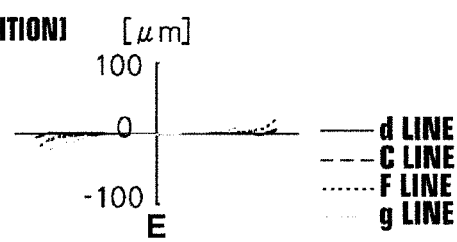
[WITH 0.3° CAMERA SHAKE CORRECTION]
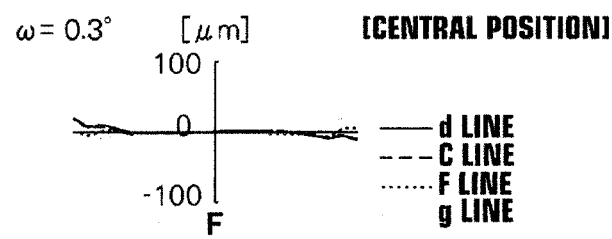
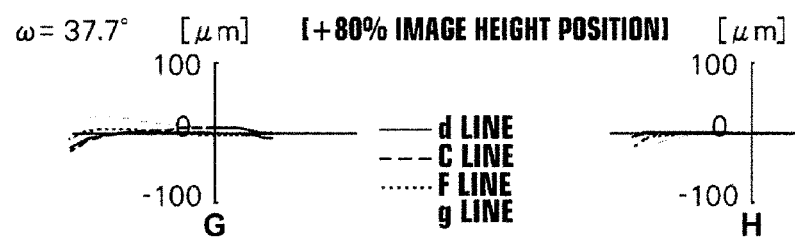 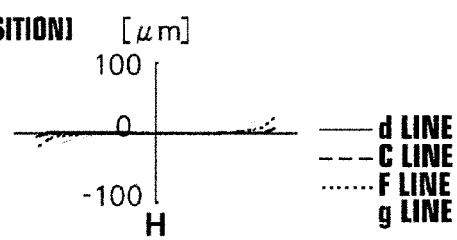
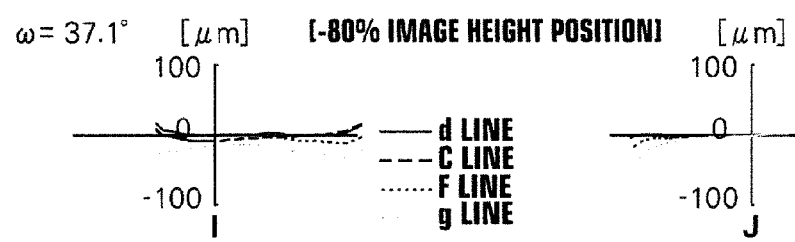 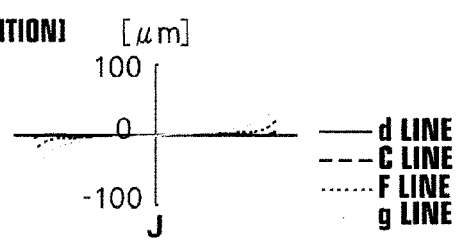

FIG.15
EXAMPLE 1
INTERMEDIATE
[WITHOUT CAMERA SHAKE CORRECTION]
ω = 0°  [μm]     [CENTRAL POSITION]
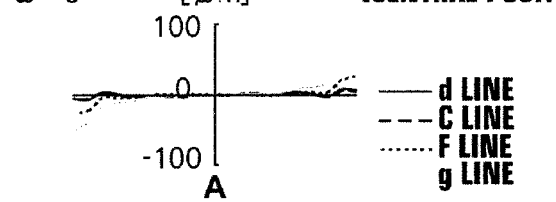
A — d LINE, C LINE, F LINE, g LINE
ω = 22.4°  [μm]   [+80% IMAGE HEIGHT POSITION]   [μm]
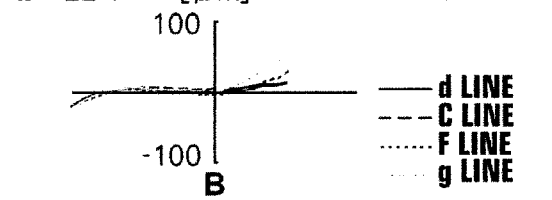 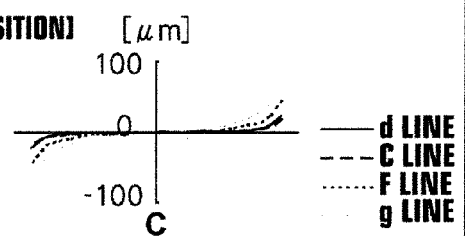
B                              C
ω = 22.4°  [μm]   [−80% IMAGE HEIGHT POSITION]   [μm]
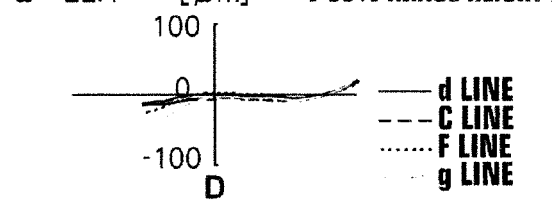 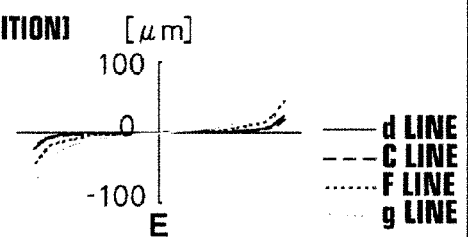
D                              E
[WITH 0.3° CAMERA SHAKE CORRECTION]
ω = 0.3°  [μm]     [CENTRAL POSITION]
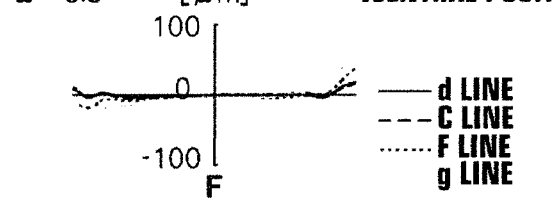
F
ω = 22.7°  [μm]   [+80% IMAGE HEIGHT POSITION]   [μm]
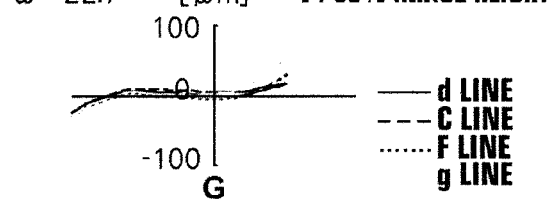 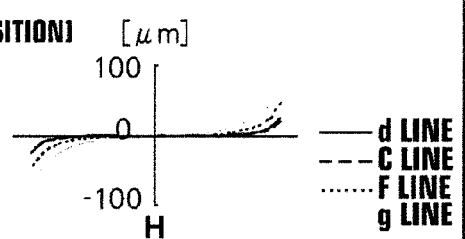
G                              H
ω = 22.1°  [μm]   [−80% IMAGE HEIGHT POSITION]   [μm]
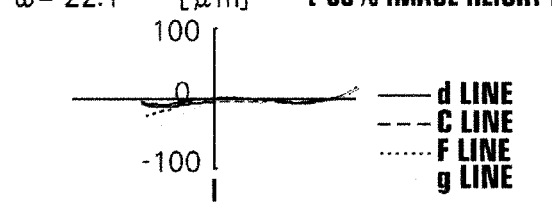 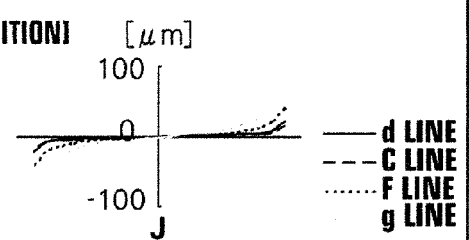
I                              J

FIG.16
TELEPHOTO END     <u>EXAMPLE 1</u>
[WITHOUT CAMERA SHAKE CORRECTION]
ω= 0°  [μm]  [CENTRAL POSITION]
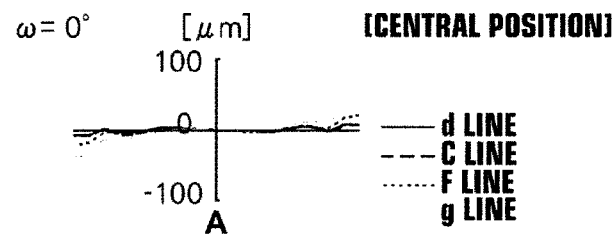
A
ω= 13.1°  [μm]  [+80% IMAGE HEIGHT POSITION]  [μm]
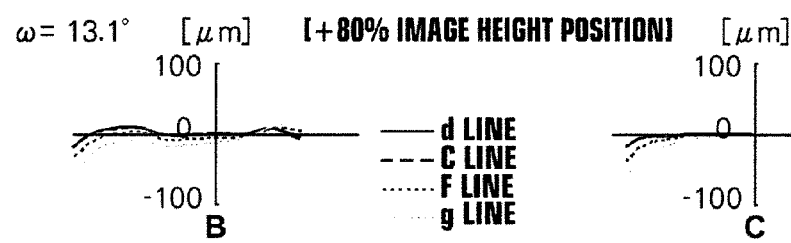 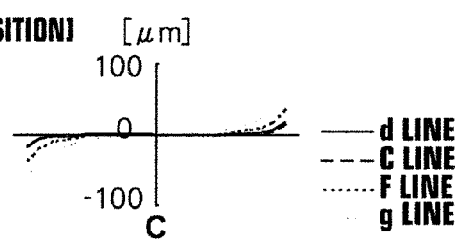
B                C
ω= 13.1°  [μm]  [-80% IMAGE HEIGHT POSITION]  [μm]
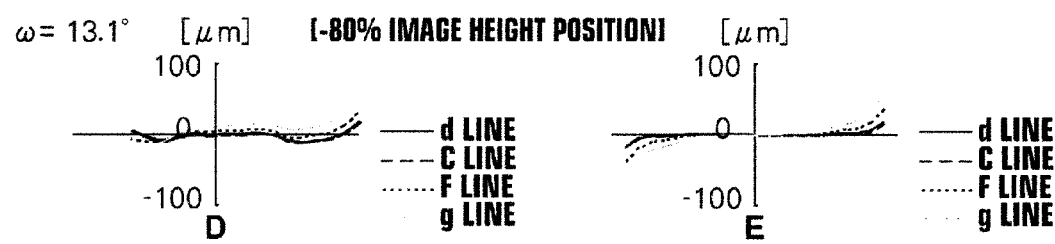 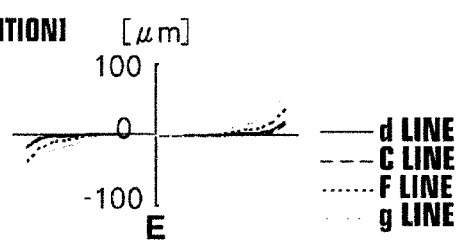
D                E
[WITH 0.3° CAMERA SHAKE CORRECTION]
ω= 0.3°  [μm]  [CENTRAL POSITION]
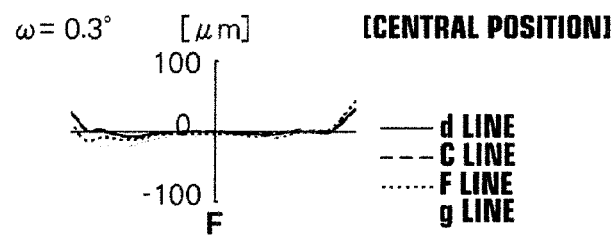
F
ω= 13.4°  [μm]  [+80% IMAGE HEIGHT POSITION]  [μm]
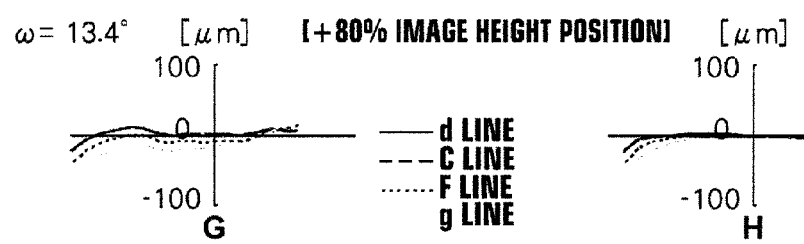 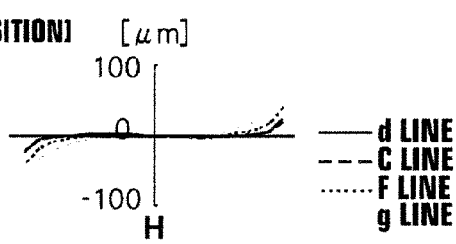
G                H
ω= 12.8°  [μm]  [-80% IMAGE HEIGHT POSITION]  [μm]
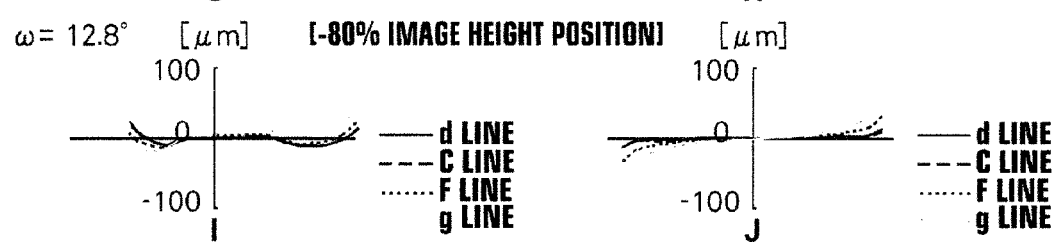 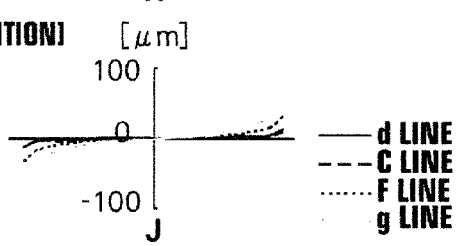
I                J

FIG.17
WIDE ANGLE END — EXAMPLE 2
[WITHOUT CAMERA SHAKE CORRECTION]
ω = 0°   [μm]   [CENTRAL POSITION]
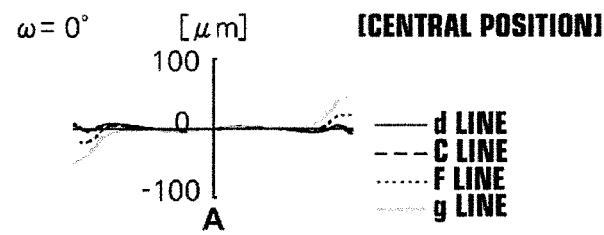
A
ω = 37.6°   [μm]   [+80% IMAGE HEIGHT POSITION]   [μm]
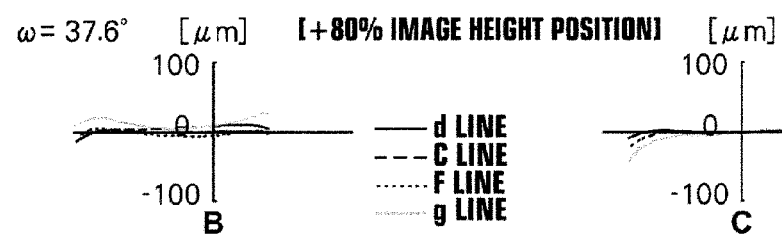 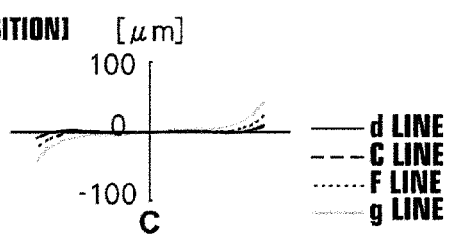
B   C
ω = 37.6°   [μm]   [-80% IMAGE HEIGHT POSITION]   [μm]
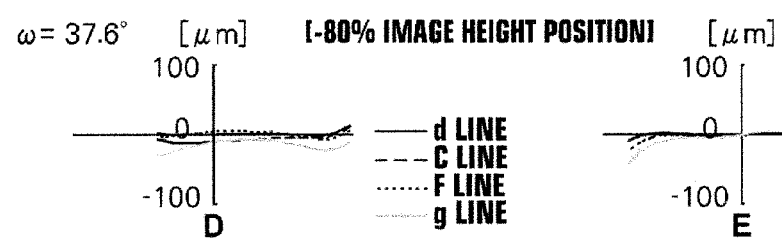 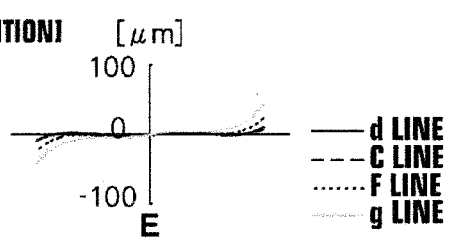
D   E
[WITH 0.3° CAMERA SHAKE CORRECTION]
ω = 0.3°   [μm]   [CENTRAL POSITION]
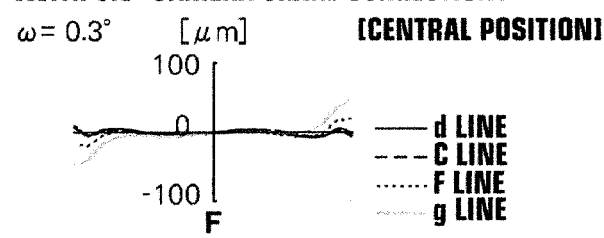
F
ω = 37.9°   [μm]   [+80% IMAGE HEIGHT POSITION]   [μm]
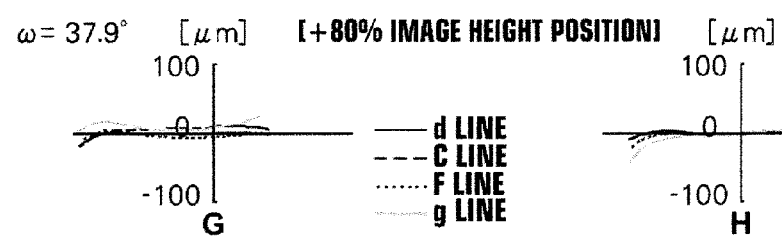 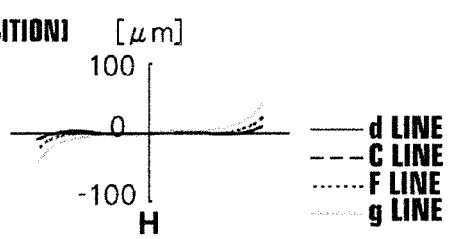
G   H
ω = 37.3°   [μm]   [-80% IMAGE HEIGHT POSITION]   [μm]
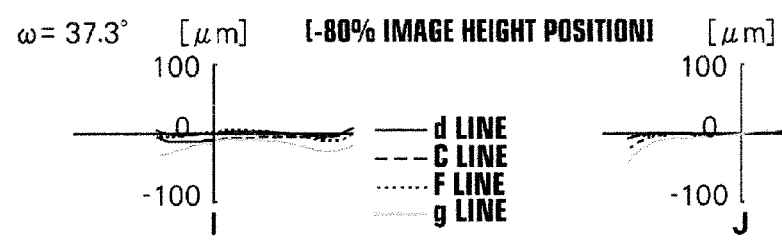 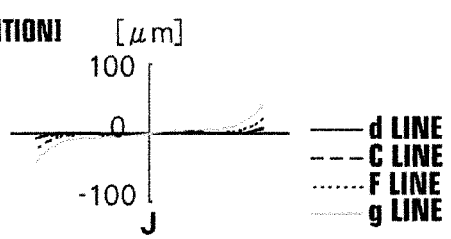
I   J

FIG.18

EXAMPLE 2

INTERMEDIATE

[WITHOUT CAMERA SHAKE CORRECTION]

$\omega = 0°$ [μm]　　　　[CENTRAL POSITION]

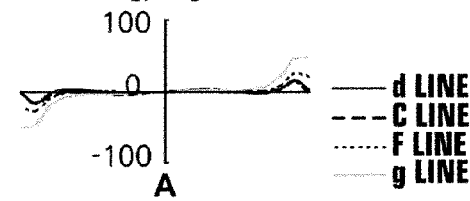
A
— d LINE
--- C LINE
······ F LINE
— g LINE $\omega = 22.4°$ [μm]　[+80% IMAGE HEIGHT POSITION]　[μm]

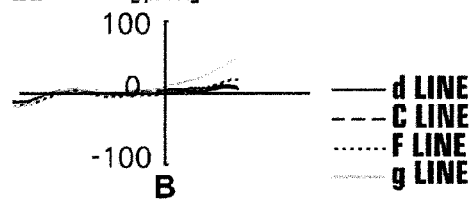 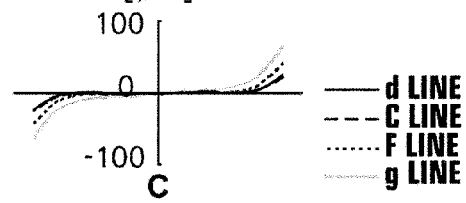
B　　　　　　　　　　　　　　C $\omega = 22.4°$ [μm]　[-80% IMAGE HEIGHT POSITION]　[μm]

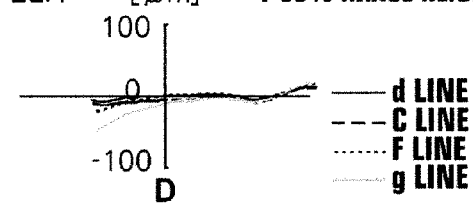 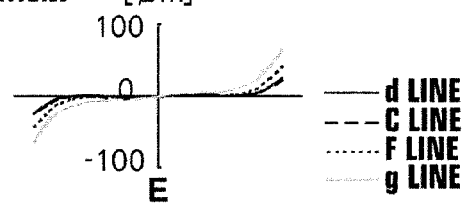
D　　　　　　　　　　　　　　E

[WITH 0.3° CAMERA SHAKE CORRECTION]

$\omega = 0.3°$ [μm]　　　　[CENTRAL POSITION]

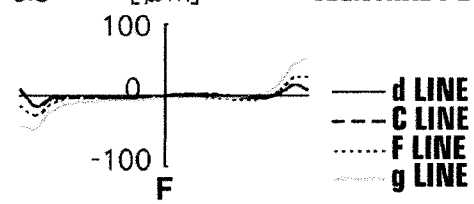
F $\omega = 22.7°$ [μm]　[+80% IMAGE HEIGHT POSITION]　[μm]

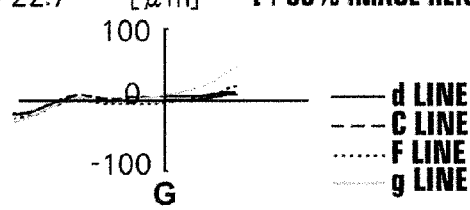 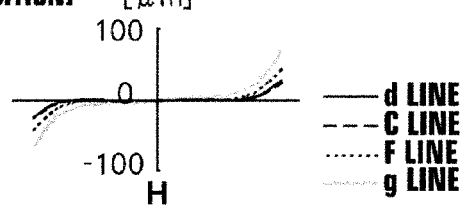
G　　　　　　　　　　　　　　H $\omega = 22.1°$ [μm]　[-80% IMAGE HEIGHT POSITION]　[μm]

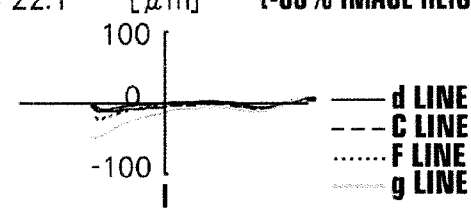 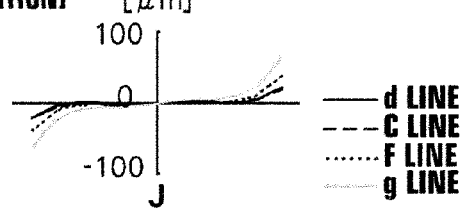
I　　　　　　　　　　　　　　J

FIG.19
EXAMPLE 2
TELEPHOTO END
[WITHOUT CAMERA SHAKE CORRECTION]
ω = 0°  [μm]  [CENTRAL POSITION]
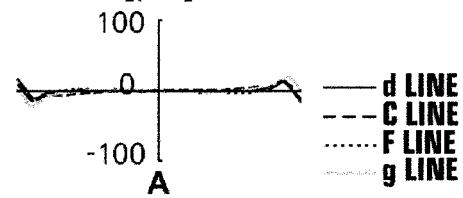
A
ω = 13.1°  [μm]  [+80% IMAGE HEIGHT POSITION]  [μm]
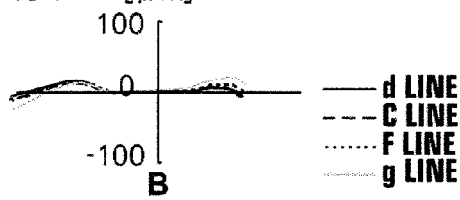
B
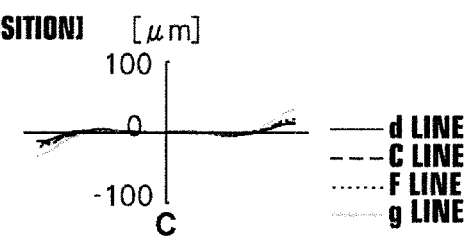
C
ω = 13.1°  [μm]  [-80% IMAGE HEIGHT POSITION]  [μm]
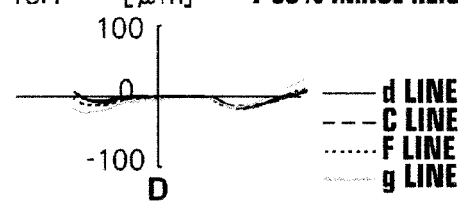
D
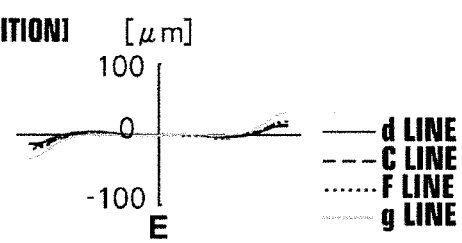
E
[WITH 0.3° CAMERA SHAKE CORRECTION]
ω = 0.3°  [μm]  [CENTRAL POSITION]
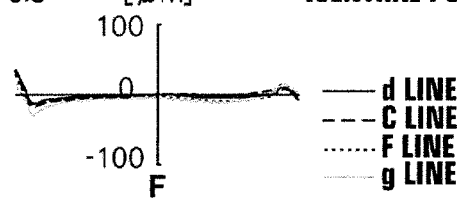
F
ω = 13.4°  [μm]  [+80% IMAGE HEIGHT POSITION]  [μm]
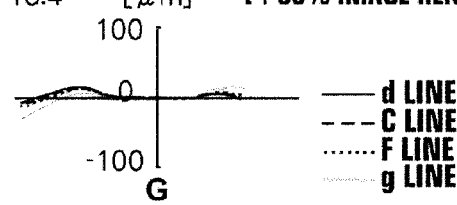
G
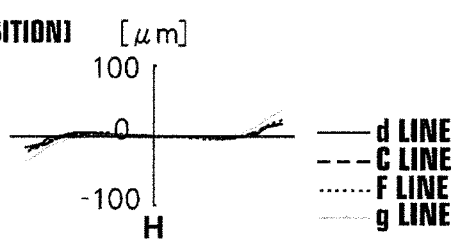
H
ω = 12.8°  [μm]  [-80% IMAGE HEIGHT POSITION]  [μm]
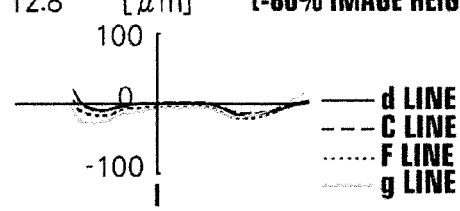
I
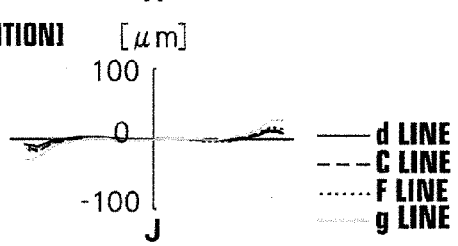
J

FIG.20
WIDE ANGLE END     EXAMPLE 3
[WITHOUT CAMERA SHAKE CORRECTION]
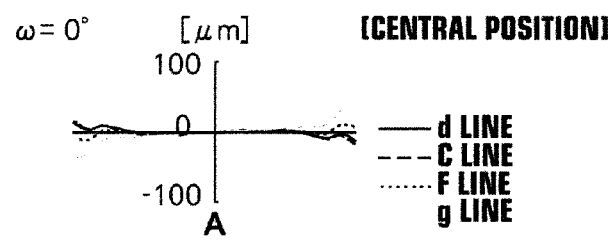
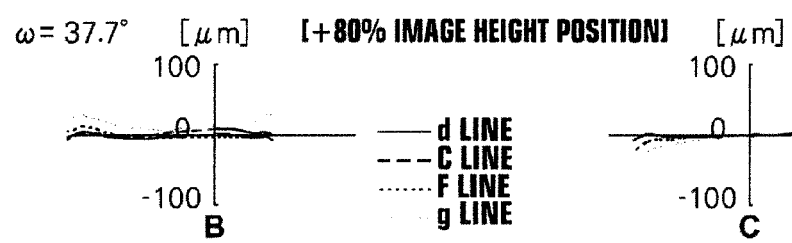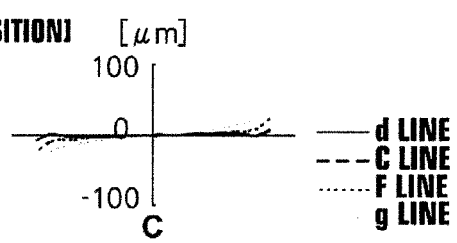
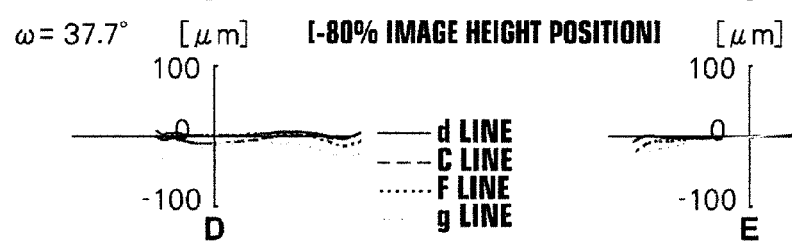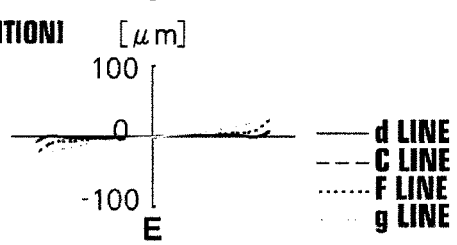
[WITH 0.3° CAMERA SHAKE CORRECTION]
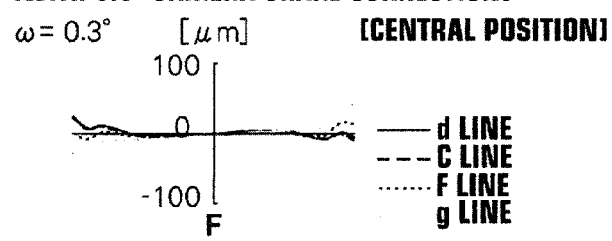
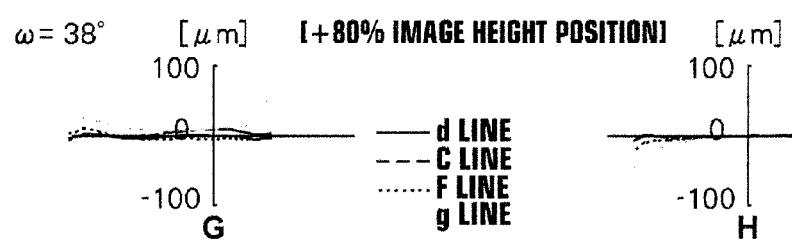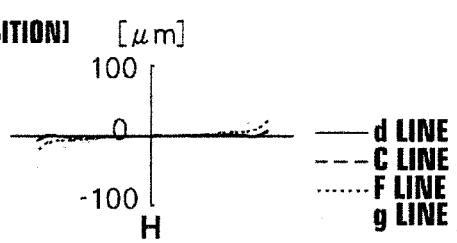
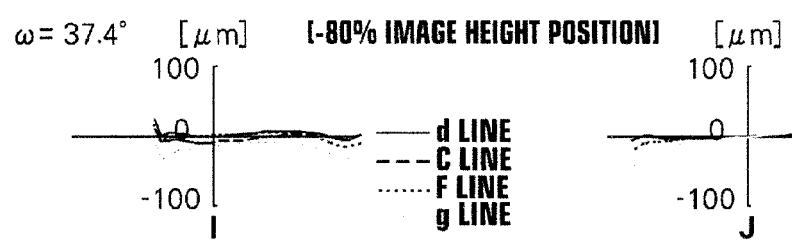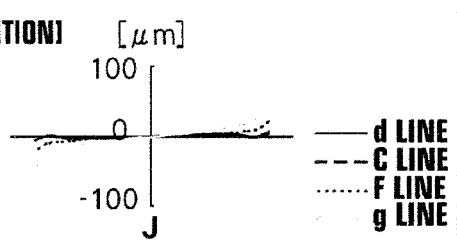

FIG.21
EXAMPLE 3
INTERMEDIATE
[WITHOUT CAMERA SHAKE CORRECTION]
$\omega = 0°$ [μm]      [CENTRAL POSITION]
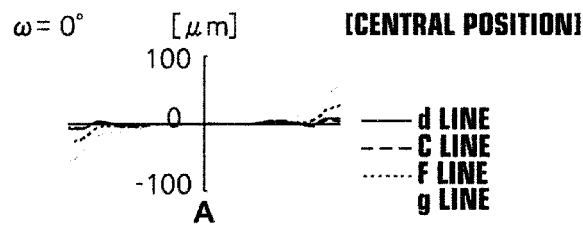
A
$\omega = 22.5°$ [μm]    [+80% IMAGE HEIGHT POSITION]   [μm]
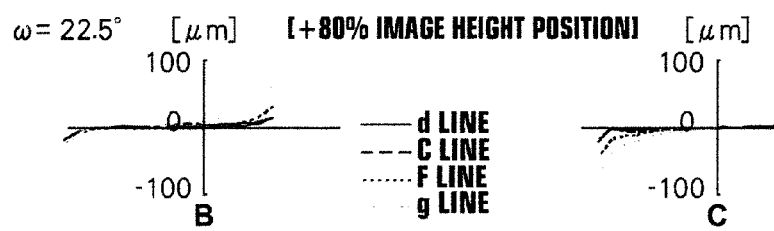 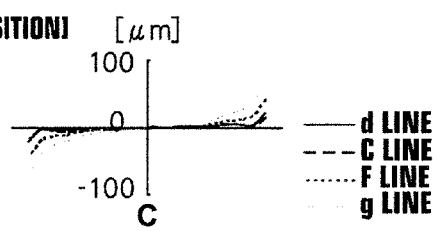
B            C
$\omega = 22.5°$ [μm]    [−80% IMAGE HEIGHT POSITION]   [μm]
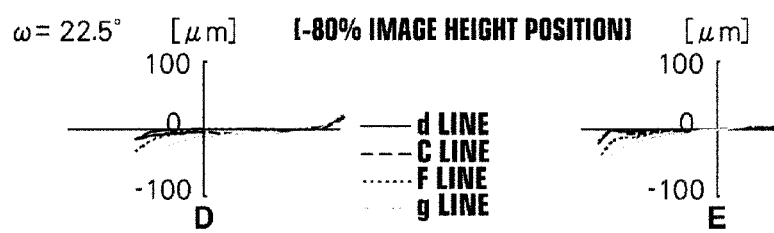 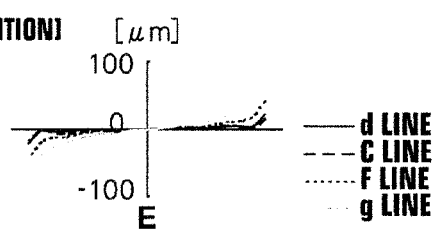
D            E
[WITH 0.3° CAMERA SHAKE CORRECTION]
$\omega = 0.3°$ [μm]      [CENTRAL POSITION]
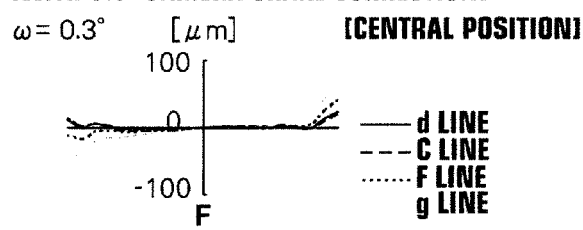
F
$\omega = 22.8°$ [μm]    [+80% IMAGE HEIGHT POSITION]   [μm]
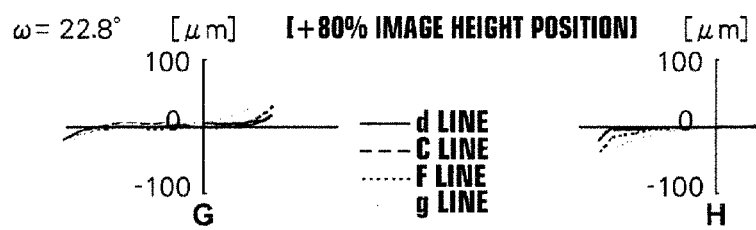 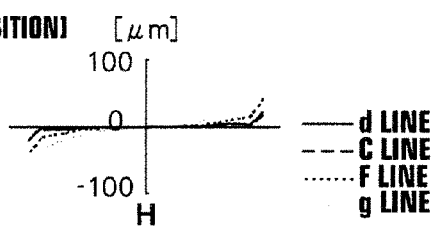
G            H
$\omega = 22.2°$ [μm]    [−80% IMAGE HEIGHT POSITION]   [μm]
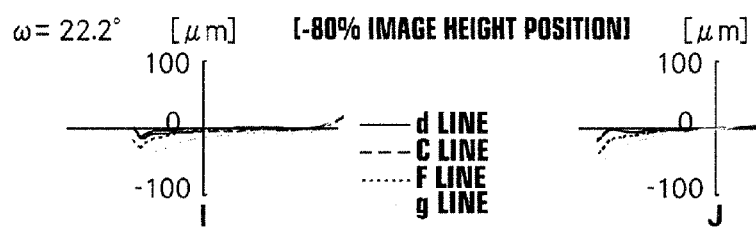 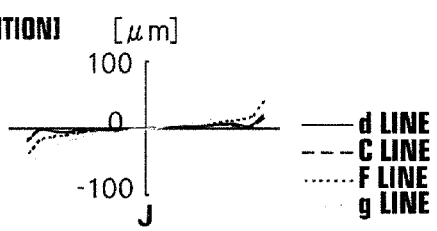
I            J

FIG.22
TELEPHOTO END  EXAMPLE 3
[WITHOUT CAMERA SHAKE CORRECTION]
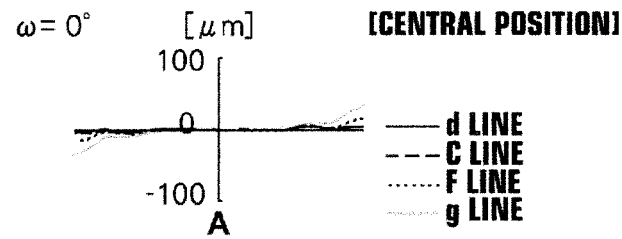
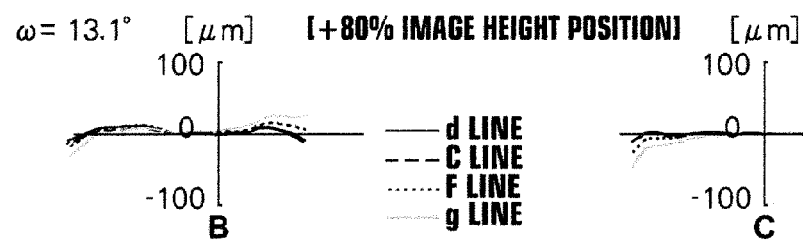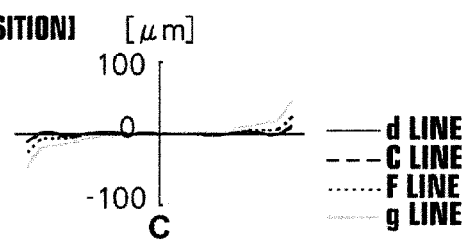
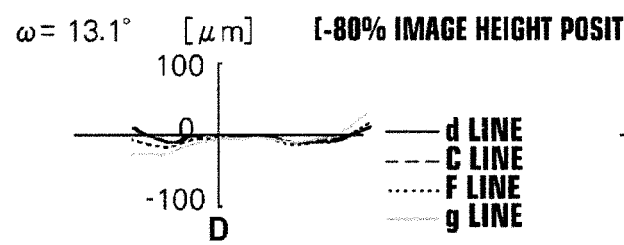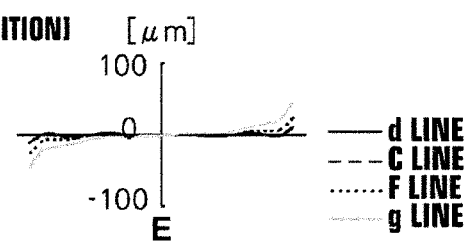
[WITH 0.3° CAMERA SHAKE CORRECTION]
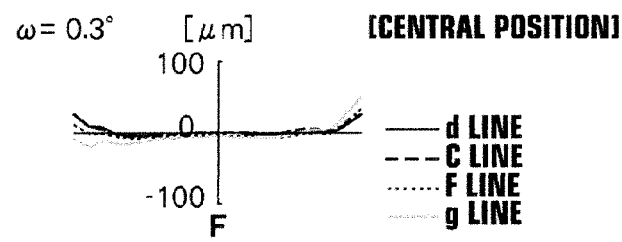
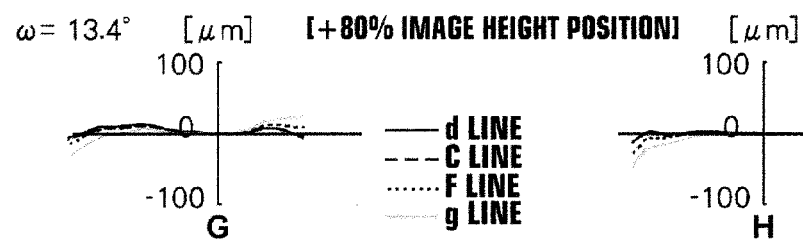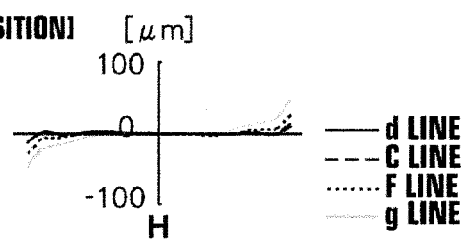
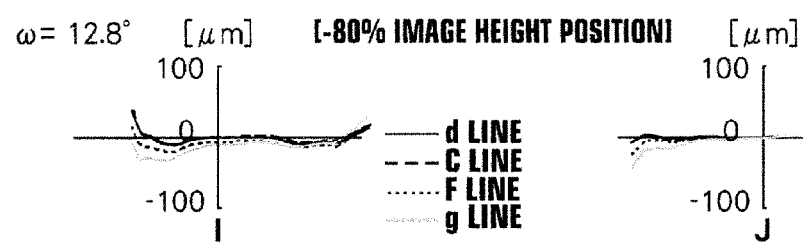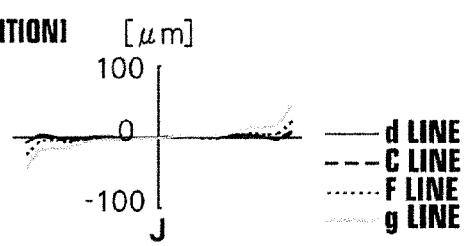

FIG.23
WIDE ANGLE END     <u>EXAMPLE 4</u>
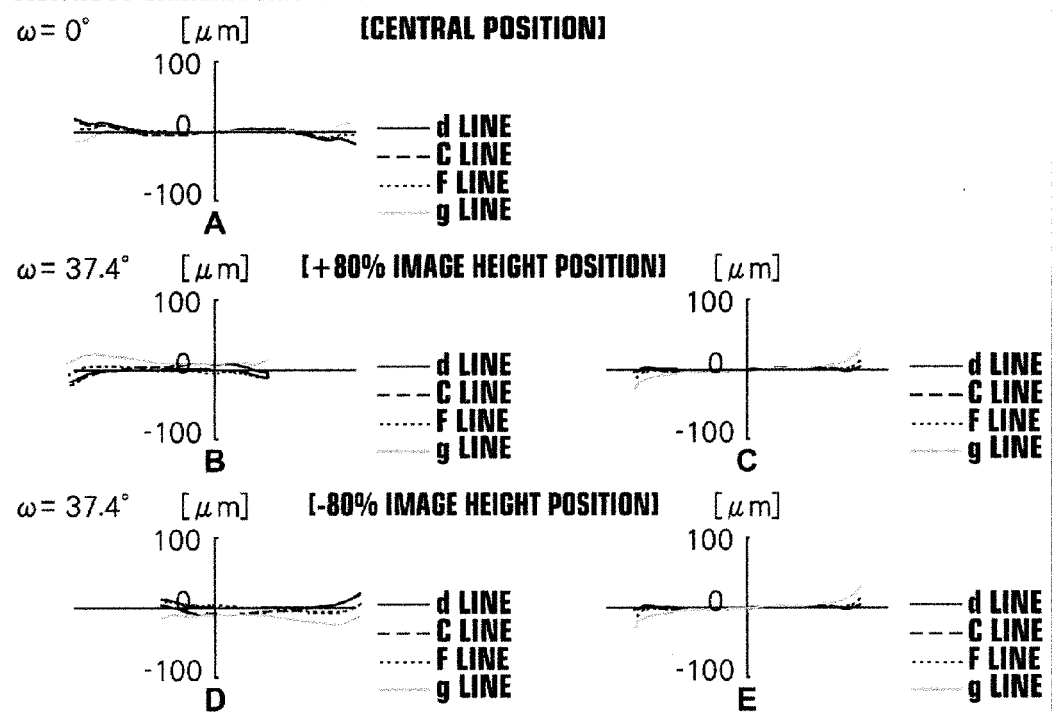
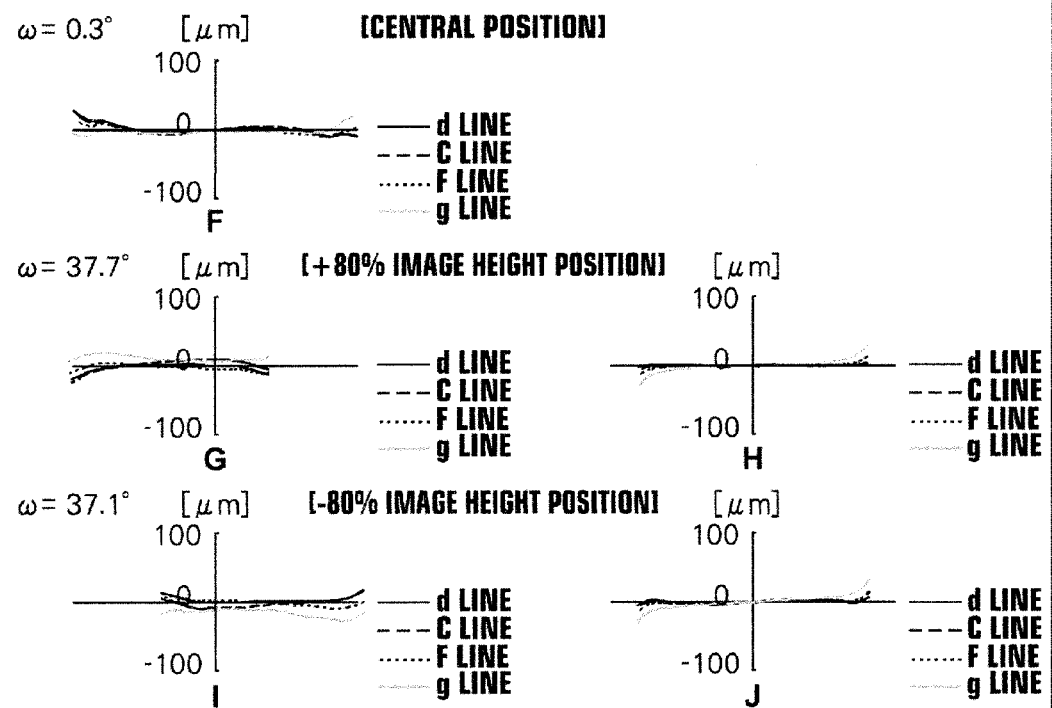

FIG.24
EXAMPLE 4
INTERMEDIATE
[WITHOUT CAMERA SHAKE CORRECTION]
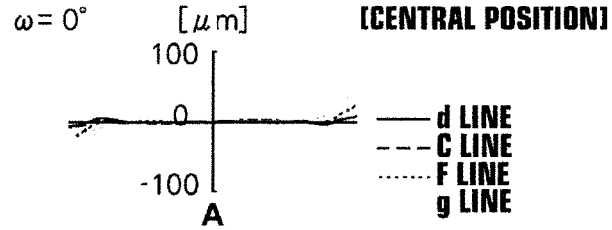
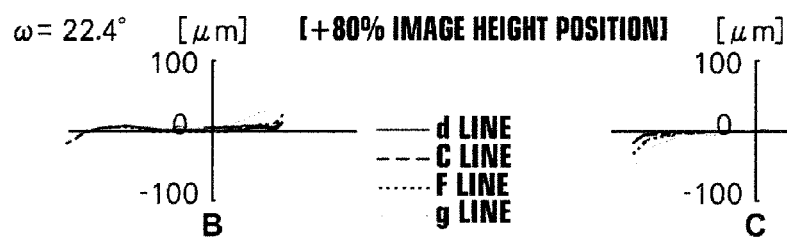
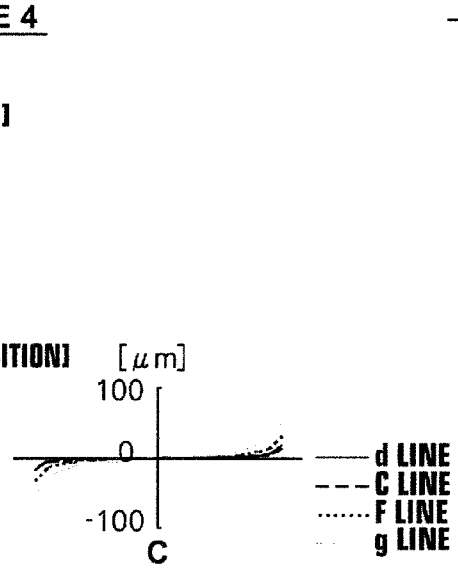
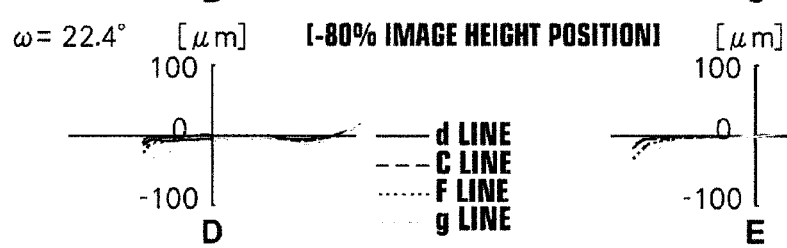
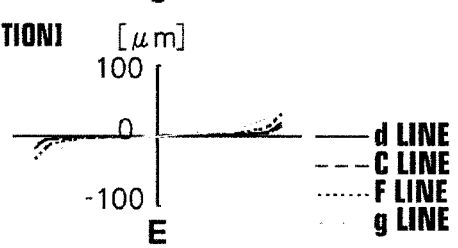
[WITH 0.3° CAMERA SHAKE CORRECTION]
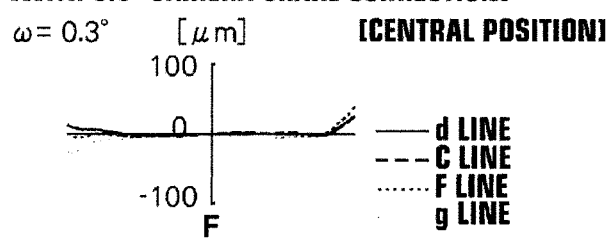
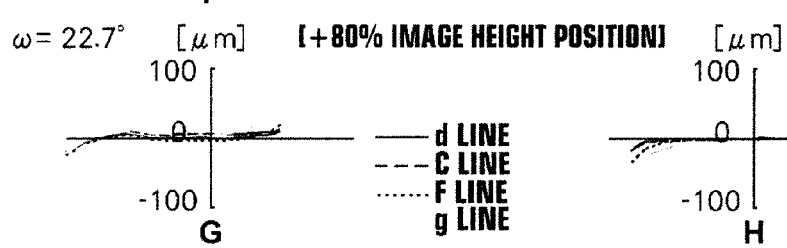
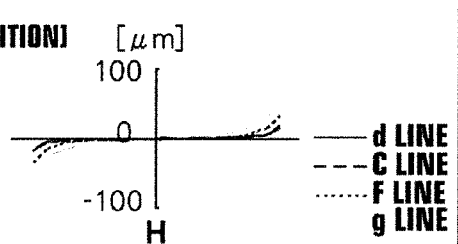
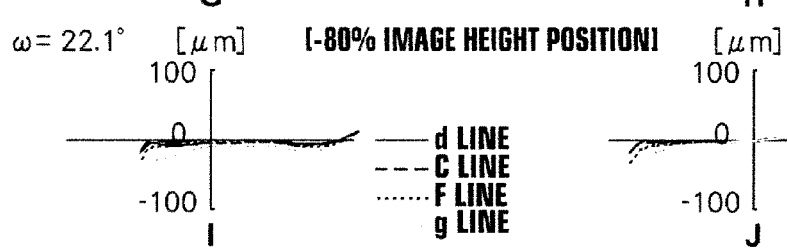
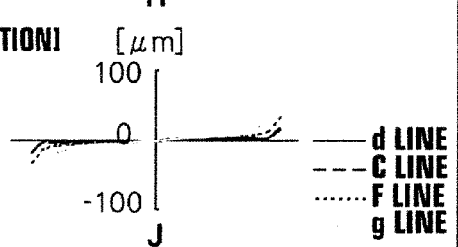

FIG.25
TELEPHOTO END — EXAMPLE 4
[WITHOUT CAMERA SHAKE CORRECTION]
ω = 0°  [μm]  [CENTRAL POSITION]
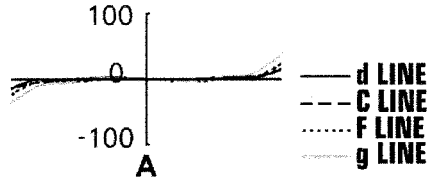
A
ω = 13.1°  [μm]  [+80% IMAGE HEIGHT POSITION]  [μm]
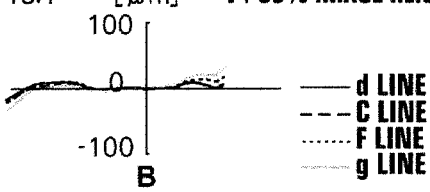 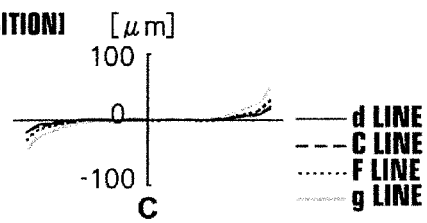
B  C
ω = 13.1°  [μm]  [-80% IMAGE HEIGHT POSITION]  [μm]
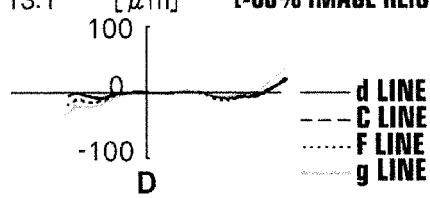 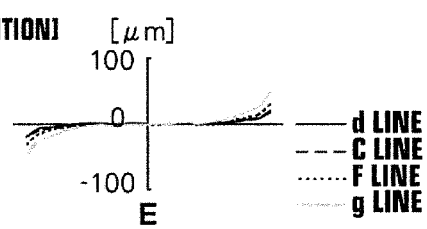
D  E
[WITH 0.3° CAMERA SHAKE CORRECTION]
ω = 0.3°  [μm]  [CENTRAL POSITION]
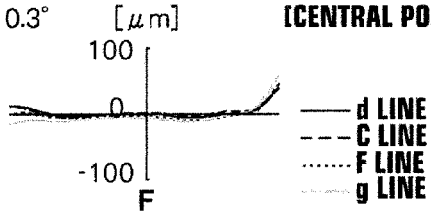
F
ω = 13.4°  [μm]  [+80% IMAGE HEIGHT POSITION]  [μm]
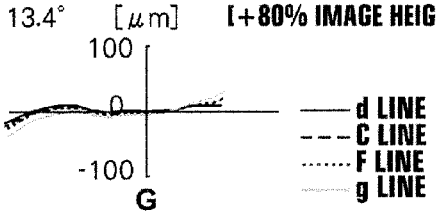 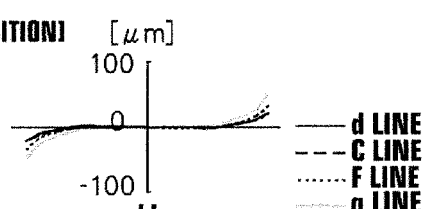
G  H
ω = 12.8°  [μm]  [-80% IMAGE HEIGHT POSITION]  [μm]
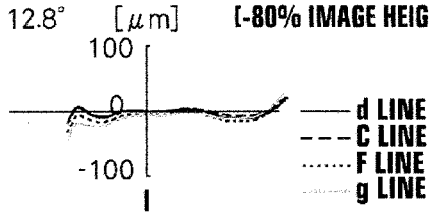 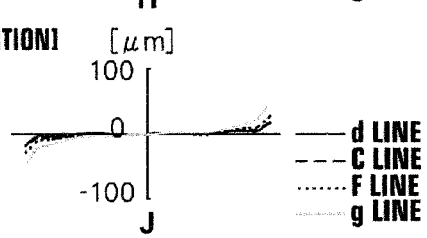
I  J

FIG.26
EXAMPLE 5
WIDE ANGLE END
[WITHOUT CAMERA SHAKE CORRECTION]
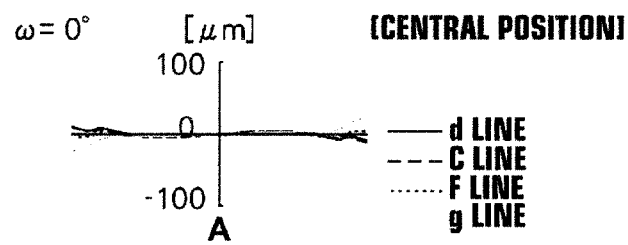
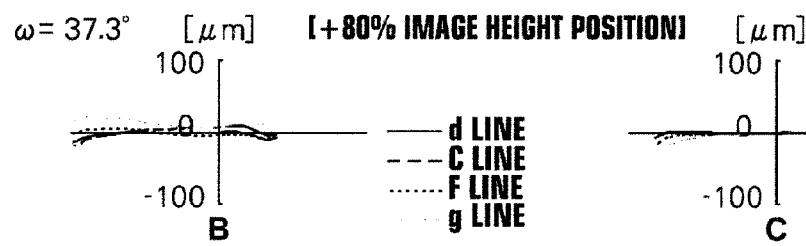 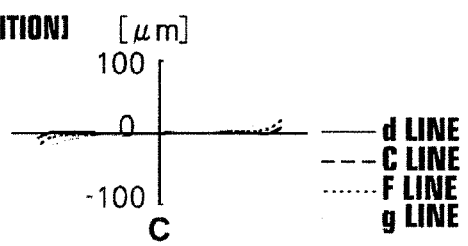
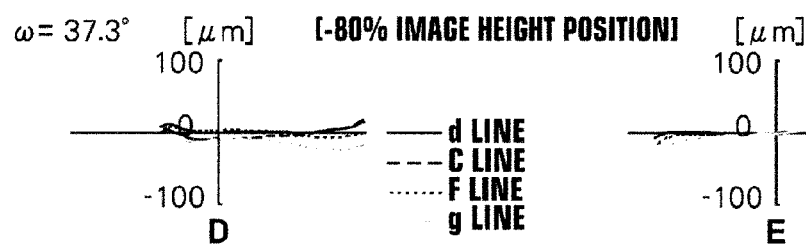 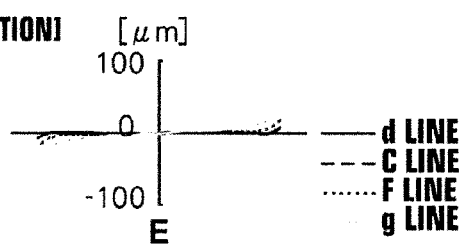
[WITH 0.3° CAMERA SHAKE CORRECTION]
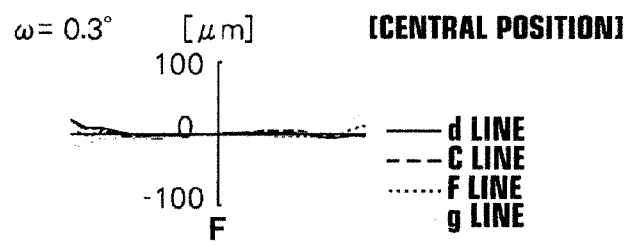
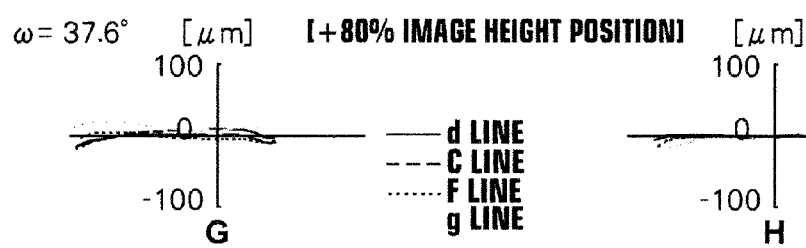 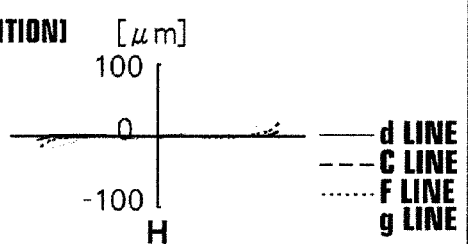
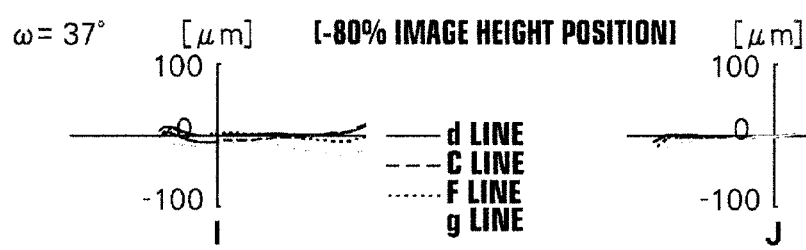 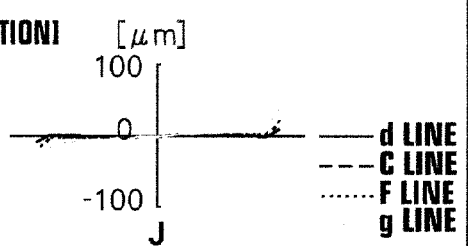

FIG.27
EXAMPLE 5
INTERMEDIATE
[WITHOUT CAMERA SHAKE CORRECTION]
ω= 0°   [μm]   [CENTRAL POSITION]
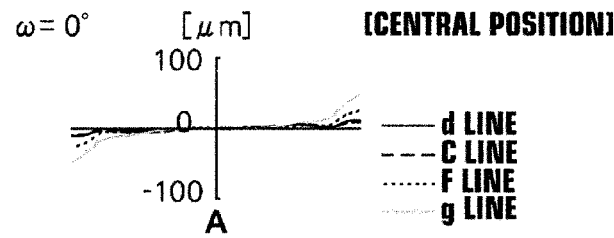
A
ω= 22.4°   [μm]   [+80% IMAGE HEIGHT POSITION]   [μm]
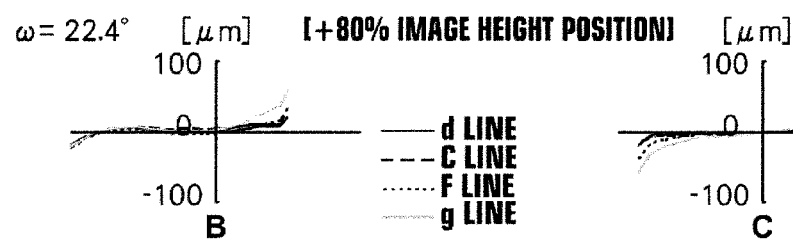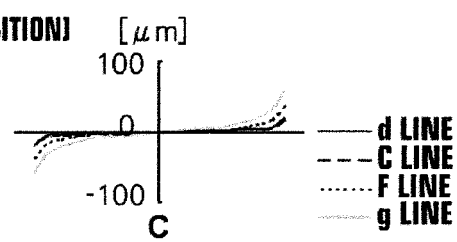
B    C
ω= 22.4°   [μm]   [-80% IMAGE HEIGHT POSITION]   [μm]
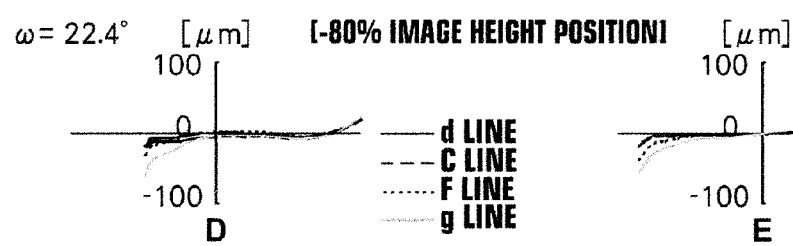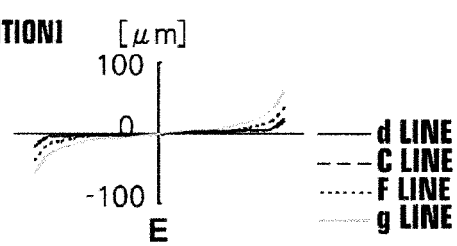
D    E
[WITH 0.3° CAMERA SHAKE CORRECTION]
ω= 0.3°   [μm]   [CENTRAL POSITION]
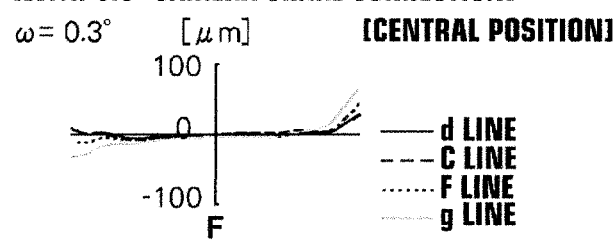
F
ω= 22.7°   [μm]   [+80% IMAGE HEIGHT POSITION]   [μm]
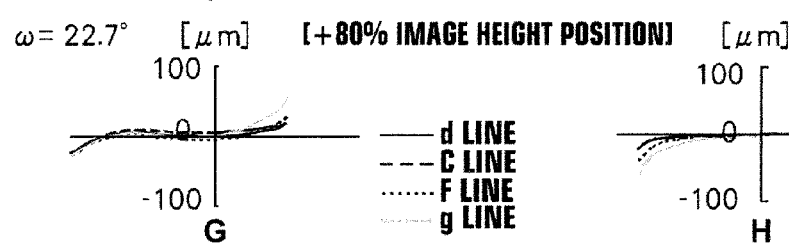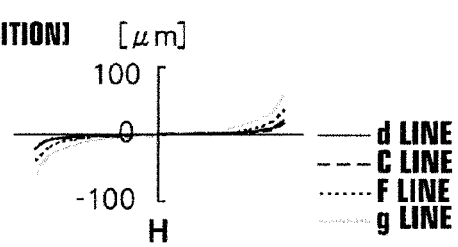
G    H
ω= 22.1°   [μm]   [-80% IMAGE HEIGHT POSITION]   [μm]
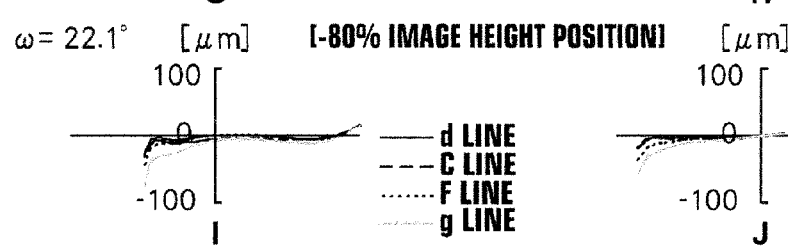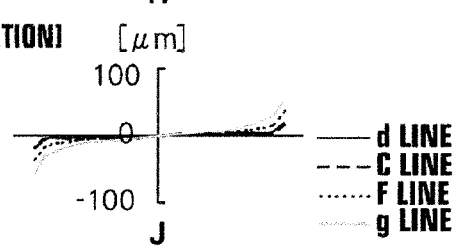
I    J

FIG.28
TELEPHOTO END     <u>EXAMPLE 5</u>
[WITHOUT CAMERA SHAKE CORRECTION]
ω = 0°   [μm]     [CENTRAL POSITION]
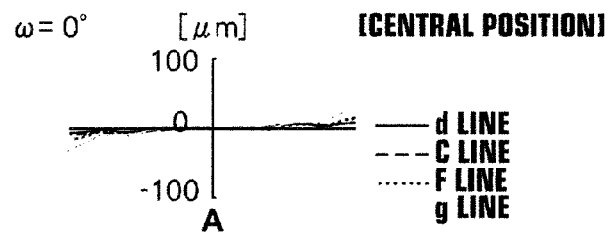
A
ω = 13.1°   [μm]   [+80% IMAGE HEIGHT POSITION]   [μm]
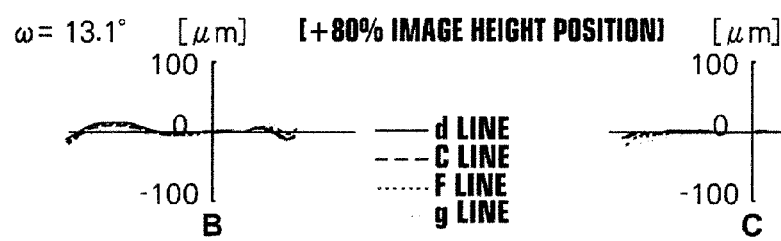 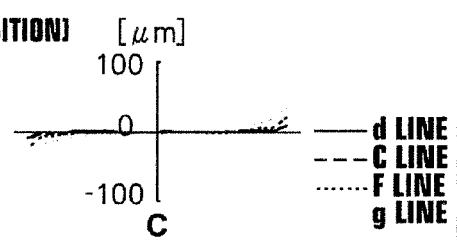
B                     C
ω = 13.1°   [μm]   [−80% IMAGE HEIGHT POSITION]   [μm]
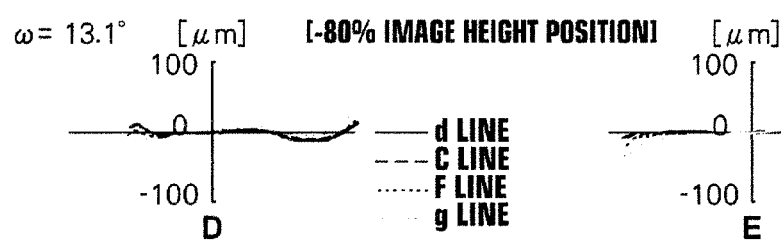 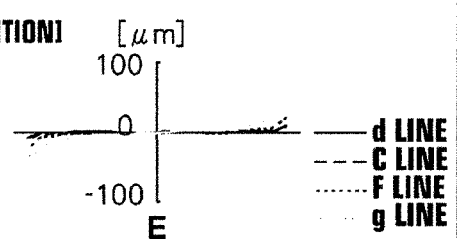
D                     E
[WITH 0.3° CAMERA SHAKE CORRECTION]
ω = 0.3°   [μm]     [CENTRAL POSITION]
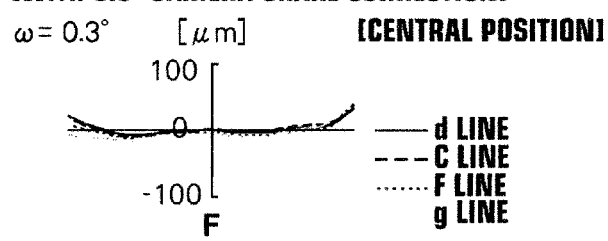
F
ω = 13.4°   [μm]   [+80% IMAGE HEIGHT POSITION]   [μm]
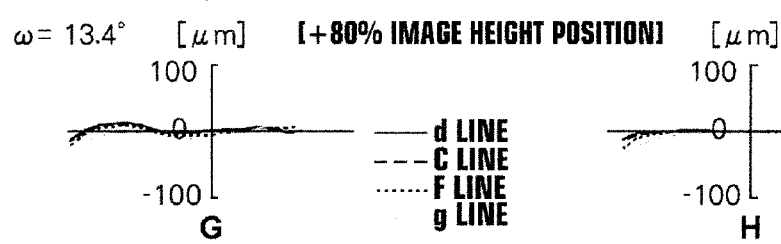 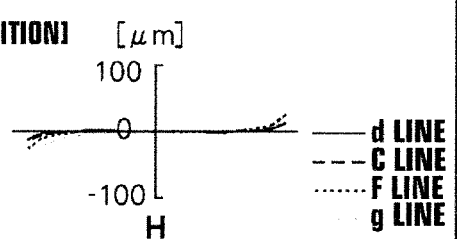
G                     H
ω = 12.8°   [μm]   [−80% IMAGE HEIGHT POSITION]   [μm]
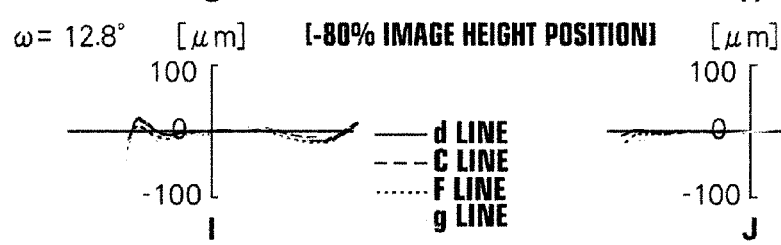 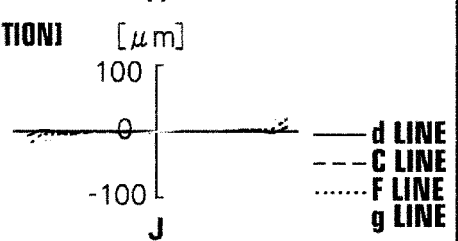
I                     J

FIG.29
EXAMPLE 6
WIDE ANGLE END
[WITHOUT CAMERA SHAKE CORRECTION]
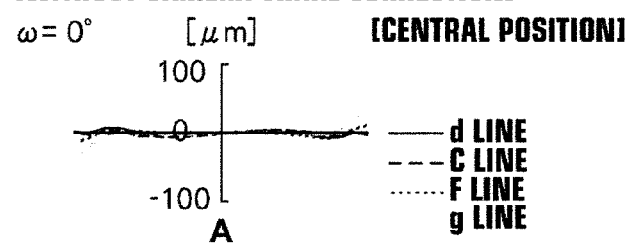
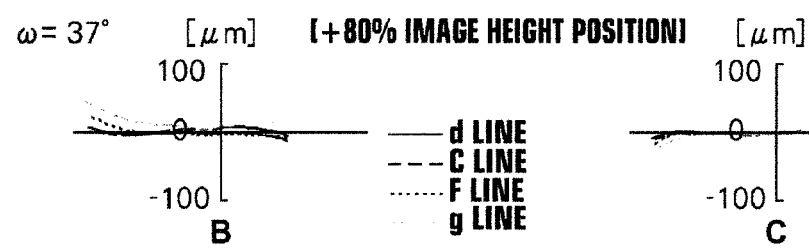
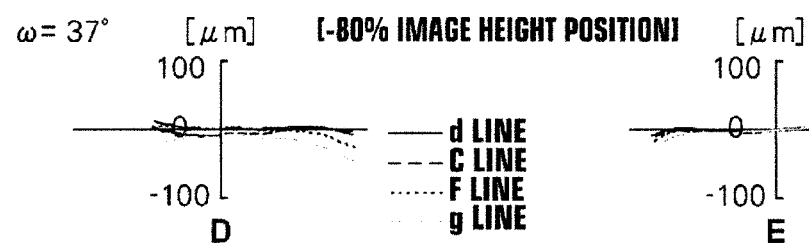
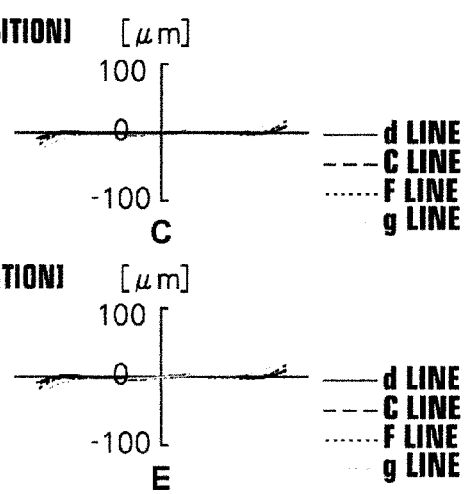
[WITH 0.3° CAMERA SHAKE CORRECTION]
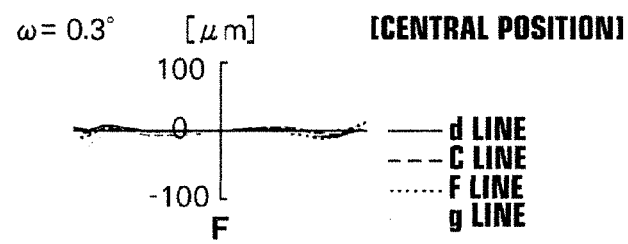
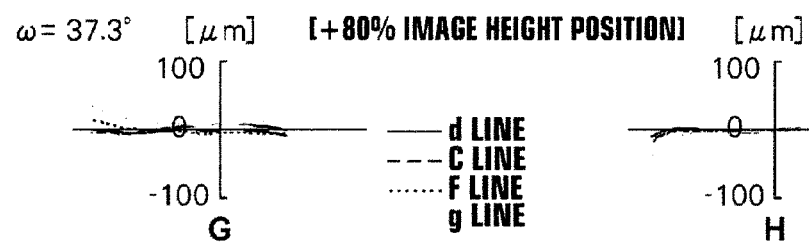
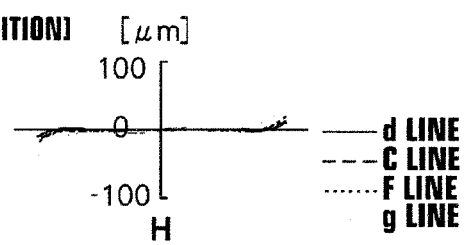
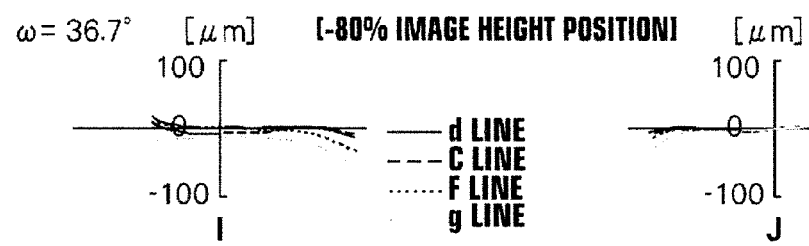
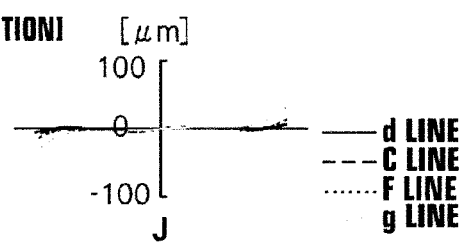

FIG.30
INTERMEDIATE     EXAMPLE 6
[WITHOUT CAMERA SHAKE CORRECTION]
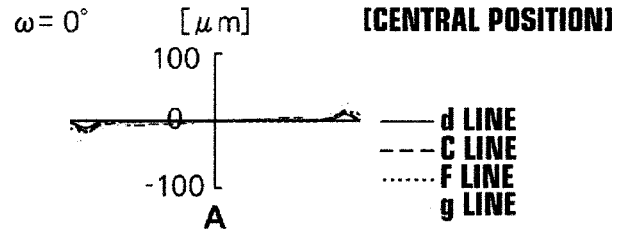
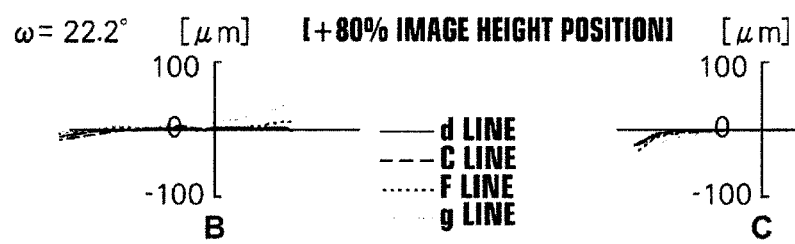
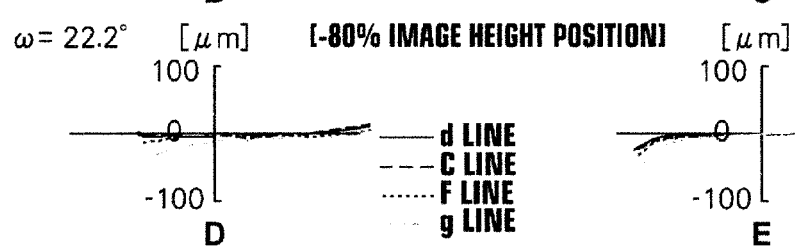
[WITH 0.3° CAMERA SHAKE CORRECTION]
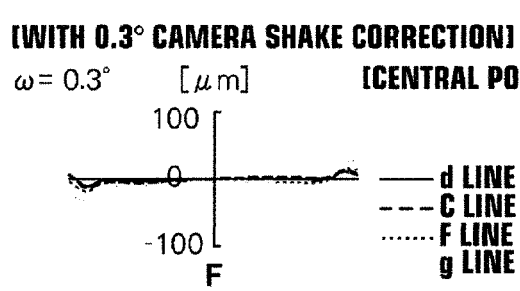
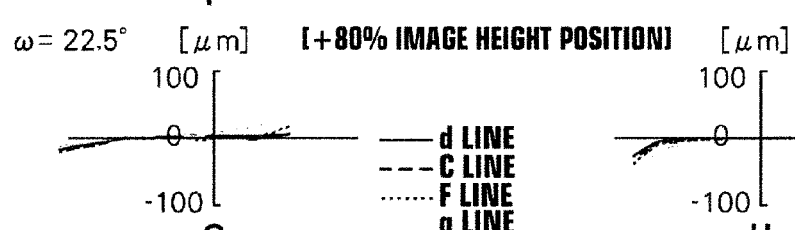
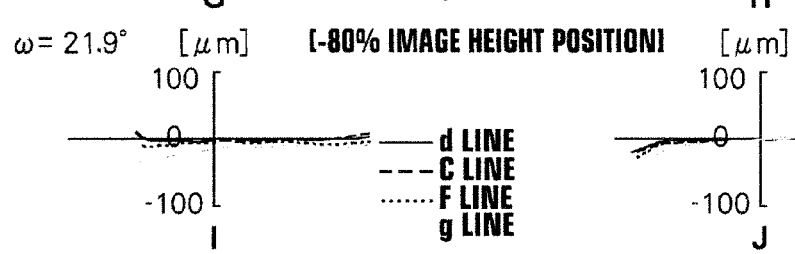

FIG.31
TELEPHOTO END     <u>EXAMPLE 6</u>
[WITHOUT CAMERA SHAKE CORRECTION]
$\omega = 0°$   [μm]   [CENTRAL POSITION]
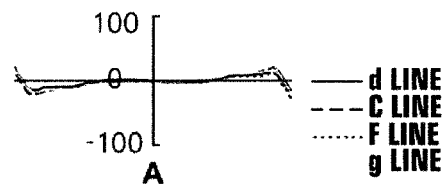
A
$\omega = 13.3°$   [μm]   [+80% IMAGE HEIGHT POSITION]   [μm]
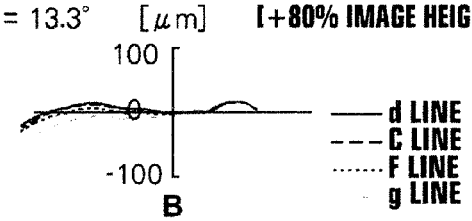 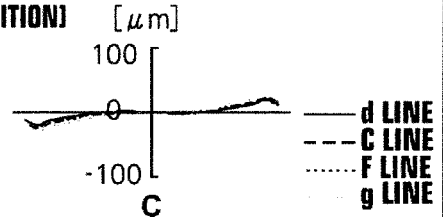
B            C
$\omega = 13.3°$   [μm]   [-80% IMAGE HEIGHT POSITION]   [μm]
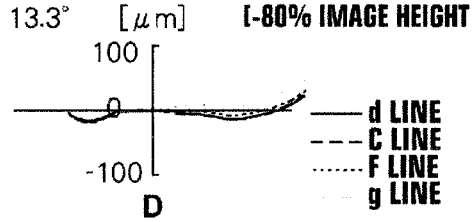 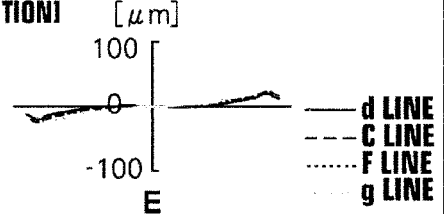
D            E
[WITH 0.3° CAMERA SHAKE CORRECTION]
$\omega = 0.3°$   [μm]   [CENTRAL POSITION]
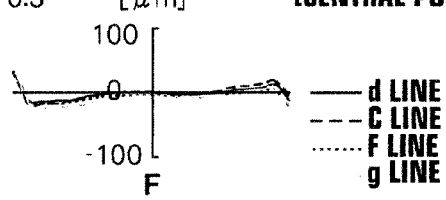
F
$\omega = 13.6°$   [μm]   [+80% IMAGE HEIGHT POSITION]   [μm]
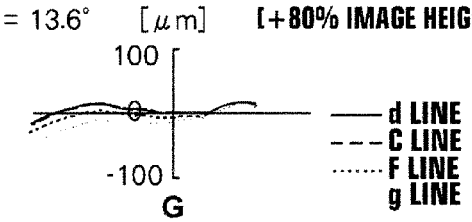 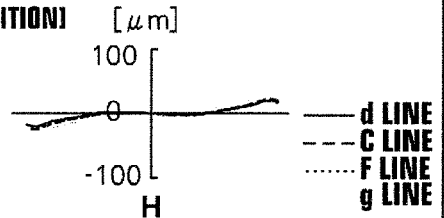
G            H
$\omega = 13°$   [μm]   [-80% IMAGE HEIGHT POSITION]   [μm]
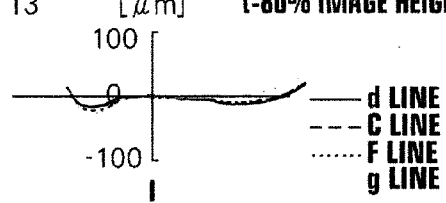 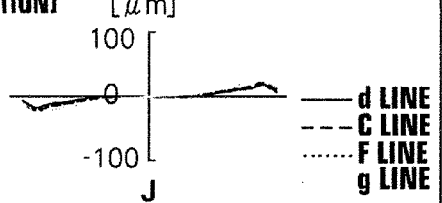
I            J

ZOOM LENS AND IMAGING APPARATUS

CROSS REFERENCE TO RELATED APPLICATIONS

The present application claims priority under 35 USC §119 to Japanese Patent Application No. 2013-124348, filed on Jun. 13, 2013. The above application is hereby expressly incorporated by reference, in its entirety, into the present application.

TECHNICAL FIELD

The present invention is related to a zoom lens. More particularly, the present invention is related to a zoom lens which is suited for use in compact digital cameras, exchangeable lens digital cameras, etc.

In addition, the present invention is related to an imaging apparatus equipped with such a zoom lens.

BACKGROUND ART

Achieving miniaturization and weight reduction of focusing lens groups and shake preventing (camera shake correcting) lens groups is an important objective in zoom lenses which are employed in digital cameras and video cameras. Recently, many zoom lenses have been proposed, in which the entirety of a single lens group or a partial sub lens group that constitutes the zoom lenses is moved in a direction perpendicular to an optical axis in order to correct images in the case that camera shake occurs.

For example, Japanese Unexamined Patent Publication No. 2001-117000 discloses a zoom lens having four zoom lens groups, each having a positive, a negative, a positive, and a positive refractive power, provided in this order from the object side. This zoom lens corrects camera shake by moving the entire third lens group in a direction perpendicular to the optical axis.

Japanese Unexamined Patent Publication No. 2008-181147 discloses a zoom lens having four zoom lens groups, each having a positive, a negative, a positive, and a positive refractive power, provided in this order from the object side. This zoom lens corrects camera shake by moving a partial lens group that constitutes the third lens group in a direction perpendicular to the optical axis.

Japanese Unexamined Patent Publication No. 2009-150970 discloses a zoom lens having four zoom lens groups, each having a positive, a negative, a positive, and a positive refractive power, provided in this order from the object side. This zoom lens corrects camera shake by moving one lens provided within the third lens group in a direction perpendicular to the optical axis.

Japanese Unexamined Patent Publication No. 2002-006217 discloses a zoom lens having four zoom lens groups, each having a positive, a negative, a positive, and a positive refractive power, provided in this order from the object side. This zoom lens corrects camera shake by moving one lens provided within the third lens group in a direction perpendicular to the optical axis.

DISCLOSURE OF THE INVENTION

In the zoom lens disclosed in Japanese Unexamined Patent Publication No. 2001-117000, the third lens group that moves to correct camera shape is constituted by four lenses. In compact cameras and video cameras for consumers, in which sizes of imaging elements are small, the weights of lenses are not excessively great even if the shake preventing lens group is constituted by a plurality of lenses in this manner. Therefore, there are many cases in which such a configuration is adopted.

However, in the case that such a configuration is adopted for a zoom lens for use in a digital camera that employs a large imaging element, such as that of the APS-C type (23.6 mm-15.6 mm), the weight of the shake preventing lens group will be several times that compared to a case in which this configuration is adopted for an imaging apparatus that employs a compact imaging element. As a result, the load on a shake preventing (camera shake correcting) drive system will become extremely large. At the same time, the lens holding frame will become large, and in turn, the entire lens system will become large. In addition, the response time when camera shake occurs will become slow. The above also applies to focusing lens groups. There is demand to reduce the sizes and weights of lenses that move during focusing operations in order to reduce the load on a focusing drive system and also to accelerate auto focusing operations.

Meanwhile, the shake preventing lens group in all of the examples of the zoom lens disclosed in Japanese Unexamined Patent Publication No. 2008-181147 is constituted by two lenses. As described above, in the case that the imaging size is large, the weight of each individual lens becomes great. Therefore, it is preferable for the shake preventing lenses to be reduced to about two lenses as in Japanese Unexamined Patent Publication No. 2008-181147.

The shake preventing lens group of the zoom lens disclosed in Japanese Unexamined Patent Publication No. 2008-181147 is designed to be comparatively compact and lightweight, as described above. However, with respect to a configuration for performing focusing operations, Japanese Unexamined Patent Publication No. 2008-181147 discloses that it is preferable for the entire first lens group, the entire second lens group, or both the first lens group and the second lens group to be moved. That is, the configuration for performing focusing operations is not designed to be sufficiently lightweight.

The shake preventing lens group of the zoom lens disclosed in Japanese Unexamined Patent Publication No. 2009-150970 is also designed to be sufficiently lightweight. However, the configuration for performing focusing operations moves the entire second lens group, and the focusing lens group is not designed to be sufficiently lightweight.

The zoom lens disclosed in Japanese Unexamined Patent Publication No. 2002-006217 corrects camera shake by moving a single lens, and it can be said that the camera shake preventing lens group is designed to be sufficiently lightweight. However, Japanese Unexamined Patent Publication No. 2002-006217 does not explicitly disclose a focusing lens group.

The present invention has been developed in view of the foregoing circumstances. It is an object of the present invention to provide a zoom lens which is miniaturized and simplified as an optical system as a whole, and which is capable of reducing the load on a shake preventing (camera shake correcting) drive system and a focusing drive system.

In addition, it is an object of the present invention to provide an imaging apparatus that can achieve reductions in size and weight, in which the response times of camera shake correcting operations and focusing operations are fast, by employing the above zoom lens.

A zoom lens of the present invention achieves the above objects by designating a partial lens group provided in a third lens group as a shake preventing (camera shake correcting) lens group, and by designating a partial lens group provided in the third lens group to be a focusing lens group.

That is, a zoom lens of the present invention comprises:
a first lens group having a positive refractive power;
a second lens group having a negative refractive power; and
a third lens group having a positive refractive power; provided in this order from an object side;
the first lens group, the second lens group, and the third lens group moving such that the distance between the first lens group and the second lens group is greater and the distance between the second lens group and the third lens group is smaller at the telephoto end than at the wide angle end, and only these three lens group moving while changing magnification;
the third lens group comprising a plurality of lenses, and the distances among the lenses provided in the third lens group being constant while changing magnification;
the third lens group substantially consisting of a 3-1 lens group having a positive refractive power and a 3-2 lens group, provided in this order from the object side;
the 3-1 lens group being fixed when camera shake occurs and during focusing operations;
the 3-2 lens group comprising a shake preventing lens group provided most toward the object side that moves in a direction perpendicular to an optical axis when camera shake occurs to correct an imaging plane but is fixed during focusing operations, and a focusing lens group provided more toward an image side than the shake preventing lens group that moves along the optical axis during focusing operations but is fixed when camera shake occurs.

Here, the expression "substantially consisting of" above and the expression "substantially constituted by" to be described later means that the zoom lens may also include lenses that practically do not have any power, optical elements other than lenses such as an aperture stop, a cover glass and a filter, and mechanical components such as lens flanges, a lens barrel, a blur correcting mechanism, etc., in addition to the constituent elements listed above (the same applies to the description below).

Note that it is desirable for the focusing lens group to have a positive refractive power.

In addition, it is desirable for the focusing lens group to substantially consist of a single positive lens.

It is desirable for the zoom lenses of the present invention to satisfy Conditional Formula (1) below:

$$0.9<|f3F/f3|<1.8 \tag{1}$$

wherein f3F is the focal distance of the focusing lens group, and f3 is the focal length of the third lens group.

In this case, it is more preferable for Conditional Formula (1-2) below to be satisfied.

$$1.0<|f3F/f3|<1.7 \tag{1-2}$$

In the zoom lens of the present invention, it is desirable for the angle of view at the wide angle end to be 70 degrees or greater and for the zoom lens to satisfy Conditional Formulae (2) and (3) below:

$$1.1<|f3F/fw|<2.3 \tag{2}$$

$$0.3<|f3F/ft|<0.9 \tag{3}$$

wherein f3F is the focal length of the focusing lens group, fw is the focal length of the entire system at the wide angle end, and ft is the focal length of the entire system at the telephoto end.

In this case, it is more preferable for Conditional Formula (2-2) below, and even more preferable for Conditional Formula (2-3) below to be satisfied.

$$1.2<|f3F/fw|<2.2 \tag{2-2}$$

$$1.3<|f3F/fw|<2.1 \tag{2-3}$$

In addition, it is more preferable for Conditional Formula (3-2) to be satisfied.

$$0.4<|f3F/ft|<0.8 \tag{3-2}$$

In the zoom lens of the present invention, it is desirable for the shake preventing lens group to have a negative refractive power.

Further, it is desirable for the shake preventing lens group to substantially consist of a single negative lens.

In addition, it is desirable for the 3-1 lens group to comprise at least two positive lenses and one negative lens.

It is desirable for the zoom lens of the present invention to satisfy Conditional Formula (4) below:

$$1.2<|f3IS/f3|<3.0 \tag{4}$$

wherein F3IS is the focal length of the shake preventing lens group, and f3 is the focal length of the third lens group.

In this case, it is more preferable for Conditional Formula (4-2) below, and even more preferable for Conditional Formula (4-3) below to be satisfied.

$$1.3<|f3IS/f3|<2.8 \tag{4-2}$$

$$1.4<|f3IS/f3|<2.7 \tag{4-3}$$

It is desirable for the zoom lens of the present invention to satisfy Conditional Formula (5) below:

$$0.8<|f3IS/f3A|<2.6 \tag{5}$$

wherein f3IS is the focal length of the shake preventing lens group and f3A is the combined focal length of the 3-1 lens group and the shake preventing lens group.

In this case, it is more preferable for Conditional Formula (5-2) below, and even more preferable for Conditional Formula (5-3) below to be satisfied.

$$1.0<|f3IS/f3A|<2.4 \tag{5-2}$$

$$1.1<|f3IS/f3A|<2.3 \tag{5-3}$$

In the zoom lens of the present invention, it is desirable for the focusing lens group to have a positive refractive power; and for a lens group having a negative refractive power, which is fixed during focusing operations and when camera shake occurs, to be provided adjacent to the focusing lens group toward the object side or toward the image side thereof.

In addition, it is desirable for the 3-1 lens group to substantially consist of two lenses having positive refractive powers and one lens having a negative refractive power, and for the 3-2 lens group to substantially consist of a shake preventing lens, which is a single lens having a negative refractive power, a focusing lens, which is a single lens having a positive refractive power, and a fixed lens group having a negative refractive power, provided in this order from the object side. Here, the expression "fixed lens group" refers to a lens group that does not move either for shake prevention or for focusing operations.

In addition, it is desirable for the first lens group to substantially consist of a lens having a negative refractive power, and a lens having a positive refractive power, provided in this order from the object side.

In addition, it is desirable for one positive lens, which is fixed with respect to the direction of the optical axis while changing magnification and during focusing operations, to be provided between the third lens group and an imaging surface.

Further, it is desirable for the second lens group to substantially consist of a lens having a negative refractive power, a lens having a negative refractive power, and a lens having a positive refractive power, provided in this order from the object side.

Meanwhile, an imaging apparatus of the present invention is characterized by being equipped with the zoom lens of the present invention described above.

As described above, the zoom lens of the present invention is configured to correct camera shake and to perform focusing operations with partial lens groups within the third lens group. Therefore, reductions in the size and weight of the shake preventing lens group (camera shake correcting lens group) and the focusing lens group become possible. Accordingly, the load on a shake preventing drive system and the load on a focusing drive system can be reduced, and response time when camera shake occurs becomes fast. In addition, auto focusing operations can be accelerated. Further, because the shake preventing lens group and the focusing lens group can be miniaturized, reductions in the size and the cost of the zoom lens as a whole can be realized. Further, only three lens groups move along the optical axis when changing magnification. Therefore, simplification of the mechanism for changing magnification can also be realized.

Meanwhile, the imaging apparatus of the present invention is equipped with a zoom lens of the present invention that exhibits the advantageous effects described above. Therefore, the response times of camera shake correcting operations and focusing operations are fast, and reductions in size and weight can be achieved.

BRIEF DESCRIPTION OF THE DRAWINGS

FIG. 1 is a collection of sectional diagrams that illustrate the lens configuration of a zoom lens according to Example 1 of the present invention.

FIG. 2 is a collection of sectional diagrams that illustrate the lens configuration of a zoom lens according to Example 2 of the present invention.

FIG. 3 is a collection of sectional diagrams that illustrate the lens configuration of a zoom lens according to Example 3 of the present invention.

FIG. 4 is a collection of sectional diagrams that illustrate the lens configuration of a zoom lens according to Example 4 of the present invention.

FIG. 5 is a collection of sectional diagrams that illustrate the lens configuration of a zoom lens according to Example 5 of the present invention.

FIG. 6 is a collection of sectional diagrams that illustrate the lens configuration of a zoom lens according to Example 6 of the present invention.

Figure 8:
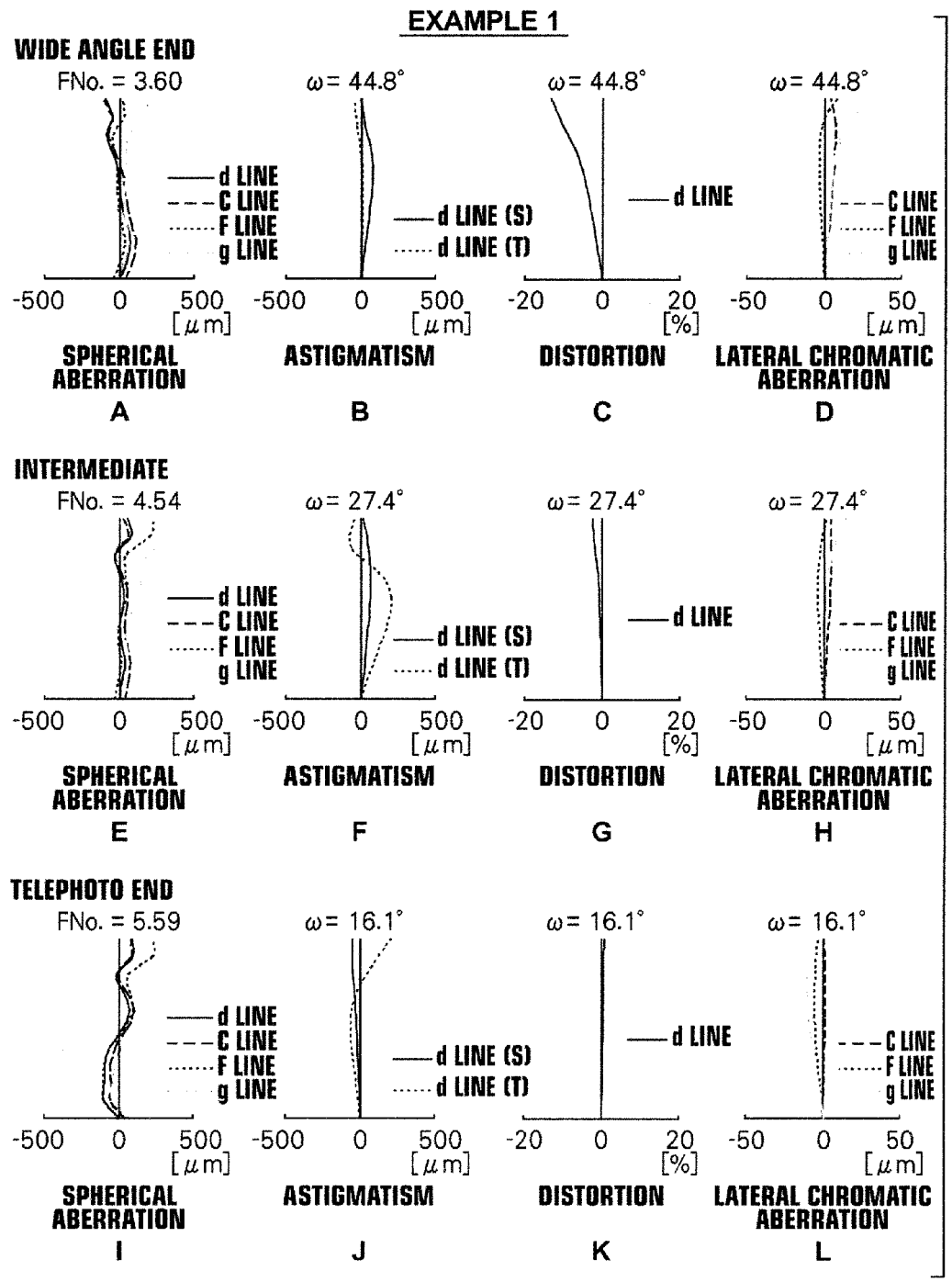

A through L of FIG. 8 are diagrams that illustrate various aberrations of the zoom lens according to Example 1.

A through L of FIG. 9 are diagrams that illustrate various aberrations of the zoom lens according to Example 2.

Figure 10:
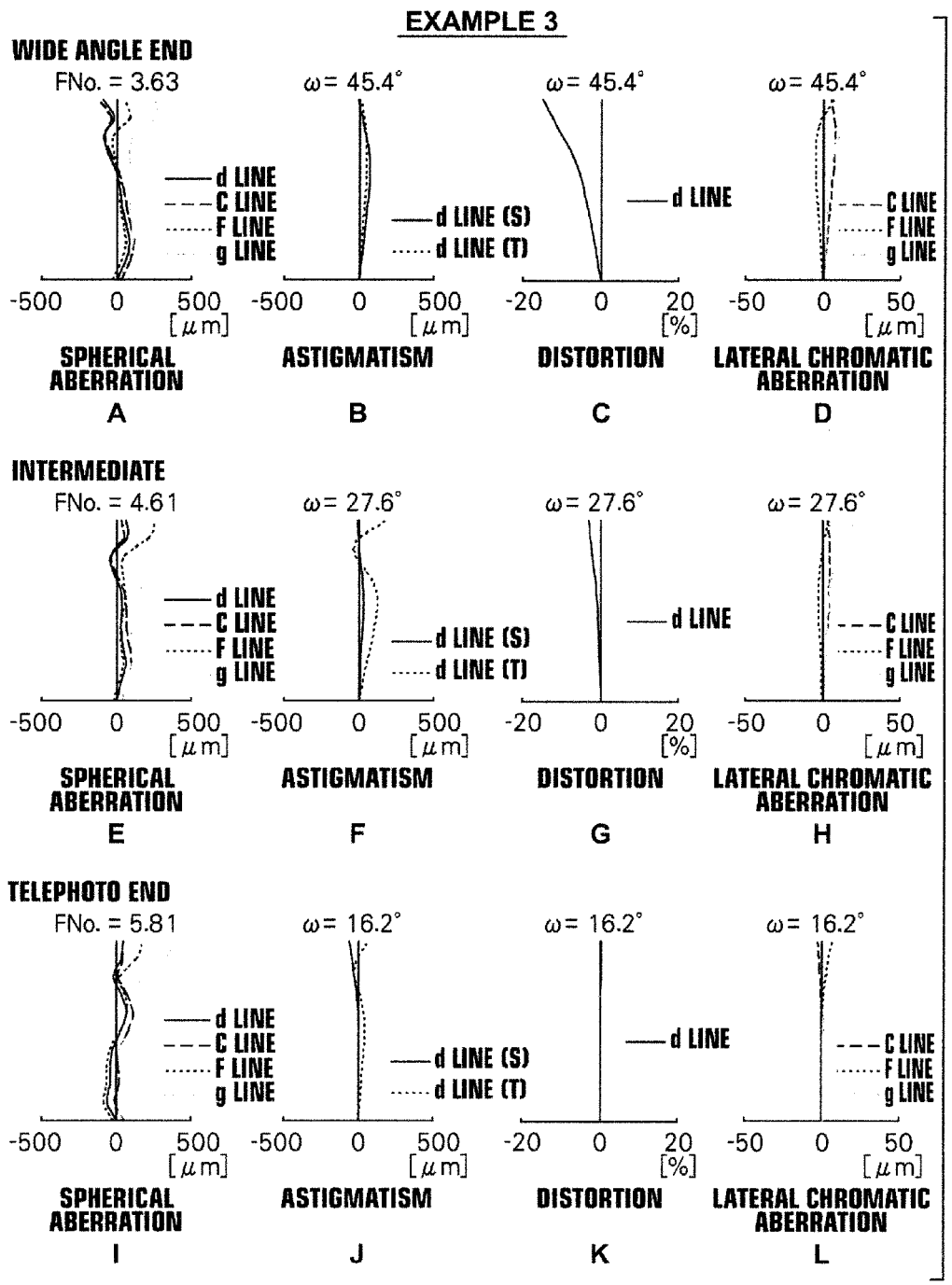

A through L of FIG. 10 are diagrams that illustrate various aberrations of the zoom lens according to Example 3.

Figure 11:
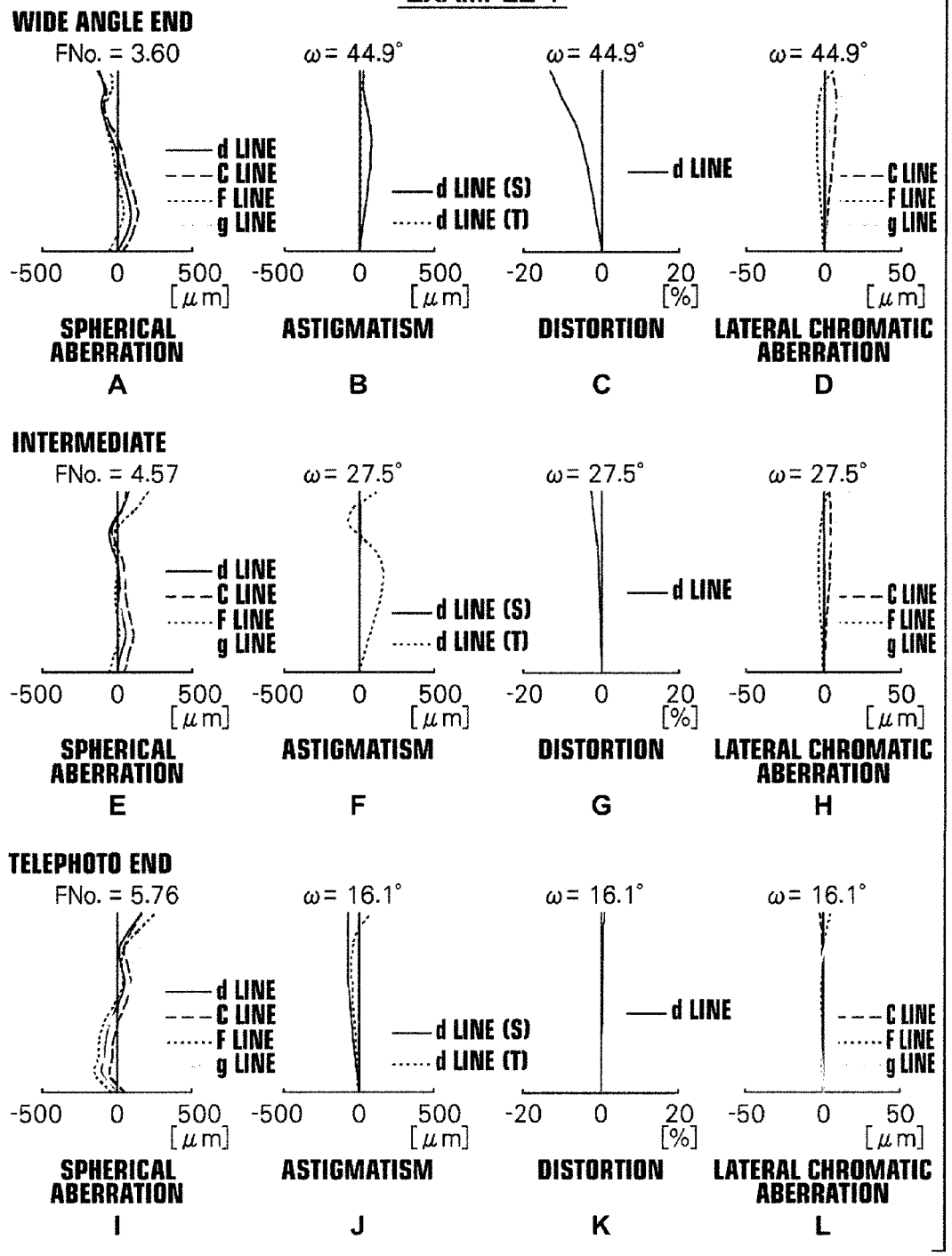

A through L of FIG. 11 are diagrams that illustrate various aberrations of the zoom lens according to Example 4.

Figure 12:
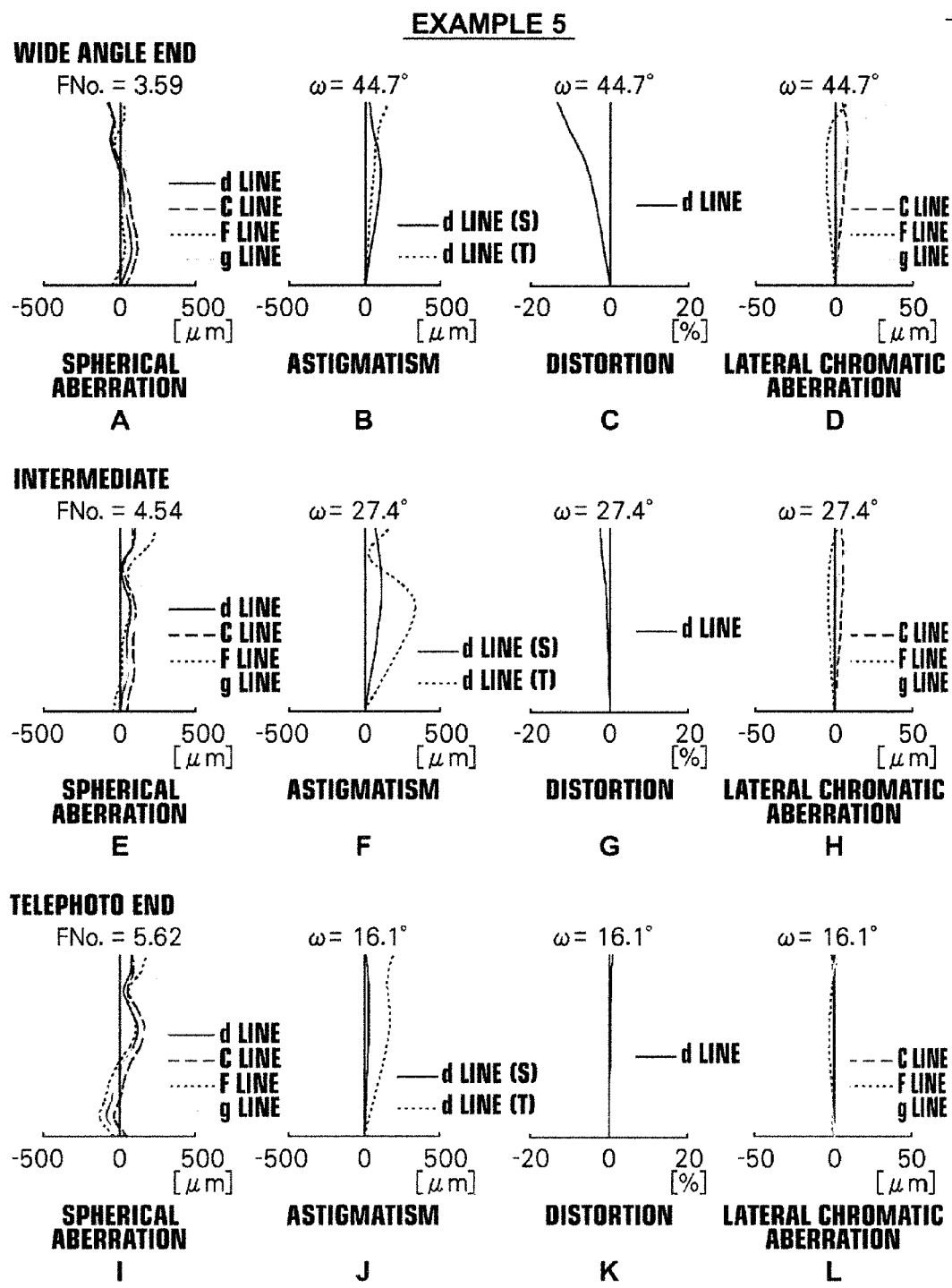

A through L of FIG. 12 are diagrams that illustrate various aberrations of the zoom lens according to Example 5.

Figure 13:
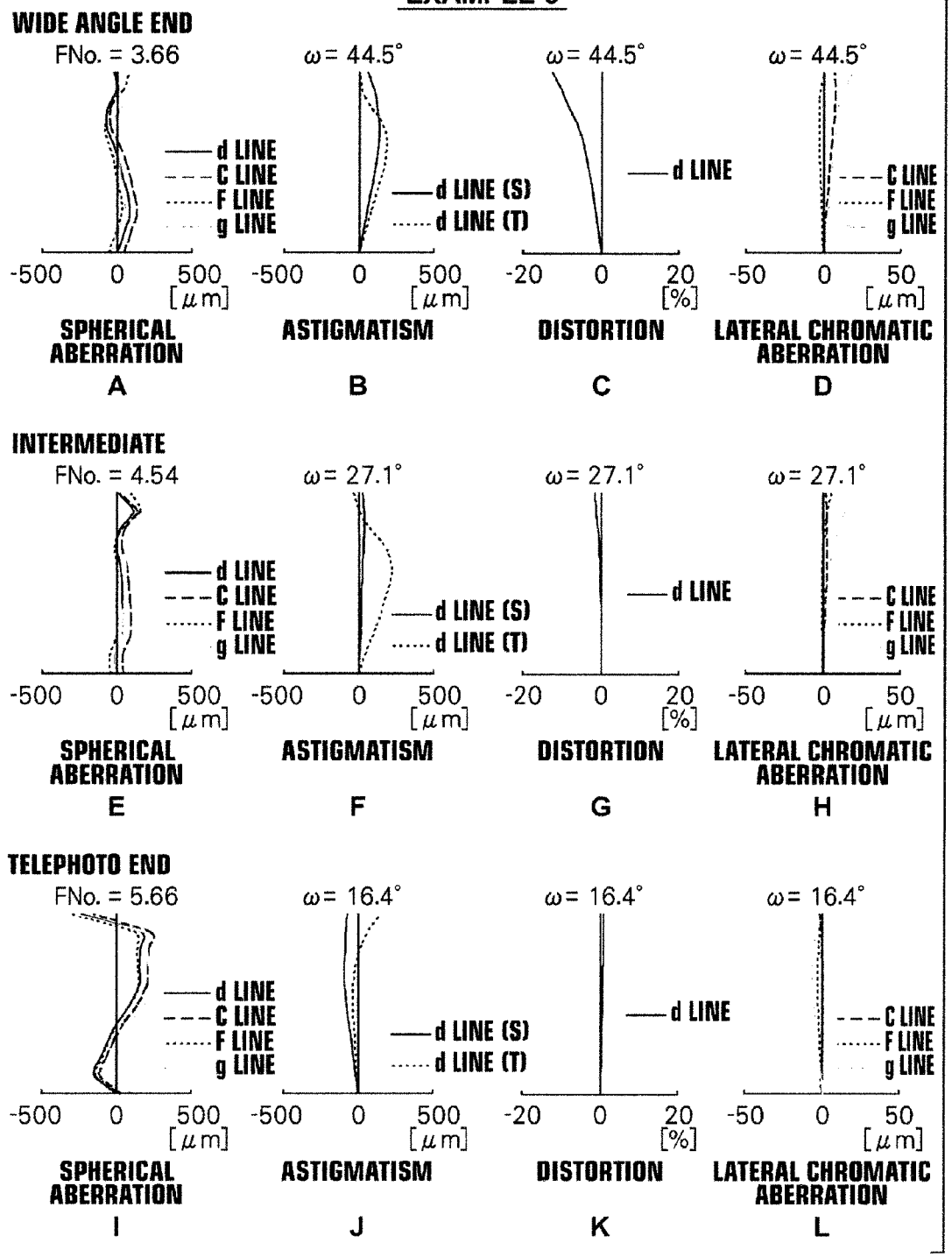

A through L of FIG. 13 are diagrams that illustrate various aberrations of the zoom lens according to Example 6.

A through E of FIG. 14 are diagrams that illustrate transverse aberration of the zoom lens according to Example 1 at the wide angle end without camera shake correction, and F through J of FIG. 14 are diagrams that illustrate transverse aberration of the zoom lens according to Example 1 at the wide angle end with camera shake correction.

A through E of FIG. 15 are diagrams that illustrate transverse aberration of the zoom lens according to Example 1 at an intermediate position without camera shake correction, and F through J of FIG. 15 are diagrams that illustrate transverse aberration of the zoom lens according to Example 1 at the intermediate position with camera shake correction.

A through E of FIG. 16 are diagrams that illustrate transverse aberration of the zoom lens according to Example 1 at the telephoto end without camera shake correction, and F through J of FIG. 16 are diagrams that illustrate transverse aberration of the zoom lens according to Example 1 at the telephoto end with camera shake correction.

A through E of FIG. 17 are diagrams that illustrate transverse aberration of the zoom lens according to Example 2 at the wide angle end without camera shake correction, and F through J of FIG. 17 are diagrams that illustrate transverse aberration of the zoom lens according to Example 2 at the wide angle end with camera shake correction.

A through E of FIG. 18 are diagrams that illustrate transverse aberration of the zoom lens according to Example 2 at an intermediate position without camera shake correction, and F through J of FIG. 18 are diagrams that illustrate transverse aberration of the zoom lens according to Example 2 at the intermediate position with camera shake correction.

A through E of FIG. 19 are diagrams that illustrate transverse aberration of the zoom lens according to Example 2 at the telephoto end without camera shake correction, and F through J of FIG. 19 are diagrams that illustrate transverse aberration of the zoom lens according to Example 2 at the telephoto end with camera shake correction.

A through E of FIG. 20 are diagrams that illustrate transverse aberration of the zoom lens according to Example 3 at the wide angle end without camera shake correction, and F through J of FIG. 20 are diagrams that illustrate transverse aberration of the zoom lens according to Example 3 at the wide angle end with camera shake correction.

A through E of FIG. 21 are diagrams that illustrate transverse aberration of the zoom lens according to Example 3 at an intermediate position without camera shake correction, and F through J of FIG. 21 are diagrams that illustrate transverse aberration of the zoom lens according to Example 3 at the intermediate position with camera shake correction.

A through E of FIG. 22 are diagrams that illustrate transverse aberration of the zoom lens according to Example 3 at the telephoto end without camera shake correction, and F through J of FIG. 22 are diagrams that illustrate transverse aberration of the zoom lens according to Example 3 at the telephoto end with camera shake correction.

A through E of FIG. 23 are diagrams that illustrate transverse aberration of the zoom lens according to Example 4 at the wide angle end without camera shake correction, and F through J of FIG. 23 are diagrams that illustrate transverse aberration of the zoom lens according to Example 4 at the wide angle end with camera shake correction.

A through E of FIG. 24 are diagrams that illustrate transverse aberration of the zoom lens according to Example 4 at an intermediate position without camera shake correction, and F through J of FIG. 24 are diagrams that illustrate transverse aberration of the zoom lens according to Example 4 at the intermediate position with camera shake correction.

A through E of FIG. 25 are diagrams that illustrate transverse aberration of the zoom lens according to Example 4 at the telephoto end without camera shake correction, and F through J of FIG. 25 are diagrams that illustrate transverse aberration of the zoom lens according to Example 4 at the telephoto end with camera shake correction.

A through E of FIG. 26 are diagrams that illustrate transverse aberration of the zoom lens according to Example 5 at the wide angle end without camera shake correction, and F through J of FIG. 26 are diagrams that illustrate transverse aberration of the zoom lens according to Example 5 at the wide angle end with camera shake correction.

A through E of FIG. 27 are diagrams that illustrate transverse aberration of the zoom lens according to Example 5 at an intermediate position without camera shake correction, and F through J of FIG. 27 are diagrams that illustrate transverse aberration of the zoom lens according to Example 5 at the intermediate position with camera shake correction.

A through E of FIG. 28 are diagrams that illustrate transverse aberration of the zoom lens according to Example 5 at the telephoto end without camera shake correction, and F through J of FIG. 28 are diagrams that illustrate transverse aberration of the zoom lens according to Example 5 at the telephoto end with camera shake correction.

A through E of FIG. 29 are diagrams that illustrate transverse aberration of the zoom lens according to Example 6 at the wide angle end without camera shake correction, and F through J of FIG. 29 are diagrams that illustrate transverse aberration of the zoom lens according to Example 6 at the wide angle end with camera shake correction.

A through E of FIG. 30 are diagrams that illustrate transverse aberration of the zoom lens according to Example 6 at an intermediate position without camera shake correction, and F through J of FIG. 30 are diagrams that illustrate transverse aberration of the zoom lens according to Example 6 at the intermediate position with camera shake correction.

A through E of FIG. 31 are diagrams that illustrate transverse aberration of the zoom lens according to Example 6 at the telephoto end without camera shake correction, and F through J of FIG. 31 are diagrams that illustrate transverse aberration of the zoom lens according to Example 6 at the telephoto end with camera shake correction.

Figure 32:
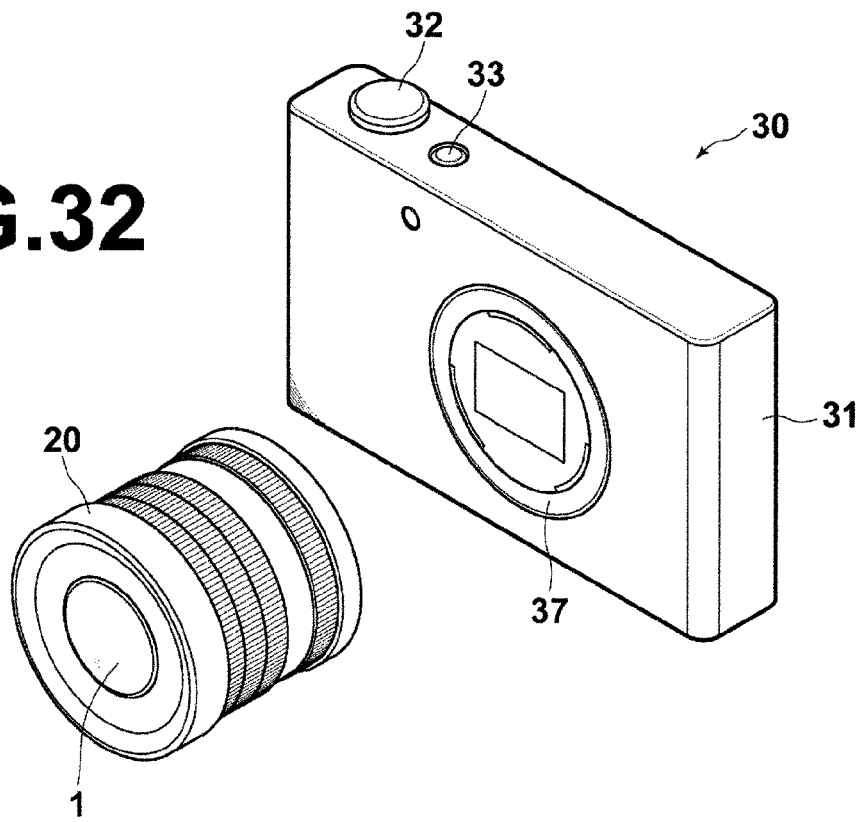

FIG. 32 is a perspective view that illustrates the front side of an imaging apparatus according to an embodiment of the present invention.

Figure 33:
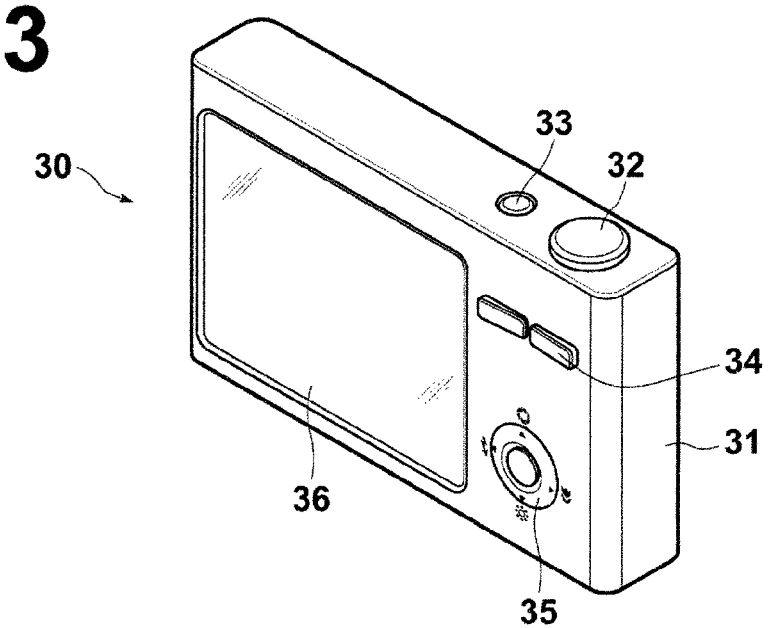

FIG. 33 is a perspective view that illustrates the rear side of the imaging apparatus of FIG. 32.

BEST MODE FOR CARRYING OUT THE INVENTION

Hereinafter, embodiments of the present invention will be described in detail with reference to the attached drawings. FIG. 1 is a collection of cross sectional diagrams that illustrate the configuration of a zoom lens according to an embodiment of the present invention, and corresponds to a zoom lens of Example 1 to be described later. FIG. 2 through FIG. 6 are cross sectional diagrams that illustrate configurations of zoom lenses according to other embodiments of the present invention, and correspond to zoom lenses of Examples 2 through 6 to be described later. The basic configurations of the embodiments illustrated in FIG. 1 through FIG. 6 are the same unless points of difference are particularly noted. The manners in which the configurations are illustrated are also the same. Therefore, the zoom lenses according to the embodiments of the present invention will be described mainly with reference to FIG. 1.

In FIG. 1, the left side is the object side and the right side is the image side. The uppermost portion of FIG. 1 illustrates the arrangement of the optical system in a state focused on infinity at the wide angle end (shortest focal length state). The middle portion of FIG. 1 illustrates the arrangement of the optical system focused on infinity at an intermediate position. The lowermost portion of FIG. 1 illustrates the arrangement of the optical system in a state focused on infinity at the telephoto end (longest focal length state). The same applies to FIGS. 2 through 6 to be described later.

The zoom lens according to the embodiment of the present invention substantially consists of: a first lens group G1 having a positive refractive power, a second lens group G2 having a negative refractive power, a third lens group G3 having a positive refractive power, and a fourth lens group G4 having a positive refractive power, provided in this order from the object side.

This zoom lens may be mounted in an imaging apparatus such as a digital camera, a cinematic camera, and a broadcast camera. In the imaging apparatus, an imaging element such as a CCD (Charge Coupled Device) and a CMOS (Complementary Metal Oxide Semiconductor) is provided such that the imaging surface thereof is positioned at an imaging surface Sim of the zoom lens. It is preferable for a cover glass for protecting the imaging surface of the imaging element and various filters, such as a low pass filter and an infrared cutoff filter, according to the specification of the imaging apparatus, to be provided between the zoom lens and the imaging surface. FIG. 1 illustrates an example in which a optical member PP is provided assuming the presence of the cover glass, the various types of filters, and the like between the lens system and the imaging surface Sim.

The first lens group G1 has a positive refractive power as a whole, and substantially consists of a lens L11 having a negative refractive power and a lens L12 having a positive refractive power, provided in this order from the object side. Note that the lens L11 and the lens L12 are cemented together. Here, the lens L11 may be a lens having a negative meniscus shape, and the lens L12 may be a lens having a positive meniscus shape, as in the example illustrated in FIG. 1.

Generally, the first lens group G1 is constituted by lenses having large diameters. However, if the first lens group G1 is substantially constituted by the two lenses L11 and L12 as described above, reductions in the size and weight of the zoom lens can be realized.

The second lens group G2 is a lens group having a negative refractive power as a whole, constituted by a lens L21 having a negative refractive power, a lens L22 having a negative refractive power, and a lens L23 having a positive refractive power, provided in this order from the object side along an optical axis Z. Here, the lens L21 may be a lens having a negative meniscus shape, the lens L22 may be a lens having aspherical surfaces both toward the object side and toward the image side, and the lens L23 may be a lens having a positive meniscus shape, as in the example illustrated in FIG. 1.

The size of the zoom lens can be reduced and a reduction in cost can also be achieved if the second lens group G2 substantially consists of the lenses L21, L22, and L23 having the refractive powers as described above. That is, it is preferable for at least two negative lenses and one positive lens to be provided in a second lens group in order to miniaturize the zoom lens and to correct field curvature at the wide angle end. The present embodiment does not employ lenses exceeding this number. Therefore, reductions in the size and the cost of the zoom lens can be realized.

The third lens group G3 is a lens group having a positive refractive power as a whole, substantially consisting of a lens L31 having a positive refractive power, a lens L32 having a negative refractive power, a lens L33 having a positive refractive power, a lens L34 having a negative refractive power, a lens L35 having a positive refractive power, and a lens L36 having a negative refractive power, provided in this order from the object side along the optical axis Z. Note that the lens L32 and the lens L33 are cemented together. Here, the lens L31 may be a lens having aspherical surfaces both toward the object side and toward the image side, the lens L32 may be a planoconcave lens, the lens L33 may be a biconvex lens, the lens L34 may be a lens having aspherical surfaces both toward the object side and toward the image side, the lens L35 may be a biconvex lens, and the lens L36 may be a planoconcave lens, as in the example illustrated in FIG. 1.

The lenses L31, L32, and L33 constitute a 3-1 lens group G31, and the lenses L34, L35, and L36 constitute a 3-2 lens group G32. The 3-1 lens group G31 has a positive refractive power as a whole and is fixed both when camera shake occurs and during focusing operations. In the 3-2 lens group G32 provided more toward the image side than the 3-1 lens group G31, the lens L34 constitutes a shake preventing lens group which is provided most toward the object side, which moves in a direction perpendicular to the optical axis Z to correct an imaging plane when camera shake occurs, and which is fixed during focusing operations. In addition, in the 3-2 lens group G32, the lens 35 provided more toward the image side than the lens L34 constitutes a focusing lens group which moves along the optical axis Z during focusing operations and which is fixed when camera shake occurs. The 3-2 lens group G32 is constituted by the lens L36 having a negative refractive power, which is fixed both when camera shake occurs and during focusing operations, in addition to the lenses L34 and L35.

An aperture stop St that moves along the optical axis Z with the third lens group G3 while changing magnification is provided between the second lens group G2 and the third lens group G3. Note that the aperture stop St illustrated in FIG. 1 does not represent the size or the shape thereof, but illustrates the position thereof along the optical axis.

In the zoom lenses of the present invention, it is preferable for the aperture stop St to be provided at the side most toward the object side of the third lens group G3. That is, if this configuration is adopted, mechanical interference between the aperture stop mechanism and the camera shake mechanism can be prevented.

The fourth lens group G4 is a lens group having a positive refractive power as a whole, substantially consisting of a lens L4 having a positive refractive power. Here, the lens L4 may be a planoconvex lens, as in the example illustrated in FIG. 1.

Figure 7:
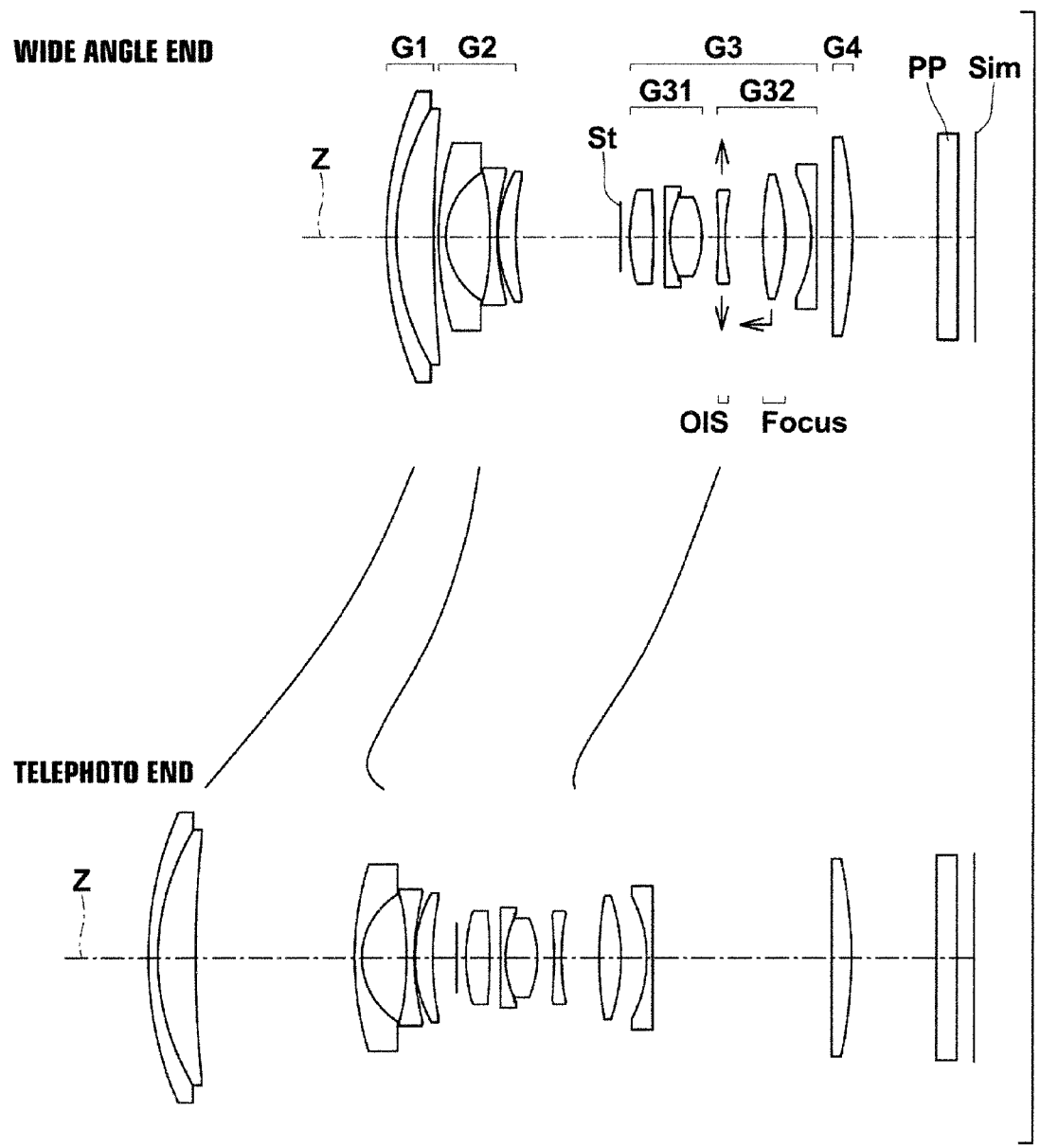
FIG. 7 is a diagram that schematically illustrates an example of the movement paths of lenses while changing magnification of a zoom lens of the present invention.

FIG. 7 is a diagram that schematically indicates the movement paths of lenses of the zoom lens of the present embodiment while changing magnification from the wide angle end to the telephoto end, by the curved lines drawn between the sectional diagram of the zoom lens at the wide angle end at the upper portion, and the sectional diagram of the zoom lens at the telephoto end at the lower portion thereof. Note that the movement path illustrated in FIG. 7 is merely an example, and the lens groups may move along other movement paths.

As illustrated in FIG. 7, the first through third lens groups G1 through G3 move along the optical axis Z such that the distance between the first lens group G1 and the second lens group G2 is greater and the distance between the second lens group G2 and the third lens group G3 is smaller at the telephoto end compared to the wide angle end in the zoom lens of the present embodiment. Note that all of the lenses L31 through L36 that constitute the third lens group G3 move integrally while changing magnification, and the distances among these lenses remain constant. Magnification is changed in the same manner as that described above in all of Examples 1 through 6.

In the zoom lens of the present embodiment, camera shake correction and focusing operations are respectively performed by the shake preventing lens group (the lens L34) and the focusing lens group (the lens L35), which are partial lens groups within the third lens group G3. Therefore, reductions in the sizes and weights of the shake preventing lens group and the focusing lens group become possible. Accordingly, the load on a shake preventing drive system and the load on a focusing drive system can be decreased, resulting in response time when camera shake occurs and automatic focusing operations becoming faster. In addition, because the shake preventing lens group and the focusing lens group can be miniaturized, reductions in the size and cost of the zoom lens as a whole can be realized. Further, only the first lens group G1 through the third lens group G3 move when changing magnification. Therefore, simplification of the mechanism for changing magnification can also be realized.

In the present embodiment, the shake preventing lens group is a single negative lens L34. Therefore, the advantageous effects described above become more prominent.

In the zoom lens of the present embodiment, the focusing lens group constituted by the lens L35 has a positive refractive power, which is advantageous from the viewpoint of miniaturizing the zoom lens. That is, in order to miniaturize the zoom lens, it is desirable for the power of the focusing lens group to be great. In a configuration in which the focusing lens group is close to the imaging surface Sim as in the present embodiment, if a lens group having a great negative refractive power is employed as the focusing lens group, the back focus will become long and it will become difficult to miniaturize the zoom lens.

In the zoom lens of the present embodiment, the focusing lens group is substantially constituted by the single positive lens L35. Therefore, the load on the focusing drive system can be decreased. Accordingly, an increase in the speed of automatic focusing operations, reduction of power consumption, and reduction of cost can be realized.

In the zoom lens of the present embodiment, the focusing lens group, which is constituted by the lens L35, has a positive refractive power. In addition, the lens group having a negative refractive power (the lens L36), which is fixed both during focusing operations and when camera shake occurs, is provided adjacent to the focusing lens group toward the image side thereof. Refractive power as a focusing lens group can be efficiently obtained by providing the lens L36 having a refractive power of a sign opposite that of the focusing lens group. Therefore, the amount of movement of the focusing lens group during focusing operations can be decreased. In addition, aberrations that occur in the focusing lens group and the lens group (the lens L36) having a refractive power opposite that of the focusing lens group can cancel each other out, by the lens group having a refractive power opposite that of the focusing lens group being provided. Further, by providing the lens L36 having a negative refractive power as described above, the lenses provided more toward the object side thereof can be miniaturized. Note that the same advantageous effects can be obtained in the case that a lens group having a negative refractive power such as that described above is provided adjacent to the focusing lens group toward the object side thereof as well.

In the zoom lens of the present embodiment, the shake preventing lens group, which is constituted by the lens L34, has a negative refractive power. By the shake preventing lens group having a negative refractive power, which is opposite in sign from the refractive power of the 3-1 lens group G31, power as a shake preventing lens group can be efficiently obtained, and the sensitivity for correcting camera shake can be set as appropriate. In addition, the shake preventing lens group and the 3-1 lens group G31 have refractive powers of different signs. Therefore, an advantageous effect that various aberrations which are generated in each of the lens groups cancel each other out is obtained.

In the zoom lens of the present embodiment, the 3-1 lens group G31 comprises at least the two positive lenses L31 and L33, and the single negative lens L32. Therefore, miniaturization of the zoom lens and favorable correction of various aberrations can be realized. That is, it is necessary to increase the refractive power of the 3-1 lens group G31 in order to miniaturize the lens system. However, spherical aberration and comatic aberration, which become likely to occur by increasing the power of the 3-1 lens group G31, can be favorably corrected if at least two positive lenses are provided. In addition, chromatic aberrations can be favorably corrected if at least one negative lens is provided.

In the zoom lens of the present embodiment, the single positive lens L4, which is fixed with respect to the direction of the optical axis both while changing magnification and during focusing operations, is provided between the third lens group G3 and the imaging surface Sim. Therefore, miniaturization can be realized while maintaining telecentric properties.

The zoom lens of the present embodiment satisfies Conditional Formula (1):

$$0.9<|f3F/f3|<1.8 \qquad (1)$$

wherein f3F is the focal distance of the focusing lens group constituted by the lens L35, and f3 is the focal length of the third lens group G3.

Note that Table 19 shows the values related to Conditional Formula (1), as well as values related to the other Conditional Formulae (2) through (5), which were described previously, for each of the Examples. As shown in Table 19, Conditional Formula (1) is satisfied in all of Examples 1 through 6. Correction of spherical aberration and comatic aberration is facilitated by Conditional Formula (1) being satisfied. In addition, miniaturization of the zoom lens becomes possible. Hereinafter, the reasons why these advantageous effects are obtained will be described.

Conditional Formula (1) defines the relationship between the focal length of the focusing lens group and the focal length of the third lens group G3. As the power of the focusing lens group becomes excessive strong to a degree that the value of |f3F/f3| becomes lower than the lower limit defined in Conditional Formula (1), it will become difficult to suppress variations in spherical aberration and comatic aberration during focusing operations. Inversely, as the power of the focusing lens group becomes excessively weak to a degree that the value of |f3F/f3| becomes greater than the upper limit defined in Conditional Formula (1), the amount of movement of the focusing lens group while performing focusing operations will increase, and the lens system will become large.

As shown in Table 19, the present embodiment satisfies Conditional Formula (1-2) below as well.

$$1.0<|f3F/f3|<1.7 \qquad (1-2)$$

This applies to all of Examples 1 through 6. Thereby, the advantageous effects described above, which are obtained by satisfying Conditional Formula (1), become more prominent in the present embodiment.

In the zoom lens of the present embodiment, the angle of view (2ω) at the wide angle end is 70 degrees or greater (the same applies to Examples 1 through 6, as shown in Tables 2, 5, 8, 11, 14, and 17 to be described later), and Conditional Formulae (2) and (3) below are satisfied:

$$1.1<|f3F/fw|<2.3 \qquad (2)$$

$$0.3<|f3F/ft|<0.9 \qquad (3)$$

wherein f3F is the focal length of the focusing lens group constituted by the lens L35, fw is the focal length of the entire system at the wide angle end, and ft is the focal length of the entire system at the telephoto end. This is true for all of Examples 1 through 6. Thereby, variations in spherical aberration and comatic aberration during focusing operations can be suppressed, and miniaturization of the zoom lens can be realized. Hereinafter, the reasons why these advantageous effects are obtained will be described.

Conditional Formula (2) and Conditional Formula (3) define the relationship between the focal length of the focusing lens group and the focal length of the entire system at the wide angle end and at the telephoto end. As the power of the focusing lens group becomes excessively strong to a degree that the values of |f3F/fw| and |f3F/ft| become lower than the lower limits defined in Conditional Formula (2) and Conditional Formula (3), it will become difficult to suppress variations in spherical aberration and comatic aberration during focusing operations. Inversely, as the power of the focusing lens group becomes excessively weak to a degree that the values of |f3F/fw| and |f3F/ft| become greater than the upper limits defined in Conditional Formula (2) and Conditional Formula (3), the amount of movement of the focusing lens group while performing focusing operations will increase, and the lens system will become large.

As shown in Table 19, the present embodiment satisfies all of the conditional formulae below.

$$1.2<|f3F/fw|<2.2 \qquad (2-2)$$

$$1.3<|f3F/fw|<2.1 \qquad (2-3)$$

$$0.4<|f3F/ft|<0.8 \qquad (3-2)$$

This applies to all of Examples 1 through 6. Thereby, the advantageous effects described above, which are obtained by satisfying Conditional Formula (2) and Conditional Formula (3), become more prominent in the present embodiment.

The zoom lens of the present embodiment satisfies Conditional Formula (4)

$$1.2<|f3IS/f3|<3.0 \qquad (4)$$

wherein F3IS is the focal length of the shake preventing lens group constituted by the lens L34, and f3 is the focal length of the third lens group G3. This applies to all of Examples 1 through 6. Therefore, correction of spherical aberration and comatic aberration is facilitated, and the configuration of a shake preventing mechanism can be miniaturized. As a result, the advantageous effects that the response time of camera shake correction can be improved and that power consumption can be reduced are obtained. Hereinafter, the reason why these advantageous effects are obtained will be described.

Conditional Formula (4) defines the relationship between the focal length of the shake preventing lens group constituted by the lens L34 and the focal length of the third lens group G3. As the power of the shake preventing lens group becomes excessively weak to a degree that the value of |f3IS/f3| becomes lower than the lower limit defined in Conditional Formula (4), correction of spherical aberration and comatic aberration will become difficult. Inversely, as the power of the shake preventing lens group becomes excessively strong to a degree that the value of |f3IS/f3| becomes greater than the upper limit defined in Conditional Formula (4), the amount of movement of the shake preventing lens group when correcting camera shake will increase, the effective diameter thereof will increase to secure peripheral light, and the configuration for preventing camera shake will become large. For these reasons, it will become difficult to improve the response time for camera shake correcting operations, and further reducing power consumption will also become difficult.

As shown in Table 19, the present embodiment satisfies both of the conditional formulae below.

$$1.3<|f3IS/f3|<2.8 \quad (4\text{-}2)$$

$$1.4<|f3IS/f3|<2.7 \quad (4\text{-}3)$$

This applies to all of Examples 1 through 6. Thereby, the advantageous effects described above, which are obtained by satisfying Conditional Formula (4), become more prominent in the present embodiment.

As shown in Table 19, the zoom lens of the present embodiment satisfies Conditional Formula (5) below:

$$0.8<|f3IS/f3A|<2.6 \quad (5)$$

wherein f3IS is the focal length of the shake preventing lens group constituted by the lens L34 and f3A is the combined focal length of the 3-1 lens group G31 and the shake preventing lens group. This applies to all of Examples 1 through 6. Thereby, correction of spherical aberration and comatic aberration is facilitated, and the configuration of the shake preventing mechanism can be miniaturized. As a result, the advantageous effects that the response time of camera shake correction can be improved and that power consumption can be reduced are obtained. Hereinafter, the reason why these advantageous effects are obtained will be described.

Conditional Formula (5) defines the relationship between the focal length of the shake preventing lens group constituted by the lens L34 and the combined focal length of the 3-1 lens group G31 and the shake preventing lens group. As the power of the shake preventing lens group becomes excessively strong to a degree that the value of |f3IS/f3A| becomes lower than the lower limit defined in Conditional Formula (5), correction of spherical aberration and comatic aberration will become difficult. Inversely, as the power of the shake preventing lens group becomes excessively weak to a degree that the value of |f3IS/f3A| becomes greater than the upper limit defined in Conditional Formula (5), the amount of movement of the shake preventing lens group when correcting camera shake will increase, the effective diameter thereof will increase to secure peripheral light, and the configuration for preventing camera shake will become large. For these reasons, it will become difficult to improve the response time for camera shake correcting operations, and further reducing power consumption will also become difficult.

As shown in Table 19, the present embodiment satisfies the following conditional formulae.

$$1.0<|f3IS/f3A|<2.4 \quad (5\text{-}2)$$

$$1.1<|f3IS/f3A|<2.3 \quad (5\text{-}3)$$

This applies to all of Examples 1 through 6. Thereby, the advantageous effects described above, which are obtained by satisfying Conditional Formula (5), become more prominent in the present embodiment.

Note that FIG. 1 illustrates an example in which the optical member PP is provided between the lens system and the imaging surface Sim. Alternatively, various filters such as low pass filters and filters that cut off specific wavelength bands may be provided among each of the lenses. As a further alternative, coatings that have the same functions as the various filters may be administered on the surfaces of the lenses.

In addition, a description has been given above mainly of the example illustrated in FIG. 1. However, the number of lenses that constitute each of the lens group and the shapes of the lenses in the zoom lens of the present invention are not limited to those of the example illustrated in FIG. 1, and other configurations may be adopted. In addition, arbitrary combinations of the preferred configurations and the possible configurations described above are possible. It is preferable for the configurations to be selectively adopted as appropriate, according to specifications required of the zoom lens.

Next, examples of numerical values of the zoom lens of the present invention will be described.

EXAMPLE 1

The zoom lens of Example 1 is of the configuration illustrated in FIG. 1. The zoom lens of the present example is of a four group configuration substantially consisting of the first lens group G1, the second lens group G2, the third lens group G3, and the fourth lens group G4, provided in this order from the object side. The signs of the refractive powers of the lens groups are positive, negative, positive, and positive, in this order from the first lens group G1. As described previously, the third lens group G3 substantially consists of the 3-1 lens group G31 having a positive refractive power, and the 3-2 lens group G32 having a positive refractive power, provided in this order from the object side.

While changing magnification, the first lens group G1 through the third lens group G3 move along the optical axis Z, and all of the lenses within the third lens group G3 move integrally. The shake preventing lens group is constituted by the lens L34, and the focusing lens group is constituted by the lens L35 within the 3-2 lens group G32.

The above points apply to Examples 2 through 6 to be described later.

Basic lens data of Example 1 are shown in Table 1, items and variable distances among surfaces of Example 1 are shown in Table 2, and aspherical surface coefficients of Example 1 are shown in Table 3.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. Note that the signs of the radii of curvature are positive in cases that the surface shape is convex toward the object side, and negative in cases that the surface shape is convex toward the image side. The refractive indices of jth (j=1, 2, 3, . . . ) constituent elements that sequentially increase from the object side to the image side, with the lens at the most object side designated as first, with respect to the d line (wavelength: 587.56 nm) are shown in the column Ndj. The Abbe's numbers of the jth constituent element with respect to the d line are shown in the column vdj. Note that the aperture stop St is also included in the basic lens data, and the radius of curvature of the surface corresponding to the aperture stop St is shown as "∞".

DD[3], DD[9], and DD[21] in Column Di of Table 1 are the distances between surfaces that change while changing magnification. DD[3] is the distance between the first lens group G1 and the second lens group G2, DD[9] is the distance between the second lens group G2 and the aperture stop St, and DD[21] is the distance between the third lens group G3 and the fourth lens group G4.

Table 2 shows various items with respect to the d line and the values of the above variable distances among surfaces at the wide angle end, an intermediate focal distance (abbreviated to "Intermediate" in Table 2, etc.), and at the telephoto end. The item "Focal Length" in Table 2 is the focal length of the entire system, the item. "F No." is the F number, and the item. "2ω" is the full angle of view (in units of degrees).

In the lens data of Table 1, surface numbers of aspherical surfaces are denoted with the mark "*", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients KA and Am (m=3, 4, 5, . . . , 20) in the following aspherical surface formula:

$$Zd=C \cdot h^2/\{1+(1-KA \cdot c^2 \cdot h^2)^{1/2}\}+\Sigma Am \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=3, 4, 5, . . . , 20).

Table 1 through Table 3 show numerical values which are rounded off at a predetermined number of digits. In addition, mm are used as the units for lengths in the data of the tables below. However, it is possible for optical systems to be proportionately enlarged or proportionately reduced and utilized. Therefore, other appropriate units may be used.

TABLE 1

Example 1: Lens Data

| Si (Surface Number) | Ri (Radius of Curvature) | Di (Distance) | Ndj (Refractive Index) | vdj (Abbe's Number) |
|---|---|---|---|---|
| 1 | 51.2772 | 1.37 | 1.92286 | 18.90 |
| 2 | 34.9710 | 5.20 | 1.83481 | 42.73 |
| 3 | 170.9704 | DD[3] | | |
| 4 | 45.0553 | 1.00 | 1.88300 | 40.76 |
| 5 | 10.3764 | 6.20 | | |
| *6 | −74.2538 | 1.05 | 1.58254 | 59.47 |
| *7 | 24.3554 | 0.10 | | |
| 8 | 18.4578 | 2.50 | 1.94595 | 17.98 |
| 9 | 41.9811 | DD[9] | | |
| 10 (aperture stop) | ∞ | 1.30 | | |
| *11 | 21.0609 | 3.30 | 1.80348 | 40.44 |
| *12 | −81.0221 | 1.56 | | |
| 13 | ∞ | 0.71 | 1.80000 | 29.84 |
| 14 | 13.1140 | 4.50 | 1.49700 | 81.54 |
| 15 | −13.1140 | 2.32 | | |
| *16 | −49.8789 | 1.00 | 1.58517 | 59.41 |
| *17 | 38.0025 | 5.20 | | |
| 18 | 48.9365 | 3.10 | 1.61800 | 63.33 |
| 19 | −26.6016 | 3.60 | | |
| 20 | −18.1159 | 0.80 | 1.54072 | 47.23 |
| 21 | ∞ | DD[21] | | |
| 22 | ∞ | 2.80 | 1.71299 | 53.87 |
| 23 | −65.0336 | 11.95 | | |
| 24 | ∞ | 2.85 | 1.51680 | 64.20 |
| 25 | ∞ | | | |

TABLE 2

Example 1: Items (related to d line)

| | Wide Angle End | Intermediate | Telephoto End |
|---|---|---|---|
| Zoom Magnification | 1.000 | 1.697 | 2.946 |
| Focal Length | 16.49 | 27.98 | 48.56 |
| F No. | 3.60 | 4.54 | 5.59 |
| 2ω (°) | 89.6 | 54.8 | 32.2 |
| DD[3] | 0.70 | 8.67 | 22.21 |
| DD[9] | 14.58 | 7.72 | 3.40 |
| DD[21] | 2.20 | 13.24 | 25.01 |

TABLE 3

Example 1: Aspherical Surface Coefficients

| Surface Number | 6 | 7 | 11 |
|---|---|---|---|
| KA | 1.0000000E+00 | 1.0000000E+00 | 1.0000000E+00 |
| A3 | 4.0933323E−04 | −1.2811739E−04 | 8.4079418E−05 |
| A4 | −6.0888867E−04 | −2.6404611E−04 | −1.5884117E−04 |
| A5 | 1.4419977E−04 | 4.0381724E−05 | 5.0163675E−05 |
| A6 | −1.4619676E−05 | 5.5734993E−07 | −8.3478199E−06 |
| A7 | 8.0416169E−08 | −6.1603008E−07 | −2.0759316E−06 |
| A8 | 6.1299999E−08 | −1.5625782E−09 | 8.7628996E−07 |
| A9 | 3.1292229E−09 | 6.4187304E−09 | −1.0381980E−07 |
| A10 | −1.7635605E−10 | 5.3217493E−10 | 3.9240483E−09 |
| A11 | −4.1002904E−11 | −1.9789871E−11 | −6.6439218E−10 |
| A12 | −3.4140583E−12 | −9.6388463E−12 | 5.2203771E−11 |
| A13 | −6.6094040E−14 | −1.0319722E−12 | 3.0635548E−11 |
| A14 | 2.4538915E−14 | −1.3216914E−14 | 1.2779807E−12 |
| A15 | 3.2551846E−15 | 1.0643318E−14 | −9.2825959E−13 |
| A16 | 3.5301237E−16 | 1.7477013E−15 | −1.4403526E−13 |
| A17 | −2.5050314E−17 | 1.1109141E−16 | −1.4596389E−14 |
| A18 | 3.1545594E−19 | −1.3183865E−17 | 4.0192223E−15 |
| A19 | −1.0455552E−19 | −2.3211123E−18 | 1.7353656E−15 |
| A20 | −1.2392007E−20 | 1.1419089E−19 | −2.0085297E−16 |

TABLE 3-continued

Example 1: Aspherical Surface Coefficients

| Surface Number | 7 | 16 | 17 |
|---|---|---|---|
| KA  | 1.0000000E+00  | 1.0000000E+00  | 1.0000000E+00  |
| A3  | −1.2811739E−04 | −2.2718447E−04 | 6.8549524E−05  |
| A4  | −2.6404611E−04 | 2.5114346E−04  | 8.8501534E−05  |
| A5  | 4.0381724E−05  | −4.9965869E−05 | −6.2564615E−06 |
| A6  | 5.5734993E−07  | 1.9673561E−06  | 5.6102257E−07  |
| A7  | −6.1603008E−07 | 8.9571158E−07  | −1.6412544E−07 |
| A8  | −1.5625782E−08 | 8.1475858E−08  | 7.8367930E−09  |
| A9  | 6.4187304E−09  | −8.8732257E−09 | 8.2051813E−09  |
| A10 | 5.3217493E−10  | −4.0745601E−09 | 1.6270042E−09  |
| A11 | −1.9789871E−11 | −6.4029472E−10 | 1.0734148E−10  |
| A12 | −9.6388463E−12 | −3.1160921E−11 | −3.2465246E−11 |
| A13 | −1.0319722E−12 | 1.2425429E−11  | −1.3240197E−11 |
| A14 | −1.3216914E−14 | 4.5091154E−12  | −2.7277581E−12 |
| A15 | 1.0643318E−14  | 7.7613196E−13  | −2.9460504E−13 |
| A16 | 1.7477013E−15  | 5.1227760E−14  | 1.8727986E−14  |
| A17 | 1.1109141E−16  | −1.5128955E−14 | 1.9093148E−14  |
| A18 | −1.3183865E−17 | −6.5219152E−15 | 4.9610731E−15  |
| A19 | −2.3211123E−18 | −9.7400580E−16 | 4.8546866E−16  |
| A20 | 1.1419089E−19  | 2.4600407E−16  | −2.1226761E−16 |

The spherical aberration, the astigmatic aberration, the distortion, and the lateral chromatic aberration of the zoom lens of Example 1 at the wide angle end are illustrated in A through D of FIG. 8, respectively. The spherical aberration, the astigmatic aberration, the distortion, and the lateral chromatic aberration of the zoom lens of Example 1 at the intermediate focal distance are illustrated in E through H of FIG. 8, respectively. The spherical aberration, the astigmatic aberration, the distortion, and the lateral chromatic aberration of the zoom lens of Example 1 at the telephoto end are illustrated in I through L of FIG. 8, respectively. The aberrations illustrated in A through L of FIG. 8 are all for a state in which the zoom lens of Example 1 is focused on an object at infinity.

Each of the diagrams that illustrate the aberrations is related to the d line. However, the diagrams that illustrate spherical aberration also show aberrations related to the C line (wavelength: 656.27 nm), the F line (wavelength: 486.13 nm), and the g line (wavelength: 435.84 nm). In addition, the diagrams that illustrate lateral chromatic aberration also show aberrations related to the C line, the F line, and the g line. In the diagrams that illustrate astigmatic aberrations, aberrations in the sagittal direction are indicated by solid lines denoted by (S), while aberrations in the tangential direction are indicated by broken lines denoted by (T). In the diagrams that illustrate spherical aberrations, "Fno." denotes F numbers. In the other diagrams that illustrate the aberrations, ω denotes half angles of view.

A through J of FIG. 14 illustrate lateral aberration of the zoom lens of Example 1 at the wide angle end. Here, the aberrations are illustrated in two columns to the right and left. The diagrams in the left column illustrate aberrations related to the tangential direction, and the diagrams in the right column illustrate aberrations related to the sagittal direction. In addition, the diagrams at the upper half illustrate aberrations when camera shake is not corrected, and the diagrams at the lower half illustrate aberrations when camera shake, in which the optical axis is tilted by 0.3 degrees, is corrected. A shows the aberration at the center of the imaging surface, B and C show aberrations at positions 80% of a maximum image height toward a + side, and D and E show aberrations at positions 80% of a maximum image height toward a − side, when camera shake is not corrected. F shows the aberration at the center of the imaging surface, G and H show aberrations at positions 80% of a maximum image height toward a + side, and I and J show aberrations at positions 80% of a maximum image height toward a − side, when camera shake is corrected.

A through J of FIG. 15 illustrate lateral aberration of the zoom lens of Example 1 at the intermediate focal length. A through J of FIG. 16 illustrate lateral aberration of the zoom lens of Example 1 at the telephoto end. The manners in which the aberrations are illustrated in these figures are the same as those in A through J of FIG. 14 described above.

Note that FIG. 14 through FIG. 16 show lateral aberrations related to the d line, the C line, the F line, and the g line. In addition, the lateral aberrations are all for a state in which the zoom lens is focused on an object at infinity. In the diagrams that illustrate the aberrations, ω denotes a half angle of view.

The symbols, the meanings, and the manner in which the data are shown in the description of Example 1 above are the same for the following Examples to be described later, unless particularly noted. Therefore, redundant descriptions thereof will be omitted below.

EXAMPLE 2

The zoom lens of Example 2 is of the configuration illustrated in FIG. 2. The zoom lens of Example 2 differs from that of Example 1 in that a 3-2 lens group G32 is constituted by four lenses L34 through L37. Note that the lens L36 and the lens L37 are cemented together.

Basic lens data of Example 2 are shown in Table 4, items and variable distances among surfaces of Example 2 are shown in Table 5, and aspherical surface coefficients of Example 2 are shown in Table 6.

TABLE 4

Example 2: Lens Data

| Si (Surface Number) | Ri (Radius of Curvature) | Di (Distance) | Ndj (Refractive Index) | νdj (Abbe's Number) |
|---|---|---|---|---|
| 1 | 49.9105 | 1.36 | 1.92286 | 18.90 |
| 2 | 35.0001 | 5.20 | 1.83481 | 42.73 |
| 3 | 167.5423 | DD[3] | | |
| 4 | 49.8366 | 1.00 | 1.88300 | 40.76 |
| 5 | 9.6485 | 5.40 | | |
| *6 | −85.9339 | 1.05 | 1.58313 | 59.46 |
| *7 | 24.1078 | 0.10 | | |
| 8 | 17.3776 | 2.50 | 1.94595 | 17.98 |
| 9 | 41.4820 | DD[9] | | |
| 10 (aperture stop) | ∞ | 1.30 | | |
| *11 | 12.5793 | 2.40 | 1.80348 | 40.44 |
| *12 | 36.0651 | 1.87 | | |
| 13 | −214748.3648 | 0.71 | 1.80000 | 29.84 |
| 14 | 12.0002 | 4.00 | 1.49700 | 81.54 |
| 15 | −11.7909 | 2.20 | | |
| *16 | −40.4311 | 1.00 | 1.58313 | 59.46 |
| *17 | 43.7015 | 4.55 | | |
| 18 | 34.3300 | 2.80 | 1.80400 | 46.58 |
| 19 | −44.8234 | 3.80 | | |
| 20 | −30.9850 | 0.81 | 1.82000 | 35.43 |
| 21 | 23.6781 | 3.50 | 1.62651 | 37.07 |
| 22 | −156.9115 | DD[22] | | |
| 23 | 294.1591 | 2.40 | 1.83400 | 37.16 |
| 24 | −121.9693 | 11.83 | | |
| 25 | ∞ | 2.85 | 1.51680 | 64.20 |
| 26 | ∞ | | | |

TABLE 5

Example 2: Items (related to d line)

|  | Wide Angle End | Intermediate | Telephoto End |
|---|---|---|---|
| Zoom Magnification | 1.000 | 1.697 | 2.946 |
| Focal Length | 16.46 | 27.93 | 48.48 |
| F No. | 3.60 | 4.59 | 5.78 |
| 2ω (°) | 90.4 | 55.0 | 32.4 |
| DD[3] | 0.70 | 9.53 | 21.85 |
| DD[9] | 14.27 | 7.80 | 3.50 |
| DD[22] | 2.20 | 12.77 | 24.99 |

TABLE 6

Example 2: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 3.7983462E-05 | -1.3713510E-05 | 8.2114350E-05 |
| A4 | -4.7669514E-04 | -1.8513738E-04 | 3.6614246E-05 |
| A5 | 1.2923426E-04 | 4.4407209E-05 | 4.7713523E-05 |
| A6 | -1.4331584E-05 | -1.9289691E-06 | -7.6044525E-06 |
| A7 | 4.6028189E-08 | -7.1751079E-07 | -1.7726691E-06 |
| A8 | 5.3354211E-08 | 9.5172686E-09 | 9.2529202E-07 |
| A9 | 2.8890599E-09 | 8.6478543E-09 | -1.0318519E-07 |
| A10 | -7.9004021E-11 | 6.6010150E-10 | 2.4378472E-09 |
| A11 | -1.9212654E-11 | -2.5529911E-11 | -9.9004763E-10 |
| A12 | -1.6361184E-12 | -1.1352628E-11 | 1.3072428E-11 |
| A13 | -3.3626876E-14 | -1.2246918E-12 | 3.1468000E-11 |
| A14 | -3.9834365E-15 | -1.3081256E-14 | 3.7323465E-12 |
| A15 | -9.2017660E-16 | 1.2100075E-14 | -3.3490212E-13 |
| A16 | -7.6222606E-17 | 1.9905151E-15 | -7.6450719E-14 |
| A17 | -1.6207022E-17 | 1.0147215E-16 | -1.5072491E-14 |
| A18 | 5.5948006E-18 | -1.7184201E-17 | 2.2299890E-16 |
| A19 | 6.4021482E-19 | -3.0519672E-18 | 6.0140766E-16 |
| A20 | -6.8206237E-20 | 2.3099215E-19 | -4.1905599E-17 |

| | Surface Number | | |
|---|---|---|---|
| | 12 | 16 | 17 |
| KA | 1.0000000E+00 | 1.0000000E+00 | 1.0000000E+00 |
| A3 | 8.3595692E-05 | -2.8952110E-04 | -6.2156786E-05 |
| A4 | 2.7079843E-04 | 2.3997470E-04 | 1.7426031E-04 |
| A5 | -4.3006378E-05 | -2.1646424E-05 | -1.4987524E-05 |
| A6 | 2.8900666E-05 | 6.5947442E-07 | 8.3858816E-07 |
| A7 | -5.7702563E-06 | 5.2349580E-08 | -9.6944745E-09 |
| A8 | 2.7120620E-07 | 8.2004698E-10 | -4.6547635E-10 |
| A9 | -7.5099819E-09 | -6.4096538E-11 | -9.9826360E-12 |
| A10 | 1.9730052E-08 | -1.6473447E-11 | -2.4443583E-12 |
| A11 | -3.1874785E-10 | -3.1780447E-12 | -1.0286381E-12 |
| A12 | -4.9589636E-10 | -7.0899542E-13 | -3.2394496E-13 |
| A13 | -7.1860341E-11 | -1.2752466E-13 | -7.1484719E-14 |
| A14 | 7.3185676E-12 | -2.4558084E-15 | -2.2161242E-14 |
| A15 | 6.0578766E-12 | -3.5184627E-15 | -2.3497226E-15 |
| A16 | -8.0673594E-13 | 1.5247473E-15 | -1.0562438E-15 |
| A17 | -1.7788432E-14 | 6.9877083E-16 | 3.1560687E-16 |
| A18 | -1.1716156E-15 | 8.4448306E-17 | 1.5446758E-16 |
| A19 | 1.3688371E-15 | -8.9863419E-18 | 5.3836889E-18 |
| A20 | -8.3678512E-17 | 8.4562781E-18 | -4.2910507E-19 |

A through L of FIG. 9 are diagrams that illustrate aberrations of the zoom lens of Example 2 (the types of aberrations are the same as those shown for Example 1). In addition, FIG. 17 through FIG. 19 are collections of diagrams that illustrate lateral aberrations of the zoom lens of Example 2.

EXAMPLE 3

The zoom lens of Example 3 is of the configuration illustrated in FIG. 3. The zoom lens of Example 3 differs from that of Example 1 in that a 3-2 lens group G32 is constituted by four lenses L34 through L37. Note that the lens L36 and the lens L37 are cemented together.

Basic lens data of Example 3 are shown in Table 7, items and variable distances among surfaces of Example 3 are shown in Table 8, and aspherical surface coefficients of Example 3 are shown in Table 9.

TABLE 7

Example 3: Lens Data

| Si (Surface Number) | Ri (Radius of Curvature) | Di (Distance) | Ndj (Refractive Index) | νdj (Abbe's Number) |
|---|---|---|---|---|
| 1 | 49.6209 | 1.36 | 1.92286 | 18.90 |
| 2 | 34.9993 | 5.20 | 1.83481 | 42.73 |
| 3 | 160.4833 | DD[3] | | |
| 4 | 44.9993 | 1.00 | 1.88300 | 40.76 |
| 5 | 10.0300 | 5.80 | | |
| *6 | -100.2320 | 1.05 | 1.58313 | 59.46 |
| *7 | 21.3441 | 0.14 | | |
| 8 | 16.8926 | 2.50 | 1.94595 | 17.98 |
| 9 | 36.4909 | DD[9] | | |
| 10 (aperture stop) | ∞ | 1.30 | | |
| *11 | 18.6899 | 2.45 | 1.80348 | 40.44 |
| *12 | -2970.5634 | 1.89 | | |
| 13 | -214748.3648 | 0.71 | 1.82000 | 27.90 |
| 14 | 15.1326 | 4.01 | 1.49700 | 81.54 |
| 15 | -12.6541 | 2.20 | | |
| *16 | -57.2230 | 1.00 | 1.58313 | 59.46 |
| *17 | 37.9995 | 4.47 | | |
| 18 | 38.7071 | 2.80 | 1.70904 | 56.05 |
| 19 | -34.3705 | 3.80 | | |
| 20 | -20.4469 | 0.81 | 1.71345 | 39.36 |
| 21 | 23.3700 | 3.10 | 1.63210 | 37.04 |
| 22 | -101.5658 | DD[22] | | |
| 23 | -3297.4418 | 2.40 | 1.82001 | 46.00 |
| 24 | -77.6992 | 11.83 | | |
| 25 | ∞ | 2.85 | 1.54763 | 54.98 |
| 26 | ∞ | | | |

TABLE 8

Example 3: Items (related to d line)

|  | Wide Angle End | Intermediate | Telephoto End |
|---|---|---|---|
| Zoom Magnification | 1.000 | 1.697 | 2.946 |
| Focal Length | 16.49 | 27.99 | 48.58 |
| F No. | 3.63 | 4.61 | 5.81 |
| 2ω (°) | 90.8 | 55.2 | 32.4 |
| DD[3] | 0.70 | 9.36 | 21.88 |
| DD[9] | 14.14 | 7.72 | 3.49 |
| DD[22] | 2.20 | 12.81 | 24.90 |

TABLE 9

Example 3: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | -1.4765855E-04 | -5.4641030E-04 | 1.0852813E-05 |
| A4 | -4.8625792E-04 | -2.3461534E-04 | -7.4855809E-05 |

TABLE 9-continued

Example 3: Aspherical Surface Coefficients

| | | | |
|---|---|---|---|
| A5 | 1.3167844E−04 | 5.5223344E−05 | 3.9599921E−05 |
| A6 | −1.4177767E−05 | −1.4244118E−06 | −8.9390256E−06 |
| A7 | 1.0353715E−07 | −7.6122510E−07 | −1.8348813E−06 |
| A8 | 5.6316752E−08 | 5.4180143E−09 | 9.3341107E−07 |
| A9 | 2.5791702E−09 | 8.7801675E−09 | −1.0053916E−07 |
| A10 | −1.5545520E−10 | 7.1755496E−10 | 2.7741610E−09 |
| A11 | −2.7284805E−11 | −2.1094980E−11 | −9.9974413E−10 |
| A12 | −2.0597181E−12 | −1.1627035E−11 | −5.4893535E−12 |
| A13 | −1.0293307E−14 | −1.3520454E−12 | 2.5392007E−11 |
| A14 | 4.9582884E−15 | −3.1622439E−14 | 2.4234326E−12 |
| A15 | 3.0618207E−16 | 1.0764336E−14 | −5.2758878E−13 |
| A16 | 3.3012078E−17 | 2.0690619E−15 | −8.3511130E−14 |
| A17 | −1.1883153E−17 | 1.4287425E−16 | −8.4534949E−15 |
| A18 | 5.0695607E−18 | −1.0531626E−17 | 2.7749940E−15 |
| A19 | 5.1472711E−19 | −2.6774878E−18 | 1.0294153E−15 |
| A20 | −7.9425527E−20 | 1.0075228E−19 | −1.2938586E−16 |

| | Surface Number | | |
|---|---|---|---|
| | 12 | 16 | 17 |
| KA | 1.0000000E+00 | 1.0000000E+00 | 1.0000000E+00 |
| A3 | 1.3354157E−05 | −1.8475321E−04 | −2.7104807E−05 |
| A4 | 9.3838025E−05 | 2.2412869E−04 | 1.6384072E−04 |
| A5 | −5.4418771E−05 | −2.9386889E−05 | −1.4813610E−05 |
| A6 | 2.7739702E−05 | 1.8983059E−06 | 7.7235370E−07 |
| A7 | −5.8667790E−06 | 4.4876342E−07 | 2.3347243E−09 |
| A8 | 2.6426678E−07 | 1.1931679E−08 | 1.5866531E−08 |
| A9 | −7.8853860E−09 | −1.0807183E−08 | 4.3548581E−09 |
| A10 | 1.9662739E−08 | −2.5215812E−09 | 5.0456663E−10 |
| A11 | −3.4216618E−10 | −2.0300390E−10 | −3.8430193E−11 |
| A12 | −5.0228210E−10 | 3.8318033E−11 | −3.2341222E−11 |
| A13 | −7.3437667E−11 | 1.7704485E−11 | −8.3678858E−12 |
| A14 | 7.0204465E−12 | 3.5823309E−12 | −1.3123551E−12 |
| A15 | 6.0100110E−12 | 3.4592999E−13 | −6.7305410E−14 |
| A16 | −8.1353849E−13 | −4.1162058E−14 | 3.3626761E−14 |
| A17 | −1.7966048E−14 | −2.7781574E−14 | 1.4645816E−14 |
| A18 | −9.4865726E−16 | −6.8630813E−15 | 3.1878332E−15 |
| A19 | 1.4608591E−15 | −6.1332048E−16 | 2.1003518E−16 |
| A20 | −5.4064725E−17 | 3.4444540E−16 | −1.5985069E−16 |

A through L of FIG. 10 are diagrams that illustrate aberrations of the zoom lens of Example 3 (the types of aberrations are the same as those shown for Example 1). In addition, FIG. 20 through FIG. 22 are collections of diagrams that illustrate lateral aberrations of the zoom lens of Example 3.

EXAMPLE 4

The zoom lens of Example 4 is of the configuration illustrated in FIG. 4. Basic lens data of Example 4 are shown in Table 10, items and variable distances among surfaces of Example 4 are shown in Table 11, and aspherical surface coefficients of Example 4 are shown in Table 12.

TABLE 10

Example 4: Lens Data

| Si (Surface Number) | Ri (Radius of Curvature) | Di (Distance) | Ndj (Refractive Index) | νdj (Abbe's Number) |
|---|---|---|---|---|
| 1 | 51.0204 | 1.36 | 1.92286 | 18.90 |
| 2 | 35.4440 | 5.20 | 1.83481 | 42.73 |
| 3 | 169.7109 | DD[3] | | |
| 4 | 46.1295 | 1.00 | 1.88300 | 40.76 |
| 5 | 10.3417 | 6.20 | | |
| *6 | −77.7133 | 1.05 | 1.58063 | 59.15 |
| *7 | 24.4564 | 0.10 | | |
| 8 | 18.7277 | 2.50 | 1.94595 | 17.98 |
| 9 | 42.0003 | DD[9] | | |
| 10 (aperture stop) | ∞ | 1.30 | | |
| *11 | 21.9513 | 3.30 | 1.80348 | 40.44 |
| *12 | −90.2615 | 1.82 | | |
| 13 | ∞ | 0.71 | 1.80000 | 29.84 |
| 14 | 13.6541 | 4.71 | 1.49700 | 81.54 |
| 15 | −13.6541 | 2.20 | | |
| *16 | −77.0729 | 1.00 | 1.58063 | 59.15 |
| *17 | 48.5929 | 5.20 | | |
| 18 | 53.1272 | 3.10 | 1.61800 | 63.33 |
| 19 | −29.6603 | 3.60 | | |
| 20 | −17.9241 | 0.80 | 1.53172 | 48.84 |
| 21 | ∞ | DD[21] | | |
| 22 | ∞ | 2.80 | 1.71299 | 53.87 |
| 23 | −75.5885 | 11.95 | | |
| 24 | ∞ | 2.85 | 1.51680 | 64.20 |
| 25 | ∞ | | | |

TABLE 11

Example 4: Items (related to d line)

| | Wide Angle End | Intermediate | Telephoto End |
|---|---|---|---|
| Zoom Magnification | 1.000 | 1.697 | 2.946 |
| Focal Length | 16.50 | 27.99 | 48.59 |
| F No. | 3.60 | 4.57 | 5.76 |
| 2ω (°) | 89.8 | 55.0 | 32.2 |
| DD[3] | 0.70 | 7.97 | 21.38 |
| DD[9] | 14.35 | 7.39 | 3.12 |
| DD[21] | 2.20 | 13.28 | 25.02 |

TABLE 12

Example 4: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 2.9672130E−04 | −2.1892949E−04 | −8.2983816E−06 |
| A4 | −5.4955966E−04 | −2.4673796E−04 | −1.0903663E−04 |
| A5 | 1.3511333E−04 | 4.7754473E−05 | 3.9947552E−05 |
| A6 | −1.4222700E−05 | −1.0776574E−06 | −8.9819580E−06 |
| A7 | 9.2033531E−08 | −6.8294433E−07 | −1.9084984E−06 |
| A8 | 5.9200809E−08 | 8.7686793E−09 | 9.1885918E−07 |
| A9 | 3.0971072E−09 | 8.4031379E−09 | −1.0129499E−07 |
| A10 | −1.3923193E−10 | 6.6038494E−10 | 3.1103377E−09 |
| A11 | −3.3623728E−11 | −2.5255928E−11 | −8.8263964E−10 |
| A12 | −3.2954555E−12 | −1.1712202E−11 | 1.7287195E−11 |
| A13 | −1.1080966E−13 | −1.3946328E−12 | 2.8125655E−11 |
| A14 | 6.0145658E−15 | −3.9487643E−14 | 2.3977508E−12 |
| A15 | 1.7701054E−15 | 9.6566158E−15 | −6.1312525E−13 |
| A16 | 2.4843809E−16 | 2.1111601E−15 | −1.0719878E−13 |
| A17 | 4.2166955E−19 | 1.7484288E−16 | −1.2066232E−14 |
| A18 | 4.2308906E−18 | −3.8321743E−18 | 2.6442409E−15 |
| A19 | 2.3888337E−19 | −2.2140997E−18 | 1.1281265E−15 |
| A20 | −7.5272974E−20 | −3.7026635E−20 | −1.2731435E−16 |

| | Surface Number | | |
|---|---|---|---|
| | 12 | 16 | 17 |
| KA | 1.0000000E+00 | 1.0000000E+00 | 1.0000000E+00 |
| A3 | −9.7334742E−07 | −2.2884532E−04 | −4.6886096E−05 |
| A4 | 3.8530133E−05 | 1.9013540E−04 | 1.1644194E−04 |

TABLE 12-continued

Example 4: Aspherical Surface Coefficients

| | | | |
|---|---|---|---|
| A5 | −5.7115607E−05 | −3.5479825E−05 | −1.5775715E−05 |
| A6 | 2.7528873E−05 | 2.0361279E−06 | 9.6107425E−07 |
| A7 | −5.8665589E−06 | 6.3751523E−07 | 4.5308513E−08 |
| A8 | 2.6958767E−07 | 4.9107752E−08 | 2.4602042E−08 |
| A9 | −6.6758591E−09 | −7.6046835E−09 | 5.9680459E−09 |
| A10 | 1.9827070E−08 | −2.9051179E−09 | 7.4130689E−10 |
| A11 | −3.3128209E−10 | −4.2111471E−10 | −2.1682215E−11 |
| A12 | −5.0460072E−10 | −1.3360337E−11 | −3.5845458E−11 |
| A13 | −7.4128698E−11 | 9.9190349E−12 | −1.0038829E−11 |
| A14 | 6.9448678E−12 | 3.1655886E−12 | −1.7245978E−12 |
| A15 | 6.0097044E−12 | 5.2049778E−13 | −1.3337483E−13 |
| A16 | −8.0758150E−13 | 3.4342588E−14 | 2.8221441E−14 |
| A17 | −1.6327537E−14 | −9.5279779E−15 | 1.5516333E−14 |
| A18 | −3.9861242E−16 | −4.2244087E−15 | 3.6045923E−15 |
| A19 | 1.4322616E−15 | −6.6044624E−16 | 2.8661253E−16 |
| A20 | −8.6222508E−17 | 1.3773764E−16 | −1.6924525E−16 |

A through L of FIG. 11 are diagrams that illustrate aberrations of the zoom lens of Example 4 (the types of aberrations are the same as those shown for Example 1). In addition, FIG. 23 through FIG. 25 are collections of diagrams that illustrate lateral aberrations of the zoom lens of Example 4.

EXAMPLE 5

The zoom lens of Example 5 is of the configuration illustrated in FIG. 5. Basic lens data of Example 5 are shown in Table 13, items and variable distances among surfaces of Example 5 are shown in Table 14, and aspherical surface coefficients of Example 5 are shown in Table 15.

TABLE 13

Example 5: Lens Data

| Si (Surface Number) | Ri (Radius of Curvature) | Di (Distance) | Ndj (Refractive Index) | vdj (Abbe's Number) |
|---|---|---|---|---|
| 1 | 50.7584 | 1.36 | 1.92286 | 18.90 |
| 2 | 35.3960 | 5.20 | 1.83481 | 42.73 |
| 3 | 172.5090 | DD[3] | | |
| 4 | 45.6995 | 1.00 | 1.88300 | 40.76 |
| 5 | 10.3829 | 6.20 | | |
| *6 | −79.1957 | 1.05 | 1.58063 | 59.15 |
| *7 | 24.5916 | 0.13 | | |
| 8 | 18.6905 | 2.50 | 1.94595 | 17.98 |
| 9 | 42.1169 | DD[9] | | |
| 10 (aperture stop) | ∞ | 1.30 | | |
| *11 | 21.8562 | 2.67 | 1.80348 | 40.44 |
| *12 | −89.2045 | 1.87 | | |
| 13 | ∞ | 0.71 | 1.80000 | 29.84 |
| 14 | 13.4916 | 4.79 | 1.49700 | 81.54 |
| 15 | −13.4916 | 2.51 | | |
| *16 | −65.5278 | 1.00 | 1.58063 | 59.15 |
| *17 | 43.5543 | 5.20 | | |
| 18 | 52.6806 | 3.10 | 1.61800 | 63.33 |
| 19 | −29.4392 | 3.60 | | |
| 20 | −18.0675 | 0.80 | 1.53172 | 48.84 |
| 21 | ∞ | DD[21] | | |
| 22 | ∞ | 2.80 | 1.71299 | 53.87 |
| 23 | −60.0620 | 11.95 | | |
| 24 | ∞ | 2.85 | 1.51680 | 64.20 |
| 25 | ∞ | | | |

TABLE 14

Example 5: Items (related to d line)

| | Wide Angle End | Intermediate | Telephoto End |
|---|---|---|---|
| Zoom Magnification | 1.000 | 1.697 | 2.946 |
| Focal Length | 16.52 | 28.03 | 48.66 |
| F No. | 3.59 | 4.54 | 5.62 |
| 2ω (°) | 89.4 | 54.8 | 32.2 |
| DD[3] | 0.70 | 8.54 | 22.04 |
| DD[9] | 14.56 | 7.73 | 3.43 |
| DD[21] | 2.20 | 13.36 | 24.95 |

TABLE 15

Example 5: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 1.3261466E−04 | −3.2535960E−04 | 2.6294284E−05 |
| A4 | −5.4682543E−04 | −2.5379984E−04 | −1.1637710E−04 |
| A5 | 1.3565342E−04 | 4.8091827E−05 | 3.9422076E−05 |
| A6 | −1.4185107E−05 | −9.3857983E−07 | −8.9945096E−06 |
| A7 | 9.5421085E−08 | −6.6624311E−07 | −1.9079783E−06 |
| A8 | 5.9631616E−08 | 9.8143733E−09 | 9.1846164E−07 |
| A9 | 3.1386593E−09 | 8.3599640E−09 | −1.0148435E−07 |
| A10 | −1.3822195E−10 | 6.4321867E−10 | 3.0613861E−09 |
| A11 | −3.4107461E−11 | −2.7310772E−11 | −8.9251715E−10 |
| A12 | −3.4036975E−12 | −1.1959289E−11 | 1.5660735E−11 |
| A13 | −1.2451233E−13 | −1.4007516E−12 | 2.7910491E−11 |
| A14 | 4.8471380E−15 | −3.9869227E−14 | 2.3779804E−12 |
| A15 | 1.7134692E−15 | 9.8853248E−15 | −6.1234031E−13 |
| A16 | 2.5051251E−16 | 2.1174214E−15 | −1.0624393E−13 |
| A17 | 1.1358833E−18 | 1.7756233E−16 | −1.1791378E−14 |
| A18 | 4.3278274E−18 | −3.9729409E−18 | 2.6975712E−15 |
| A19 | 2.4800382E−19 | −2.1787272E−18 | 1.1329425E−15 |
| A20 | −7.3205718E−20 | −3.7402136E−20 | −1.2948261E−16 |

| | Surface Number | | |
|---|---|---|---|
| | 12 | 16 | 17 |
| KA | 1.0000000E+00 | 1.0000000E+00 | 1.0000000E+00 |
| A3 | 1.9526224E−05 | −1.8360679E−04 | 2.5717863E−06 |
| A4 | 3.7582449E−05 | 1.9368904E−04 | 1.2010679E−04 |
| A5 | −5.7284888E−05 | −3.5237961E−05 | −1.5429248E−05 |
| A6 | 2.7458550E−05 | 2.0859307E−06 | 9.5831263E−07 |
| A7 | −5.8809212E−06 | 6.4568744E−07 | 3.8362823E−08 |
| A8 | 2.6764805E−07 | 4.9544239E−08 | 2.3179864E−08 |
| A9 | −6.8421070E−09 | −7.8058311E−09 | 5.7935754E−09 |
| A10 | 1.9828373E−08 | −2.9887460E−09 | 7.3191964E−10 |
| A11 | −3.2761969E−10 | −4.4086247E−10 | −1.9902190E−11 |
| A12 | −5.0392516E−10 | −1.6646737E−11 | −3.5193428E−11 |
| A13 | −7.4083489E−11 | 9.5996000E−12 | −9.9287205E−12 |
| A14 | 6.9293510E−12 | 3.1905268E−12 | −1.7170673E−12 |
| A15 | 6.0015653E−12 | 5.4270137E−13 | −1.3544163E−13 |
| A16 | −8.0969893E−13 | 4.1092155E−14 | 2.7232681E−14 |
| A17 | −1.6735466E−14 | −8.1318557E−15 | 1.5276751E−14 |
| A18 | −4.3695473E−16 | −4.0481586E−15 | 3.5691419E−15 |
| A19 | 1.4359945E−15 | −6.7263597E−16 | 2.8689331E−16 |
| A20 | −8.1457656E−17 | 1.1996698E−16 | −1.6672489E−16 |

A through L of FIG. 12 are diagrams that illustrate aberrations of the zoom lens of Example 5 (the types of aberrations are the same as those shown for Example 1). In addition, FIG. 26 through FIG. 28 are collections of diagrams that illustrate lateral aberrations of the zoom lens of Example 5.

EXAMPLE 6

The zoom lens of Example 6 is of the configuration illustrated in FIG. 6. The zoom lens of the present example is of a three group configuration, substantially constituted by a first lens group G1, a second lens group G2, and a third lens group G3, provided in this order from the object side. The signs of the refractive powers of the lens groups are positive, negative, and positive, in this order from the first lens group G1. The third lens group G3 substantially consists of a 3-1 lens group G31 having a positive refractive power, and a 3-2 lens group G32 having a positive refractive power, provided in this order from the object side.

The first lens group G1 through the third lens group G3 move along the optical axis Z while changing magnification, and all of the lenses of the third lens group G3 move integrally. The shake preventing lens is a lens L34 and the focusing lens is a lens L35 within the 3-2 lens group G32.

The zoom lens of Example 6 differs from that of Example 1 in that it is of a three group configuration as described above, and in that the 3-2 lens group G32 is constituted by four lenses L34 through L37. Note that the lens L36 and the lens L37 are cemented together.

Basic lens data of Example 6 are shown in Table 16, items and variable distances among surfaces of Example 6 are shown in Table 17, and aspherical surface coefficients of Example 6 are shown in Table 18.

TABLE 16

Example 6: Lens Data

| Si (Surface Number) | Ri (Radius of Curvature) | Di (Distance) | Ndj (Refractive Index) | νdj (Abbe's Number) |
|---|---|---|---|---|
| 1 | 52.5324 | 1.36 | 1.92286 | 18.90 |
| 2 | 34.9993 | 5.20 | 1.83481 | 42.73 |
| 3 | 155.9910 | DD[3] | | |
| 4 | 44.3577 | 1.00 | 1.88300 | 40.76 |
| 5 | 9.7030 | 5.00 | | |
| *6 | −147.2748 | 1.05 | 1.58313 | 59.46 |
| *7 | 21.7377 | 0.82 | | |
| 8 | 16.6255 | 2.15 | 1.92286 | 18.90 |
| 9 | 33.7710 | DD[9] | | |
| 10 (aperture stop) | ∞ | 1.30 | | |
| *11 | 15.0054 | 2.57 | 1.80348 | 40.44 |
| *12 | 158.5112 | 1.10 | | |
| 13 | 214748.3648 | 1.51 | 1.79826 | 32.02 |
| 14 | 12.0001 | 4.37 | 1.49700 | 81.54 |
| 15 | −13.0182 | 2.65 | | |
| *16 | −41.5811 | 1.00 | 1.58313 | 59.46 |
| *17 | 38.0000 | 4.26 | | |
| 18 | 36.6580 | 2.90 | 1.52000 | 62.41 |
| 19 | −21.9682 | 5.00 | | |
| 20 | −15.2743 | 0.81 | 1.68546 | 42.57 |
| 21 | 81.8710 | 4.10 | 1.51999 | 58.79 |
| 22 | −21.4844 | DD[22] | | |
| 23 | ∞ | 2.85 | 1.51680 | 64.20 |
| 24 | ∞ | | | |

TABLE 17

Example 6: Items (related to d line)

| | Wide Angle End | Intermediate | Telephoto End |
|---|---|---|---|
| Zoom Magnification | 1.000 | 1.697 | 2.880 |
| Focal Length | 16.54 | 28.08 | 47.65 |
| F No. | 3.66 | 4.54 | 5.66 |

TABLE 17-continued

Example 6: Items (related to d line)

| | Wide Angle End | Intermediate | Telephoto End |
|---|---|---|---|
| 2ω (°) | 89.0 | 54.2 | 32.8 |
| DD[3] | 0.70 | 11.33 | 23.73 |
| DD[9] | 15.30 | 7.79 | 2.90 |
| DD[22] | 13.14 | 22.38 | 33.64 |

TABLE 18

Example 6: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 7.4492437E−04 | 1.7246551E−04 | 1.2175282E−04 |
| A4 | −4.9211126E−04 | −1.8650623E−04 | −2.8127187E−05 |
| A5 | 1.2866400E−04 | 4.3309989E−05 | 4.7953381E−05 |
| A6 | −1.4318504E−05 | −1.9258444E−06 | −7.7133192E−06 |
| A7 | 4.8889306E−08 | −7.1843171E−07 | −1.7754028E−06 |
| A8 | 5.3418090E−08 | 9.5043479E−09 | 9.2529064E−07 |
| A9 | 2.8895027E−09 | 8.6482099E−09 | −1.0317348E−07 |
| A10 | −7.9019687E−11 | 6.6012542E−10 | 2.4407837E−09 |
| A11 | −1.9213397E−11 | −2.5528967E−11 | −9.8946205E−10 |
| A12 | −1.6360946E−12 | −1.1352655E−11 | 1.3198880E−11 |
| A13 | −3.3615204E−14 | −1.2247232E−12 | 3.1483667E−11 |
| A14 | −3.9806794E−15 | −1.3084852E−14 | 3.7339371E−12 |
| A15 | −9.1991966E−16 | 1.2099184E−14 | −3.3451749E−13 |
| A16 | −7.6108531E−17 | 1.9903781E−15 | −7.6533568E−14 |
| A17 | −1.6198231E−17 | 1.0146700E−16 | −1.5121485E−14 |
| A18 | 5.5944131E−18 | −1.7186752E−17 | 2.2019003E−16 |
| A19 | 6.4042806E−19 | −3.0521538E−18 | 5.9907996E−16 |
| A20 | −6.8181013E−20 | 2.3151638E−19 | −4.2063568E−17 |

| | Surface Number | | |
|---|---|---|---|
| | 12 | 16 | 17 |
| KA | 1.0000000E+00 | 1.0000000E+00 | 1.0000000E+00 |
| A3 | 1.1730716E−04 | −1.1556655E−04 | 4.4374440E−05 |
| A4 | 1.8116281E−04 | 1.8030445E−04 | 1.4454044E−04 |
| A5 | −5.0105691E−05 | −1.7745478E−05 | −1.7475468E−05 |
| A6 | 2.8908762E−05 | 5.4873226E−07 | 1.0616632E−06 |
| A7 | −5.7688507E−06 | 4.9263479E−08 | −3.6965003E−09 |
| A8 | 2.7114249E−07 | 8.1453583E−10 | −3.6976883E−10 |
| A9 | −7.5352016E−09 | −5.4529042E−11 | −8.5041595E−12 |
| A10 | 1.9724382E−08 | −1.4184544E−11 | −2.3727146E−12 |
| A11 | −3.2003289E−10 | −2.6673531E−12 | −1.0137866E−12 |
| A12 | −4.9611152E−10 | −5.8464510E−13 | −3.2115813E−13 |
| A13 | −7.1884317E−11 | −1.1450158E−13 | −6.6629968E−14 |
| A14 | 7.3144964E−12 | 1.3723646E−16 | −2.0880463E−14 |
| A15 | 6.0587160E−12 | −3.2692618E−15 | −2.0629033E−15 |
| A16 | −8.0616185E−13 | 1.5654725E−15 | −1.0696992E−15 |
| A17 | −1.7708625E−14 | 5.4625675E−16 | 3.0037479E−16 |
| A18 | −1.1378451E−15 | 8.6035671E−17 | 1.6183307E−16 |
| A19 | 1.3703819E−15 | −9.2342149E−18 | 6.5001418E−18 |
| A20 | −8.3309469E−17 | 8.3590777E−18 | −3.2643844E−19 |

A through L of FIG. 13 are diagrams that illustrate aberrations of the zoom lens of Example 6 (the types of aberrations are the same as those shown for Example 1). In addition, FIG. 29 through FIG. 31 are collections of diagrams that illustrate lateral aberrations of the zoom lens of Example 6.

Table 19 shows values of the zoom lenses of Examples 1 through 6 corresponding to Conditional Formulae (1) through (5). The values shown here are the values of the condition defined in each conditional formula, that is, the equations therein, and are related to the d line.

TABLE 19

|  | Example 1 | Example 2 | Example 3 | Example 4 | Example 5 | Example 6 |
|---|---|---|---|---|---|---|
| (1) |f3F/f3| | 1.38 | 1.21 | 1.29 | 1.54 | 1.50 | 1.28 |
| (2) |f3F/fw| | 1.72 | 1.49 | 1.58 | 1.89 | 1.88 | 1.62 |
| (3) |f3F/ft| | 0.58 | 0.51 | 0.54 | 0.64 | 0.64 | 0.56 |
| (4) |f3IS/f3| | 1.79 | 1.76 | 1.94 | 2.52 | 2.17 | 1.62 |
| (5) |f3IS/f3A| | 1.47 | 1.34 | 1.54 | 2.14 | 1.84 | 1.34 |

Table 20 shows the amounts of movement of the movable third lens groups (the lens L34) in the zoom lenses of Examples 1 through 6 in the case that camera shake in which the optical axis tilts 0.3 degrees is corrected. Here, the amounts of movement at the wide angle end, at the intermediate focal distance, and at the telephoto end are shown for each Example. Note that the amounts of movement are amounts of movement in a direction perpendicular to the optical axis, and the units of measurement are mm.

TABLE 20

| Example 1 | Example 2 | Example 3 | Example 4 | Example 5 | Example 6 |
|---|---|---|---|---|---|
| 0.108 | 0.103 | 0.111 | 0.147 | 0.132 | 0.097 |
| 0.138 | 0.133 | 0.144 | 0.186 | 0.168 | 0.128 |
| 0.190 | 0.181 | 0.197 | 0.255 | 0.232 | 0.172 |

Next, an imaging apparatus according to an embodiment of the present invention will be described with reference to FIG. 32 and FIG. 33. A camera 30 illustrated in the front perspective view of FIG. 32 and the rear perspective view of FIG. 33 is non reflex digital camera, onto which an exchangeable lens 20 is interchangeably mounted. The exchangeable lens 20 is a zoom lens 1 according to an embodiment of the present invention housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that receives images of subjects formed by the exchangeable lens 20 and outputs image signals corresponding to the images, a signal processing circuit that processes the image signals output by the imaging element to generate images, and a recording medium for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The camera 30 has a fast camera shake correction response time and a fast focusing operation response time, and can achieve reductions in size and weight, because it is equipped with the zoom lens 1 of the present invention.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, the aspherical surface coefficients, etc., are not limited to the numerical values indicated in connection with the Examples, and may be other values.

In addition, a non reflex (so called mirrorless) digital camera was described as an example of the embodiment of the imaging apparatus. However, the imaging apparatus of the present invention is not limited to such a camera. The present invention may be applied to imaging apparatuses such as video cameras, digital cameras, cinematic cameras, and broadcast cameras as well.

What is claimed is:

1. A zoom lens, consisting of:
   a first lens group having a positive refractive power;
   a second lens group having a negative refractive power; and
   a third lens group having a positive refractive power,
   the first lens group, the second lens group, and the third lens group provided in first to third order from an object side,
   the first lens group, the second lens group, and the third lens group configured to move during an operation wherein the zoom lens changes magnification;
   the first lens group, the second lens group, and the third lens group each being moveable such that a distance between the first lens group and the second lens group is greater, and a distance between the second lens group and the third lens group is smaller, at a telephoto end compared to a wide angle end;
   the third lens group comprising a plurality of lenses, and distances among the plurality of lenses provided in the third lens group being constant while changing magnification;
   the third lens group consisting of a 3-1 lens group having a positive refractive power and a 3-2 lens group, provided in this order from the object side;
   the 3-1 lens group being fixed when camera shake occurs and during focusing operations; and
   the 3-2 lens group comprising a shake preventing lens group provided most toward the object side that moves in a direction perpendicular to an optical axis when camera shake occurs to correct an imaging plane but is fixed during focusing operations, and a focusing lens group provided more toward an image side than the shake preventing lens group that moves along the optical axis during focusing operations but is fixed when camera shake occurs;
   wherein the focusing lens group has a positive refractive power; and
   wherein a lens group having a negative refractive power, which is fixed during focusing operations and when camera shake occurs, is provided adjacent to the focusing lens group toward the image side thereof.

2. The zoom lens as defined in claim 1, wherein:
   the focusing lens group has a positive refractive power.

3. The zoom lens as defined in claim 1, wherein:
the focusing lens group consists of a single positive lens.

4. The zoom lens as defined in claim 1 that satisfies Conditional Formula (1) below:

$$0.9<|f3F/f3|<1.8 \quad (1)$$

wherein f3F is the focal distance of the focusing lens group, and f3 is the focal length of the third lens group.

5. The zoom lens as defined in claim 4 that satisfies Conditional Formula (1-2) below:

$$1.0<|f3F/f3|<1.7 \quad (1\text{-}2).$$

6. The zoom lens as defined in claim 1, wherein:
the angle of view at the wide angle end is 70 degrees or greater; and
the zoom lens satisfies Conditional Formulae (2) and (3) below:

$$1.1<|f3F/fw|<2.3 \quad (2)$$

$$0.3<|f3F/ft|<0.9 \quad (3)$$

wherein f3F is the focal length of the focusing lens group, fw is the focal length of the entire system at the wide angle end, and ft is the focal length of the entire system at the telephoto end.

7. The zoom lens as defined in claim 6 that satisfies Conditional Formula (2-2) below:

$$1.2<|f3F/fw|<2.2 \quad (2\text{-}2).$$

8. The zoom lens as defined in claim 6 that satisfies Conditional Formula (2-3) below:

$$1.3<|f3F/fw|<2.1 \quad (2\text{-}3).$$

9. The zoom lens as defined in claim 6 that satisfies Conditional Formula (3-2) below:

$$0.4<|f3F/ft|<0.8 \quad (3\text{-}2).$$

10. The zoom lens as defined in claim 1, wherein:
the shake preventing lens group has a negative refractive power.

11. The zoom lens as defined in claim 1, wherein:
the shake preventing lens group consists of a single negative lens.

12. The zoom lens as defined in claim 1, wherein:
the 3-1 lens group comprises at least two positive lenses and one negative lens.

13. The zoom lens as defined in claim 1 that satisfies Conditional Formula (4) below:

$$1.2<|f3IS/f3|<3.0 \quad (4)$$

wherein F3IS is the focal length of the shake preventing lens group, and f3 is the focal length of the third lens group.

14. The zoom lens as defined in claim 1 that satisfies Conditional Formula (5) below:

$$0.8<|f3IS/f3A|<2.6 \quad (5)$$

wherein f3IS is the focal length of the shake preventing lens group and f3A is the combined focal length of the 3-1 lens group and the shake preventing lens group.

15. The zoom lens as defined in claim 1, wherein:
the first lens group consists of a lens having a negative refractive power, and a lens having a positive refractive power, provided in this order from the object side.

16. The zoom lens as defined in claim 1, wherein:
one positive lens, which is fixed with respect to the direction of the optical axis while changing magnification and during focusing operations, is provided between the third lens group and an imaging surface.

17. The zoom lens as defined in claim 1, wherein:
the second lens group consists of a lens having a negative refractive power, a lens having a negative refractive power, and a lens having a positive refractive power, provided in this order from the object side.

18. An imaging apparatus comprising a zoom lens as defined in claim 1.

19. A zoom lens, consisting of:
a first lens group having a positive refractive power;
a second lens group having a negative refractive power; and
a third lens group having a positive refractive power,
the first lens group, the second lens group, and the third lens group provided in first to third order from an object side,
the first lens group, the second lens group, and the third lens group configured to move during an operation wherein the zoom lens changes magnification;
the first lens group, the second lens group, and the third lens group each being moveable such that a distance between the first lens group and the second lens group is greater, and a distance between the second lens group and the third lens group is smaller, at a telephoto end compared to a wide angle end;
the third lens group comprising a plurality of lenses, and distances among the plurality of lenses provided in the third lens group being constant while changing magnification;
the third lens group consisting of a 3-1 lens group having a positive refractive power and a 3-2 lens group, provided in this order from the object side;
the 3-1 lens group consisting of two lenses having positive refractive powers and one lens having a negative refractive power, and the 3-1 lens group being fixed when camera shake occurs and during focusing operations; and
the 3-2 lens group consisting of a shake preventing lens, which is a single lens having a negative refractive power, a focusing lens, which is a single lens having a positive refractive power, and a fixed lens group having a negative refractive power, which is fixed when camera shake occurs and during focusing operations, provided in this order from the object side,
the shake preventing lens provided most toward the object side and configured to move in a direction perpendicular to an optical axis when camera shake occurs to correct an imaging plane but is fixed during focusing operations, and the focusing lens provided more toward an image side than the shake preventing lens group and configured to move along the optical axis during focusing operations but is fixed when camera shake occurs.

* * * * *